United States Patent
Cajias et al.

(10) Patent No.: US 11,720,538 B2
(45) Date of Patent: Aug. 8, 2023

(54) PROVIDING INCREMENTAL UPDATES OF CATEGORICAL INFORMATION USING A PROBABILISTIC ENCODING DATA STRUCTURE

(71) Applicant: HERE Global B.V., Eindhoven (NL)

(72) Inventors: Raul Cajias, Berlin (DE); Daniel Rolf, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 324 days.

(21) Appl. No.: 17/109,430

(22) Filed: Dec. 2, 2020

(65) Prior Publication Data

US 2021/0364317 A1 Nov. 25, 2021

Related U.S. Application Data

(60) Provisional application No. 63/027,549, filed on May 20, 2020.

(51) Int. Cl.
*G06F 16/00* (2019.01)
*G06F 16/22* (2019.01)
(Continued)

(52) U.S. Cl.
CPC ..... *G06F 16/2246* (2019.01); *G01C 21/3415* (2013.01); *G01C 21/3446* (2013.01);
(Continued)

(58) Field of Classification Search
CPC ............. G06F 16/2246; G06F 16/2291; G06F 16/24575; G06F 16/29; G06F 16/316;
(Continued)

(56) References Cited

U.S. PATENT DOCUMENTS

| 8,116,974 B2 | 2/2012 | Cummings |
| 9,171,464 B2 | 10/2015 | Khetan et al. |

(Continued)

FOREIGN PATENT DOCUMENTS

| CN | 101635114 A | 1/2010 |
| CN | 105677686 A | 6/2016 |

(Continued)

OTHER PUBLICATIONS

Bando et al., "Flashtrie: Hash-based Prefix-Compressed Trie for IP Route Lookup Beyond 100gbps", 2010 Proceedings IEEE Infocom, San Diego, CA, 2010, pp. 1-9.

(Continued)

*Primary Examiner* — Dinku W Gebresenbet
(74) *Attorney, Agent, or Firm* — Peter H. Yu; Here Global B.V.

(57) ABSTRACT

Information corresponding to one or more traversable map elements (TMEs) within a zone of interest is accessed from the geographic database. A respective category of a plurality of categories is determined for each of the one or more TMEs based at least in part on the information corresponding to the TME. A first category encoding data structure is generated based at least in part on map version agnostic identifiers corresponding to TMEs determined to be in a first category of the plurality of categories, wherein the first category encoding data structure is a probabilistic data structure configured to not provide false negatives for TMEs within the zone of interest. The first category encoding data structure is provided such that a mobile apparatus receives the first category encoding data structure.

20 Claims, 21 Drawing Sheets

(51) Int. Cl.

| | | |
|---|---|---|
| G01C 21/36 | (2006.01) | |
| G01C 21/34 | (2006.01) | |
| G01C 21/00 | (2006.01) | |
| G06F 16/29 | (2019.01) | |
| G06F 16/31 | (2019.01) | |
| H04L 45/7459 | (2022.01) | |
| G06F 16/2457 | (2019.01) | |
| G06F 16/2453 | (2019.01) | |

(52) U.S. Cl.
CPC ..... *G01C 21/3453* (2013.01); *G01C 21/3667* (2013.01); *G01C 21/3685* (2013.01); *G01C 21/387* (2020.08); *G01C 21/3815* (2020.08); *G01C 21/3885* (2020.08); *G01C 21/3896* (2020.08); *G06F 16/2291* (2019.01); *G06F 16/24575* (2019.01); *G06F 16/29* (2019.01); *G06F 16/316* (2019.01); *H04L 45/7459* (2022.05); *G06F 16/2453* (2019.01)

(58) Field of Classification Search
CPC ............ G06F 16/2453; G01C 21/3415; G01C 21/3446; G01C 21/3453; G01C 21/3667; G01C 21/3685; G01C 21/3815; G01C 21/387; G01C 21/3885; G01C 21/3896; H04L 45/7459
See application file for complete search history.

(56) References Cited

U.S. PATENT DOCUMENTS

| | | |
|---|---|---|
| 9,239,246 B2 | 1/2016 | Jones |
| 9,916,760 B1 | 3/2018 | Balasubramanian et al. |
| 9,933,269 B2 | 4/2018 | Maischberger et al. |
| 10,317,222 B2 | 7/2019 | Maischberger et al. |
| 10,371,540 B2 | 8/2019 | Kluge |
| 10,520,326 B2 | 12/2019 | Sun et al. |
| 10,563,990 B1 | 2/2020 | Gupta et al. |
| 11,047,699 B2 | 6/2021 | Rolf et al. |
| 2009/0099726 A1 | 4/2009 | Kim et al. |
| 2010/0030840 A1* | 2/2010 | O'Shea .................. H04L 63/123 709/201 |
| 2011/0106429 A1 | 5/2011 | Poppen et al. |
| 2011/0112760 A1 | 5/2011 | Serbanescu et al. |
| 2011/0238464 A1 | 9/2011 | Dasgupta |
| 2012/0098677 A1 | 4/2012 | Geelen |
| 2012/0330548 A1 | 12/2012 | Poppen |
| 2013/0163467 A1 | 6/2013 | Tesov |
| 2013/0294702 A1 | 11/2013 | Baselau et al. |
| 2014/0278081 A1 | 9/2014 | Iwuchukwu |
| 2015/0112592 A1 | 4/2015 | Smith |
| 2015/0168170 A1 | 6/2015 | Schilling et al. |
| 2016/0091321 A1 | 3/2016 | Chintakindi et al. |
| 2016/0097653 A1 | 4/2016 | Khetan et al. |
| 2016/0313130 A1 | 10/2016 | Baselau et al. |
| 2016/0313132 A1 | 10/2016 | Larroy |
| 2016/0370192 A1 | 12/2016 | Maischberger et al. |
| 2016/0370193 A1 | 12/2016 | Maischberger et al. |
| 2017/0016730 A1 | 1/2017 | Gawrilow |
| 2017/0120761 A1 | 5/2017 | Kapadia et al. |
| 2017/0318360 A1 | 11/2017 | Tran et al. |
| 2018/0033301 A1 | 2/2018 | Riou et al. |
| 2018/0216949 A1 | 8/2018 | Kluge |
| 2018/0259356 A1 | 9/2018 | Rolf et al. |
| 2019/0161084 A1 | 5/2019 | Greenwood et al. |
| 2020/0011676 A1 | 1/2020 | Ye et al. |
| 2020/0249033 A1 | 8/2020 | Gelhar |
| 2021/0010824 A1* | 1/2021 | Muraleev ........... G01C 21/3685 |

FOREIGN PATENT DOCUMENTS

| | | |
|---|---|---|
| CN | 110070753 A | 7/2019 |
| WO | WO 2017/207143 A1 | 12/2017 |
| WO | WO-2018037353 A1 * | 3/2018 ............ G01C 21/32 |
| WO | WO 2018/234127 A1 | 12/2018 |
| WO | WO 2019/037959 A1 | 2/2019 |

OTHER PUBLICATIONS

Binary Tree Structure—Wikipedia [online] [Retrieved Mar. 11, 2021]. Retrieved from the Internet: <URL: https://en.wikipedia.org/w/index.php?title=Binary_tree&oldid=957589766>. (dated May 19, 2020), 9 pages.

Bloom Filter—Wikipedia [online] [retrieved from the Internet Sep. 1, 2020] <URL: https://en.wikipedia.org/w/index.php?title=Bloom_filter&oldid=895163114>. (May 2, 2019) 19 pages.

European Patent Office, Extended European Search Report for Application No. 20164262.6 dated Sep. 18, 2020, 8 pages.

European Patent Office, Extended European Search Report for Application No. 20164269.1 dated Sep. 14, 2020, 9 pages.

Jiang et al., Design Of A Multiple Bloom-Filter For Distributed Navigation Routing, IEEE Transactions On Systems, Man, and Cybemetcs: Systems, Feb. 2014, vol. 44, Issue 2, pp. 1-8. DOI: 10.1109/TSMC.2013.2242884.

Kayaturan, "Representing Shortest Paths In Graphs Using Bloom Filters ithout False Positives and Applications to Routing In Computer Networks", A Thesis Submitted for the Degree of Doctor of Philosophy, Department of Mathematical Sciences, University of Essex, Oct. 2017, 178 pages.

Lang et al., "Tree-Encoded Bitmaps", Proceedings of the 2020 ACM SIGMOD International Conference on Management of Data (Jun. 2020), 17 pages.

Ni et al., "Cloud-based Privacy-preserving Parking Navigation through Vehicular Communications", International Conference on Security and Privacy in Communication Systems (Jun. 2017), 19 pages.

Ni et al., Privacy-Preserving Smart Parking Navication Supporting Efficient Driving Guidance Retrieval, Feb. 20, 2018, [online], [retrieved from the Internet Jun. 10, 2019], <URL: https://engine.lib.uwaterloo.ca/ojs-2.2/index.php/pptvt/article/view/707/255> (14 pages).

Non-Final Office Action for U.S. Appl. No. 16/419,511 dated Feb. 18, 2021.

Notice of Allowance for U.S. Appl. No. 16/419,560 dated Mar. 4, 2021.

Poornimakkani, et al., "A Cloud Based End-To-End Smart Parking Solution Powered By IOT", International Research Journal of Engineering and Technology (IRJET), vol. 5, Issue 3, Mar. 2018, pp. 3559-3565.

Tomtom Real Time Traffic Information, [online], [retrieved from the Internet Jun. 10, 2019] <URL: https://www.tomtom.com/lib/img/REAL_TIME_TRAFFIC_WHITEPAPER.pdf >(21 pages).

Zhang et al. "Succinct Range Filters", ACM SIGMOD Record, vol. 48, No. 1 (Mar. 2019), 8 pages.

Non-Final Office Action for U.S. Appl. No. 16/419,579 dated Oct. 1, 2021.

Non-Final Office Action for U.S. Appl. No. 16/419,645 dated Mar. 26, 2021.

Choosumrong et al., "Implementation of Dynamic Cost Based Routing for Navigation Under Real Road Conditions using FOSS4G and OpenStreetMap", Proceedings of GIS-Ideas 2010, Hanoi, Vietnam (Dec. 9-11, 2010), pp. 53-58.

Wang et al., "Research on a Clustering Data De-Duplication Mechanism Based on Bloom Filter", 2010 International Conference on Multimedia Technology, Ningbo, China (2010), pp. 1-5.

Hua et al., "A Multi-Attribute Data Structure with Parallel Bloom Filters for Network Services", High Performance Computing—HiPC 2006, 13th International Conference, Bangladore, India (Dec. 18-21, 2006), 12 pages.

Notice of Allowance for U.S. Appl. No. 16/419,689 dated Jul. 26, 2021.

Notice of Allowance for U.S. Appl. No. 16/419,610 dated Aug. 16, 2021.

Non-Final Office Action for U.S. Appl. No. 16/419,511 dated Apr. 16, 2021.

(56) References Cited

OTHER PUBLICATIONS

Notice of Allowance for U.S. Appl. No. 16/419,540 dated Apr. 29, 2021.
Notice of Allowance for U.S. Appl. No. 16/419,511 dated Jun. 11, 2021.
Notice of Allowance for U.S. Appl. No. 16/419,645 dated Jul. 14, 2021.

* cited by examiner

| TME | First Bit Value | Second Bit Value | Third Bit Value |
|---|---|---|---|
| A | 0 | 0 | 0 |
| B | 0 | 0 | 1 |
| C | 1 | 1 | 0 |
| D | 0 | 1 | 0 |

PROVIDING INCREMENTAL UPDATES OF CATEGORICAL INFORMATION USING A PROBABILISTIC ENCODING DATA STRUCTURE

CROSS-REFERENCE TO RELATED APPLICATIONS

This application claims priority to U.S. Application No. 63/027,549, filed May 20, 2020, the content of which is incorporated herein by reference in its entirety.

TECHNOLOGICAL FIELD

Example embodiments relate generally to the encoding a route traversable map element (TME) set defined by a route and/or decoding a route from a starting location to a target location. An example embodiment relates generally to the encoding of a route TME set and/or decoding of a route in a map version agnostic manner.

BACKGROUND

Generally, a mobile apparatus may submit a route request or a request for information regarding road segments near the mobile apparatus to a server and the server may generate the route and/or compile the requested information and provide the route and/or requested information to the mobile apparatus. For example, the mobile apparatus may identify a starting segment and a target segment based on map information/data of a digital map stored by the mobile apparatus and provide the starting segment and the target segment to the server. The server receives the starting segment and the target segment, generates a route therebetween based on map information/data of a digital map stored by the server, and provides a list of segment identifiers to the mobile apparatus, where the segment identifiers correspond to the map information/data of the digital map stored by the server. However, problems can occur when the digital map stored by the mobile apparatus and the digital map stored by the server are different versions of the digital map. One solution is for the server to simply maintain multiple versions of the digital map. However, this solution is not viable for a digital map that updates regularly as the amount of memory needed to store and maintain all of the multiple versions of the digital map by the server is quite large.

BRIEF SUMMARY OF SOME EXAMPLE EMBODIMENTS

Various embodiments provide for the encoding of a route TME set and decoding of routes corresponding to the route TME set in a map version agnostic manner. In various embodiments, a TME may be a road segment, lane segment, and/or other map element configured to represent a traversable portion of a road network. As used herein, map version agnostic information/data is map information/data that is independent of a particular version of the digital map. For example, map version agnostic information/data is map information/data that is not expected to change between a first version of the digital map and a second version of the digital map. Various embodiments provide for the transmission of an encoded route TME set in a bandwidth efficient manner. In various embodiments, a route TME set is a set of TMEs of a route. For example, a route is an ordered set of TMEs and the route TME set is a set consisting of the TMEs in the ordered set of TMEs. However, the route TME set may not include any information/data regarding the ordering of the TMEs of the route. Various embodiments provide for encoding a route TME set using map version agnostic identifiers that are encoded into an encoding data structure (EDS), such that the encoded route TME set may be transmitted as a bit array. In various embodiments, the EDS is a bloom filter. In various embodiments, the EDS is a subtree data structure. In various embodiments, the subtree data structure is a prefix hash subtree and/or a prefix-compressed hash subtree. In various embodiments, the encoding may be performed such that the resulting EDS is the smallest EDS that is satisfied by route TMEs of the route TME set being encoded (e.g., the members of the EDS are coded map version agnostic identifiers configured to identify the route TMEs of the route TME set being encoded) and that is not satisfied by adjacent TMEs of the route (e.g., coded map version agnostic identifiers configured to identify adjacent TMEs are not members of the EDS). For example, the encoding may provide a bloom filter that is the smallest bloom filter that is satisfied by the route TMEs of the route TME set and that is not satisfied by adjacent TMEs of the route. For example, the encoding may provide a subtree data structure that is the smallest subtree data structure that is satisfied by the route TMEs of the route TME set and that is not satisfied by adjacent TMEs of the route. As used herein, an adjacent TME is a TME that intersections a route, but that is not part of the route. For example, an adjacent TME is associated with an intersection or node that is also associated with a route TME of the route TME set. However, the adjacent segment is not a member of the route TME set.

For example, a mobile apparatus may have a mobile version of a digital map stored in memory of the mobile apparatus. The mobile apparatus may provide a route request including information identifying a starting location and a target location for a route. The information identifying the starting location and target location for the route is map version agnostic, in various embodiments. For example, the starting location may be provided as the midpoint and z-level of a mobile version TME corresponding to the current location/position of the mobile apparatus and/or a user provided origin. The midpoint of a TME is the coordinate pair (e.g., latitude and longitude) of the point that is approximately halfway down (e.g., along the length of) the TME, where the ends of the road segment are defined by intersections or nodes.

For example, a network apparatus may have a network version of the digital map stored in memory of the network apparatus. The network apparatus may receive the route request provided by the mobile apparatus and identify a network version starting segment corresponding to the starting location and a network version target segment corresponding to the target location. The network apparatus may then determine a route from the network version origin TME to the network version target TME using the network version of the digital map. In various embodiments, the route may be determined as an ordered list or set of route TMEs to be traversed from the network version origin TME to the network version target TME. For example, the ordered list or set of route TMEs may comprise an ordered list of TME identifiers that identify the route TMEs in the network version of the digital map. The route segments of the ordered list or set of route segments define a route TME set.

The network apparatus may then encode the route TME set by determining, generating, and/or accessing map version agnostic identifiers for each of the route TMEs of the route TME set. For example, the map version agnostic identifier for a TME may be a particular element and/or particular combination of elements of map version agnostic map information/data corresponding to the TME. In various embodiments, map version agnostic map information/data is map information/data that is not expected to change between map versions of the digital map. For example, the map version agnostic map information/data may include a road name, TME length, a direction of travel of a TME, a functional class of a TME, speed limit, and/or the like. The map version agnostic identifiers for each of the route TMEs may then be coded and added to an EDS.

In various embodiments, the EDS is a space-efficient probabilistic data structure that is used to test whether an element is a member of a set. False positive matches are possible, but false negatives are not. In other words, a query of a bloom filter returns either "possibly in set" or "definitely not in set." Two example EDSs are bloom filters and subtree data structures. In various embodiments, a test process is used to decrease and/or eliminate false positives by enlarging the EDS to a minimum size that eliminates false positives for a test set of TMEs (e.g., a set of TMEs that are adjacent to a route, and/or the like).

The network apparatus may then provide a route response in response to the route request comprising the EDS such that the mobile apparatus receives the route response. The mobile apparatus may then use the EDS and the mobile version of the digital map to decode the route. The mobile apparatus may then provide the route (e.g., via a user interface), control a vehicle such that the vehicle traverses the route, and/or use the route and/or other information/data provided in the route response to perform one or more navigation functions. Some non-limiting examples of navigation functions include providing a route or information corresponding to a geographic area (e.g., via a user interface), localization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. Thus, the route, while determined using the network version of the digital map may then be decoded using the mobile version of the digital map such that differences between the network version and the mobile version of the digital map may be tolerated. Additionally, the bandwidth used to provide the route response is minimized by encoding the route TME set using the smallest EDS that does not provide any false positives for any of the adjacent TMEs of the route.

Various embodiments of the present invention therefore provide technical solutions to the technical problems of the bandwidth efficient communication of routes between apparatuses that have access to different versions of a digital map.

Various embodiments provide for the determining and encoding (e.g., by a network apparatus) route TME sets for shortest distance routes, shortest expected travel time routes, multiple way point routes, routes with additional traffic information/data, routes to points of interest (POIs) identified in a POI search, parking cruise routes, parking availability information, and/or the like. Various embodiments provide for the decoding and use (e.g., by a mobile apparatus) of shortest distance routes, shortest expected travel time routes, multiple way point routes, routes with additional traffic information/data, routes to POIs identified in a POI search, parking cruise routes, parking availability information, and/or the like.

In an example embodiment, a network apparatus comprising a processor, a memory storing a geographic database, and a communication interface accesses information corresponding to one or more TMEs within a zone of interest from the geographic database. The network apparatus determines a respective category of a plurality of categories for each of the one or more TMEs based at least in part on the information corresponding to the TME. The network apparatus generates a first category encoding data structure based at least in part on map version agnostic identifiers corresponding to TMEs determined to be in a first category of the plurality of categories. The first category encoding data structure is a probabilistic data structure configured to not provide false negatives for TMEs within the zone of interest. The network apparatus provides the first category encoding data structure such that a mobile apparatus receives the first category encoding data structure.

According to an aspect of the present disclosure, a method is provided. In an example embodiment, the method comprises accessing, by a network apparatus comprising a processor, a memory storing a geographic database, and a communication interface, information corresponding to one or more traversable map elements (TMEs) within a zone of interest from the geographic database; determining, by the network apparatus, a respective category of a plurality of categories for each of the one or more TMEs based at least in part on the information corresponding to the TME; and generating, by the network apparatus, a first category encoding data structure based at least in part on map version agnostic identifiers corresponding to TMEs determined to be in a first category of the plurality of categories. The first category encoding data structure is a probabilistic data structure configured to not provide false negatives for TMEs within the zone of interest. The method further comprises providing, by the network apparatus, the first category encoding data structure such that a mobile apparatus receives the first category encoding data structure.

In an example embodiment, the information corresponding to the TME is a probability of finding parking along the TME or traffic information for the TME. In an example embodiment, the plurality of categories are categories of likelihood to find parking along TMEs. In an example embodiment, the first category encoding data structure is one of a bloom filter or a subtree data structure. In an example embodiment, the subtree data structure is a prefix hash subtree or a prefix-compressed hash subtree. In an example embodiment, generating the first category encoding data structure comprises accessing map version agnostic information regarding each TME determined to be in the first category; generating a map version agnostic identifier for each TME determined to be in the first category; coding the map version agnostic identifier for each TME determined to be in the first category using at least one coding function; and generating the first category encoding data structure having as members the coded map version agnostic identifiers for each TME determined to be in the first category. In an example embodiment, the first category encoding data structure is provided such that the mobile apparatus receives the first category encoding data structure via a persistent connection established between the network apparatus and the mobile apparatus. In an example embodiment, the method further comprises generating, in accordance with a refresh rate, an update encoding data structure that provides an incremental update of TMEs determined to be in the first category; and providing the update encoding data structure via the persistent connection. In an example embodiment, the update encoding data structure is generated to have as members the coded map version agnostic identifiers for TMEs determined to be in the first category at a first update time and that were not in the first category at a second update time, the first update time corresponding to an update comprising the update encoding data structure and the second update time corresponding to an immediately preceding update. In an example embodiment, the update encoding data structure is tested to ensure that no TMEs within the zone of interest that were determined to be in the first category at the second update time and determined to not be in the first category at the first update time satisfy the update encoding data structure.

According to another aspect of the disclosure, an apparatus is provided. In an example embodiment, the apparatus comprises at least one processor, a communications interface configured for communicating via at least one network, and at least one memory storing computer program code and a geographic database. The at least one memory and the computer program code are configured to, with the processor, cause the apparatus to at least access information corresponding to one or more TMEs within a zone of interest from the geographic database; determine a respective category of a plurality of categories for each of the one or more TMEs based at least in part on the information corresponding to the TME; generate a first category encoding data structure based at least in part on map version agnostic identifiers corresponding to TMEs determined to be in a first category of the plurality of categories, wherein the first category encoding data structure is a probabilistic data structure configured to not provide false negatives for TMEs within the zone of interest; and provide the first category encoding data structure such that a mobile apparatus receives the first category encoding data structure.

In an example embodiment, the information corresponding to the TME is a probability of finding parking along the TME or traffic information for the TME. In an example embodiment, the plurality of categories are categories of likelihood to find parking along TMEs. In an example embodiment, the first category encoding data structure is one of a bloom filter or a subtree data structure. In an example embodiment, the subtree data structure is a prefix hash subtree or a prefix-compressed hash subtree. In an example embodiment, generating the first category encoding data structure comprises accessing map version agnostic information regarding each TME determined to be in the first category; generating a map version agnostic identifier for each TME determined to be in the first category; coding the map version agnostic identifier for each TME determined to be in the first category using at least one coding function; and generating the first category encoding data structure having as members the coded map version agnostic identifiers for each TME determined to be in the first category. In an example embodiment, the first category encoding data structure is provided such that the mobile apparatus receives the first category encoding data structure via a persistent connection established between the network apparatus and the mobile apparatus. In an example embodiment, the at least one memory and the computer program code are further configured to, with the processor, cause the apparatus to at least generate, in accordance with a refresh rate, an update encoding data structure that provides an incremental update of TMEs determined to be in the first category; and provide the update encoding data structure via the persistent connection. In an example embodiment, the update encoding data structure is generated to have as members the coded map version agnostic identifiers for TMEs determined to be in the first category at a first update time and that were not in the first category at a second update time, the first update time corresponding to an update comprising the update encoding data structure and the second update time corresponding to an immediately preceding update. In an example embodiment, the update encoding data structure is tested to ensure that no TMEs within the zone of interest that were determined to be in the first category at the second update time and determined to not be in the first category at the first update time satisfy the update encoding data structure.

According to yet another aspect of the present disclosure, a computer program product is provided. In an example embodiment, the computer program product comprises a non-transitory computer-readable memory storing computer-executable instructions. The computer-executable instructions comprise executable instructions configured to, when executed by processing circuitry of an apparatus, cause the apparatus to access information corresponding to one or more TMEs within a zone of interest from a geographic database; determine a respective category of a plurality of categories for each of the one or more TMEs based at least in part on the information corresponding to the TME; generate a first category encoding data structure based at least in part on map version agnostic identifiers corresponding to TMEs determined to be in a first category of the plurality of categories, wherein the first category encoding data structure is a probabilistic data structure configured to not provide false negatives for TMEs within the zone of interest; and provide the first category encoding data structure such that a mobile apparatus receives the first category encoding data structure.

According to still another aspect of the present disclosure, an apparatus is provided in an example embodiment, the apparatus comprises means for accessing information corresponding to one or more TMEs within a zone of interest from a geographic database. The apparatus comprises means for determining a respective category of a plurality of categories for each of the one or more TMEs based at least in part on the information corresponding to the TME. The apparatus comprises means for generating a first category encoding data structure based at least in part on map version agnostic identifiers corresponding to TMEs determined to be in a first category of the plurality of categories. The first category encoding data structure is a probabilistic data structure configured to not provide false negatives for TMEs within the zone of interest. The apparatus comprises means for providing the first category encoding data structure such that a mobile apparatus receives the first category encoding data structure.

BRIEF DESCRIPTION OF THE DRAWINGS

Figure 1:
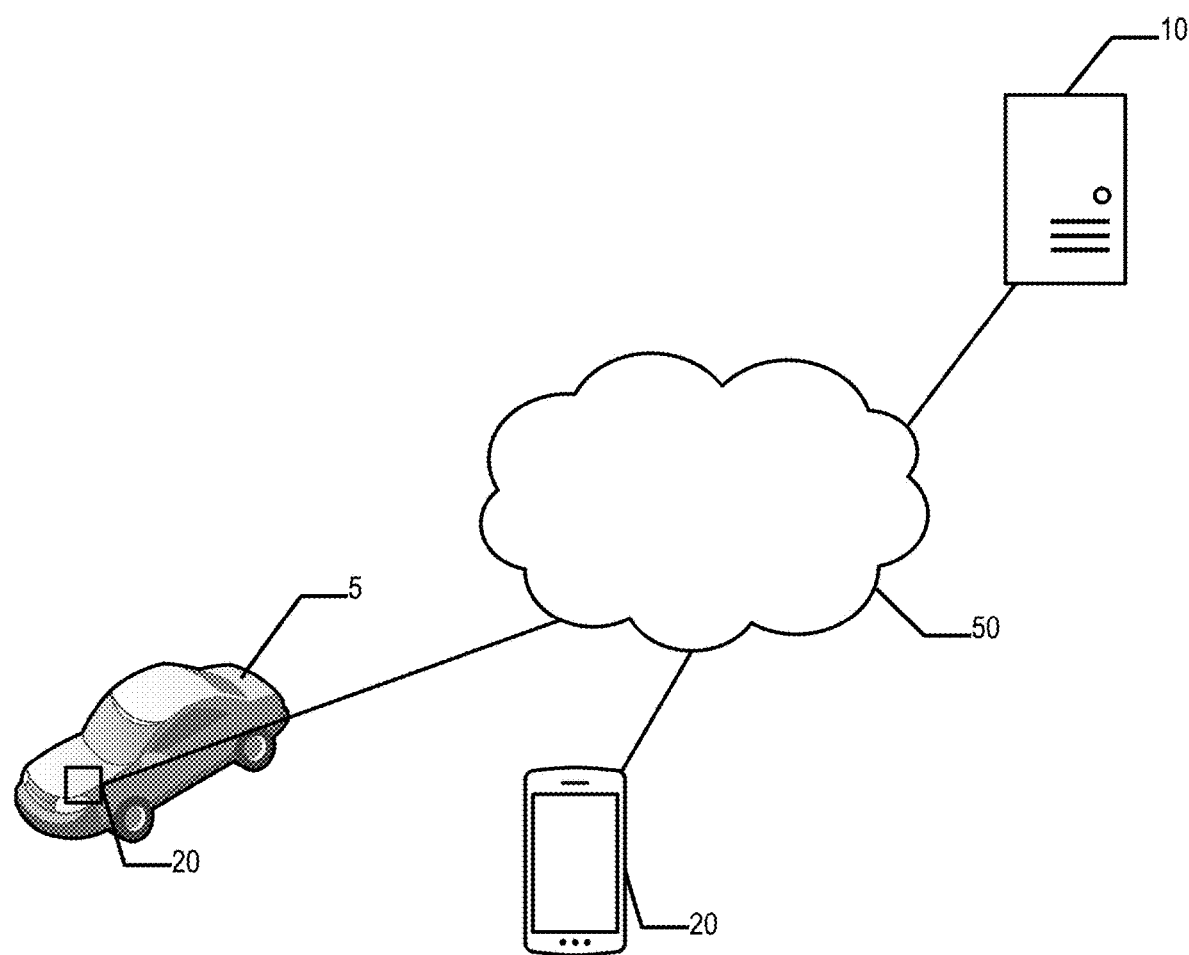
Figure 2A:
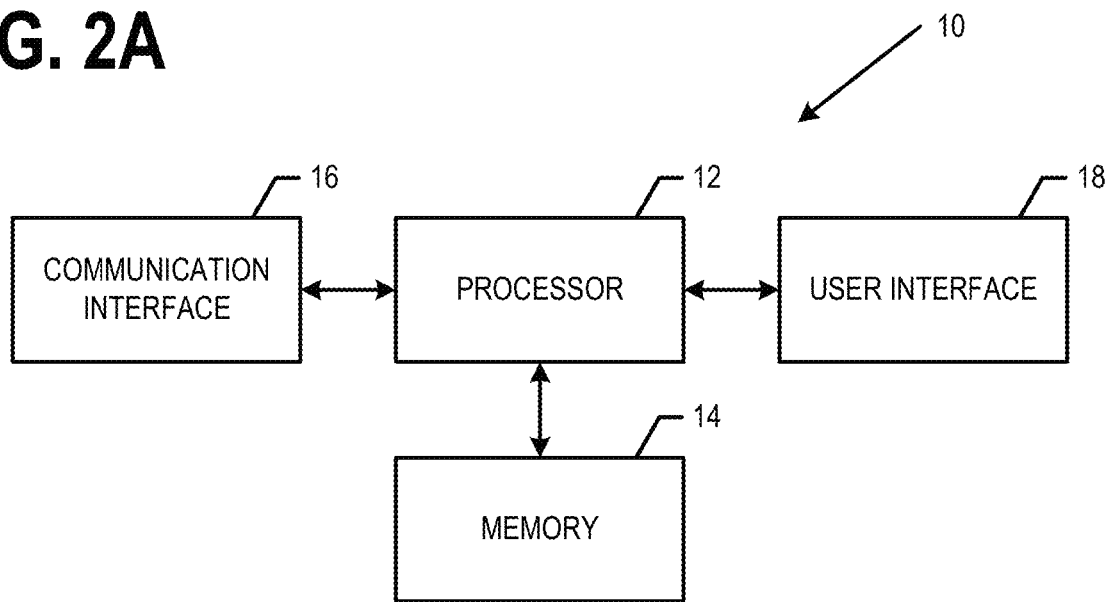
Figure 2B:
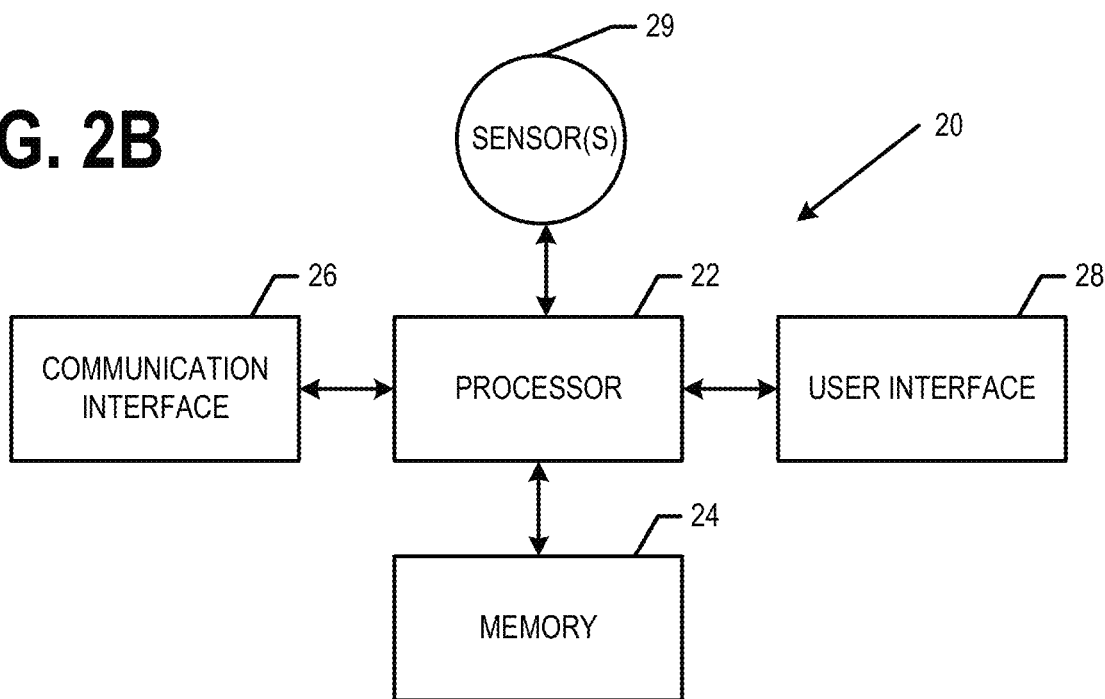
Figure 3:
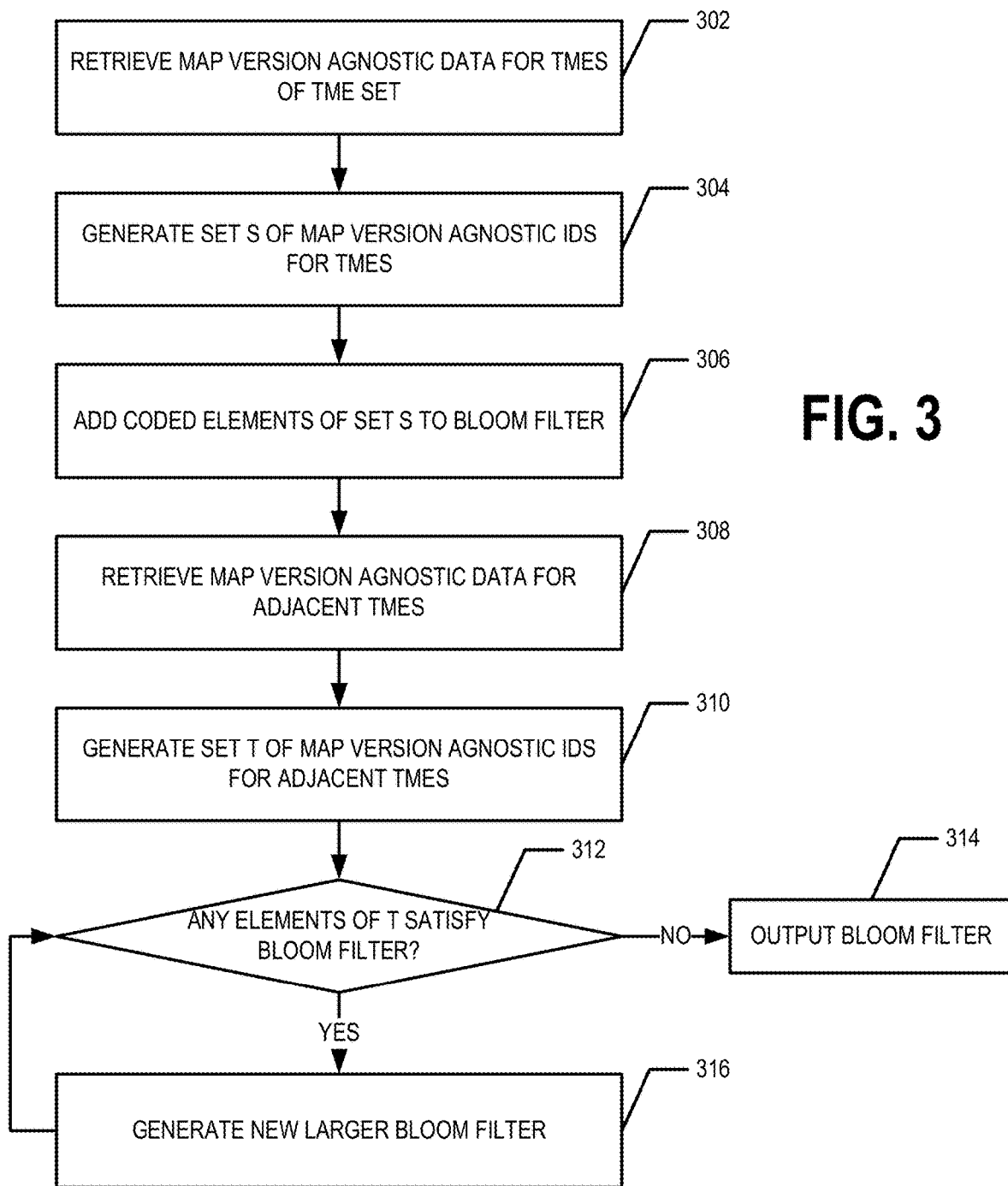
Figure 4:
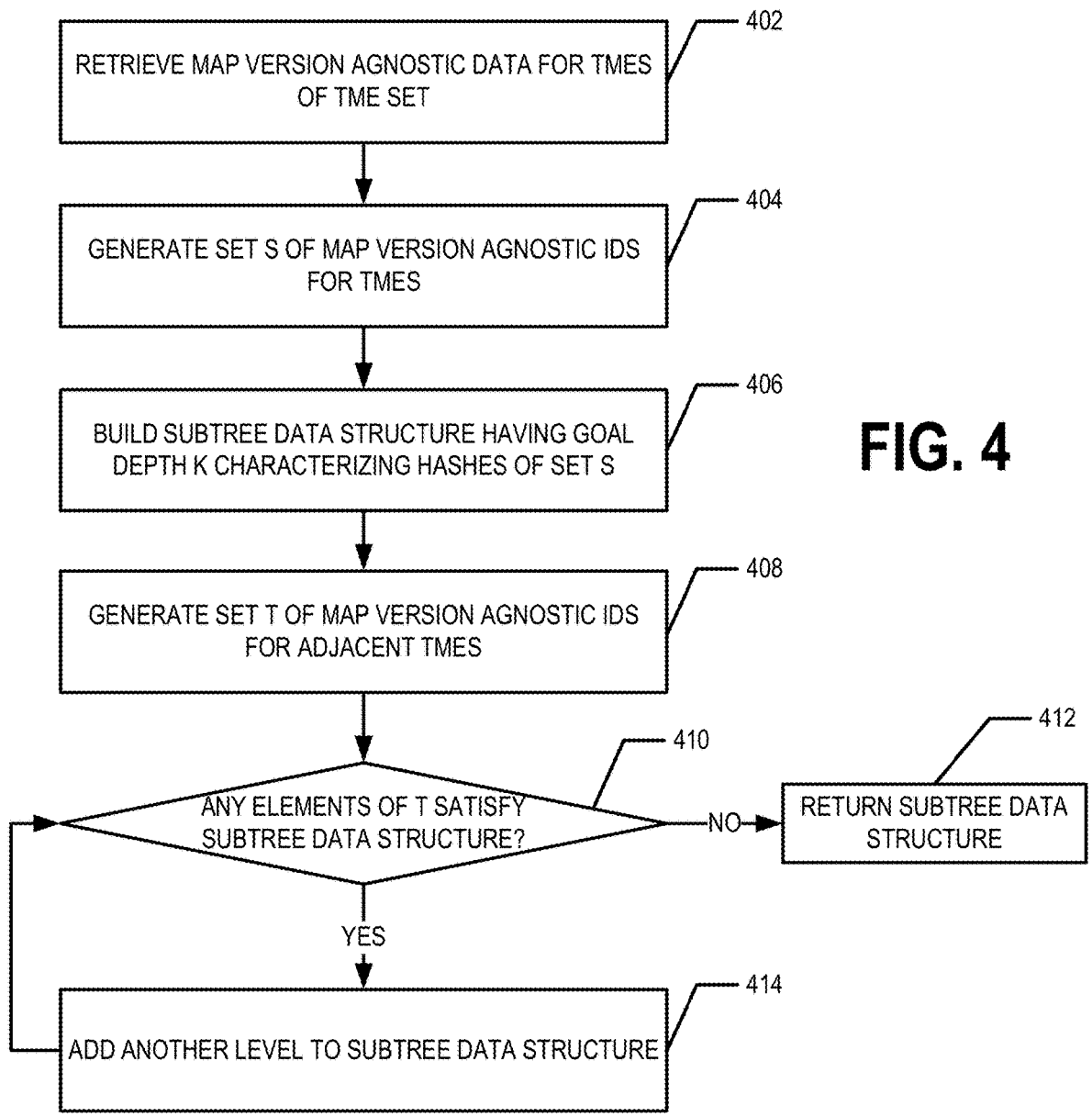
Figure 5:
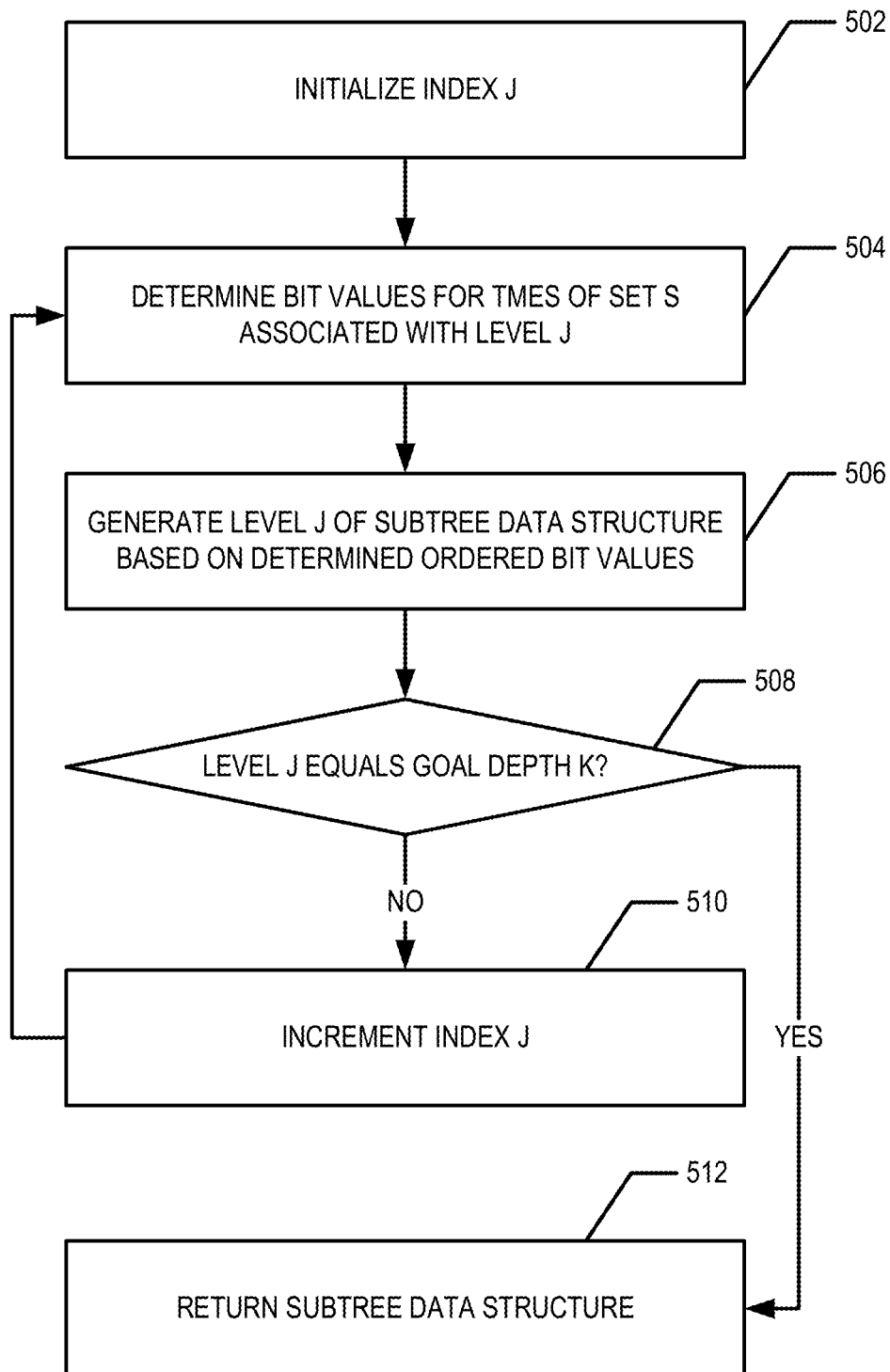
Figure 6:
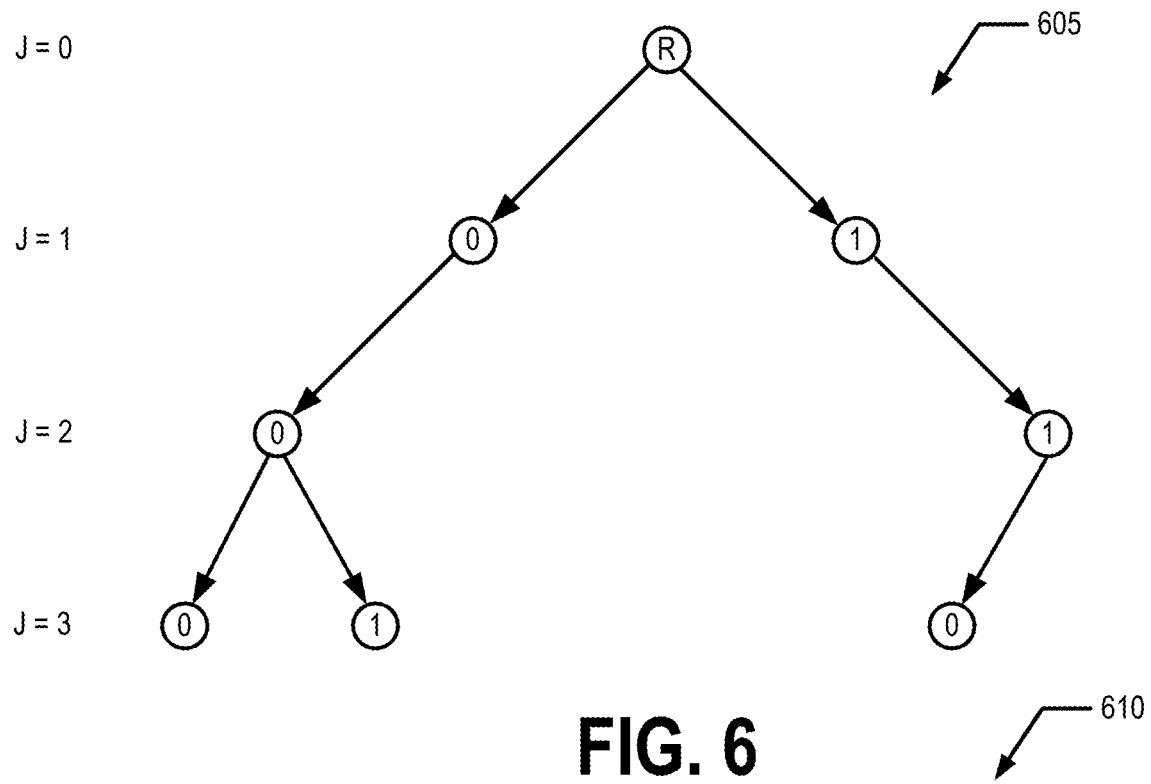
Figure 7:
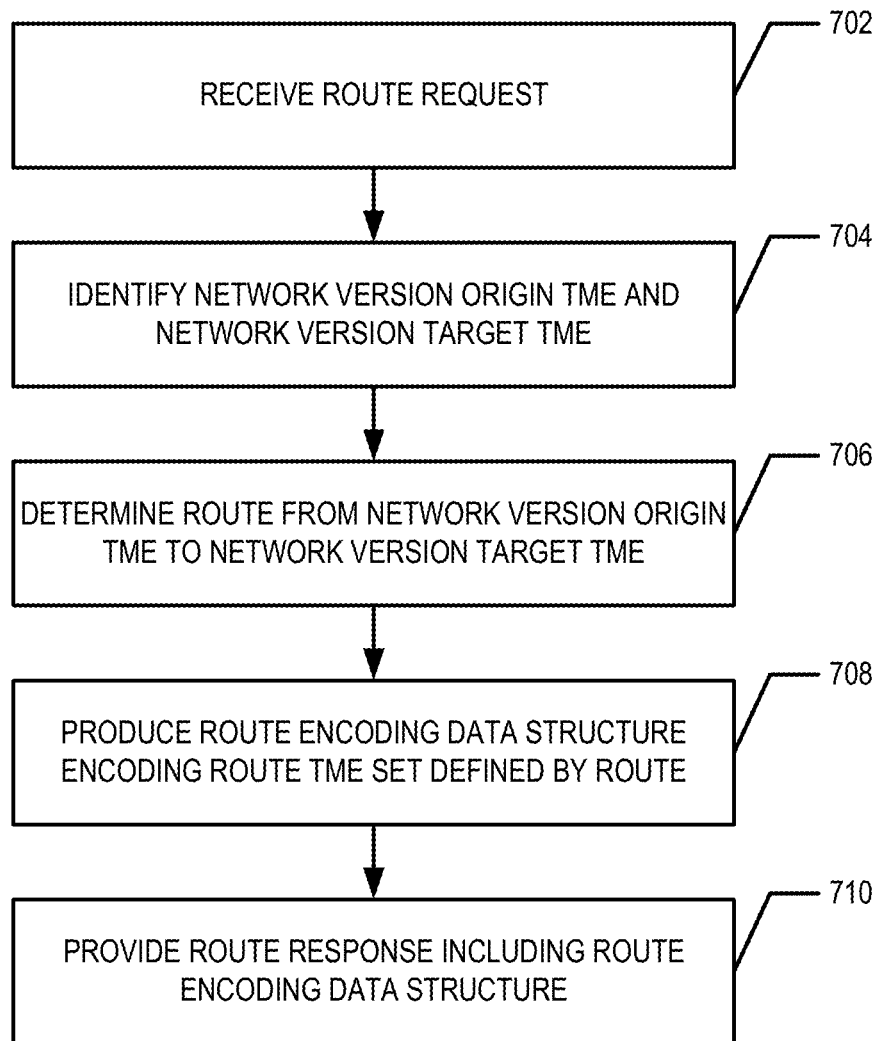
Figure 8:
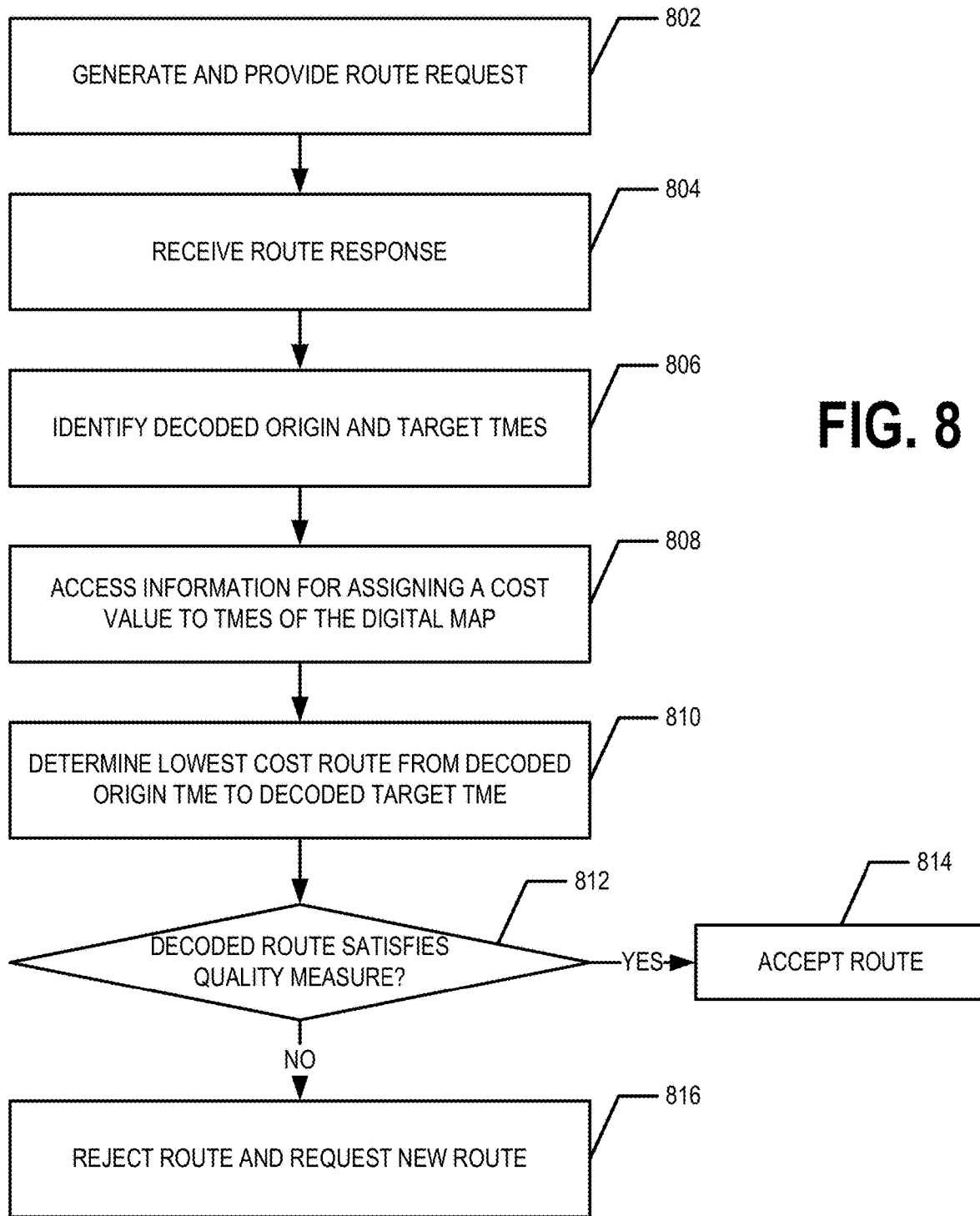
Figure 9:
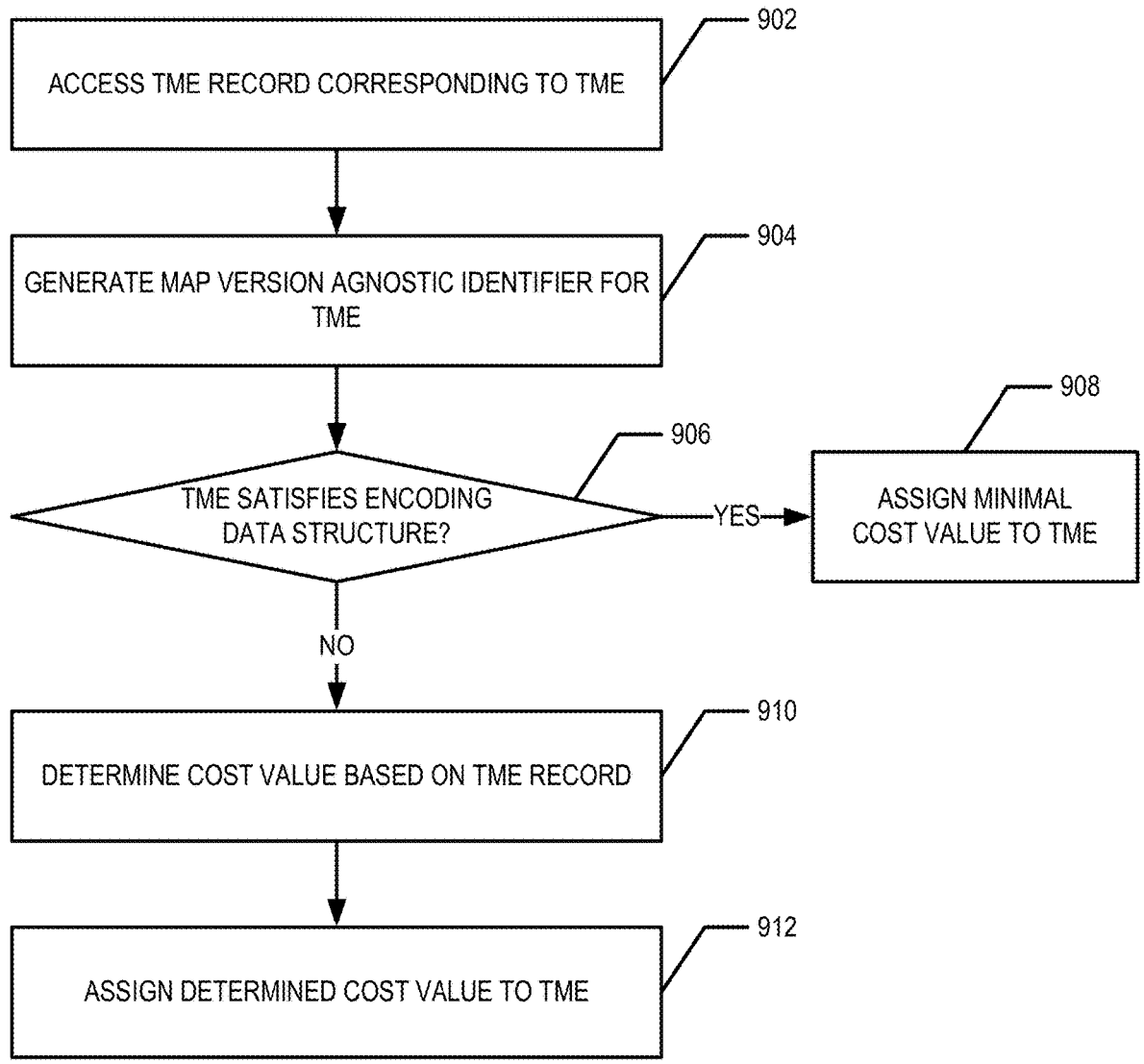
Figures 10A, 10B:
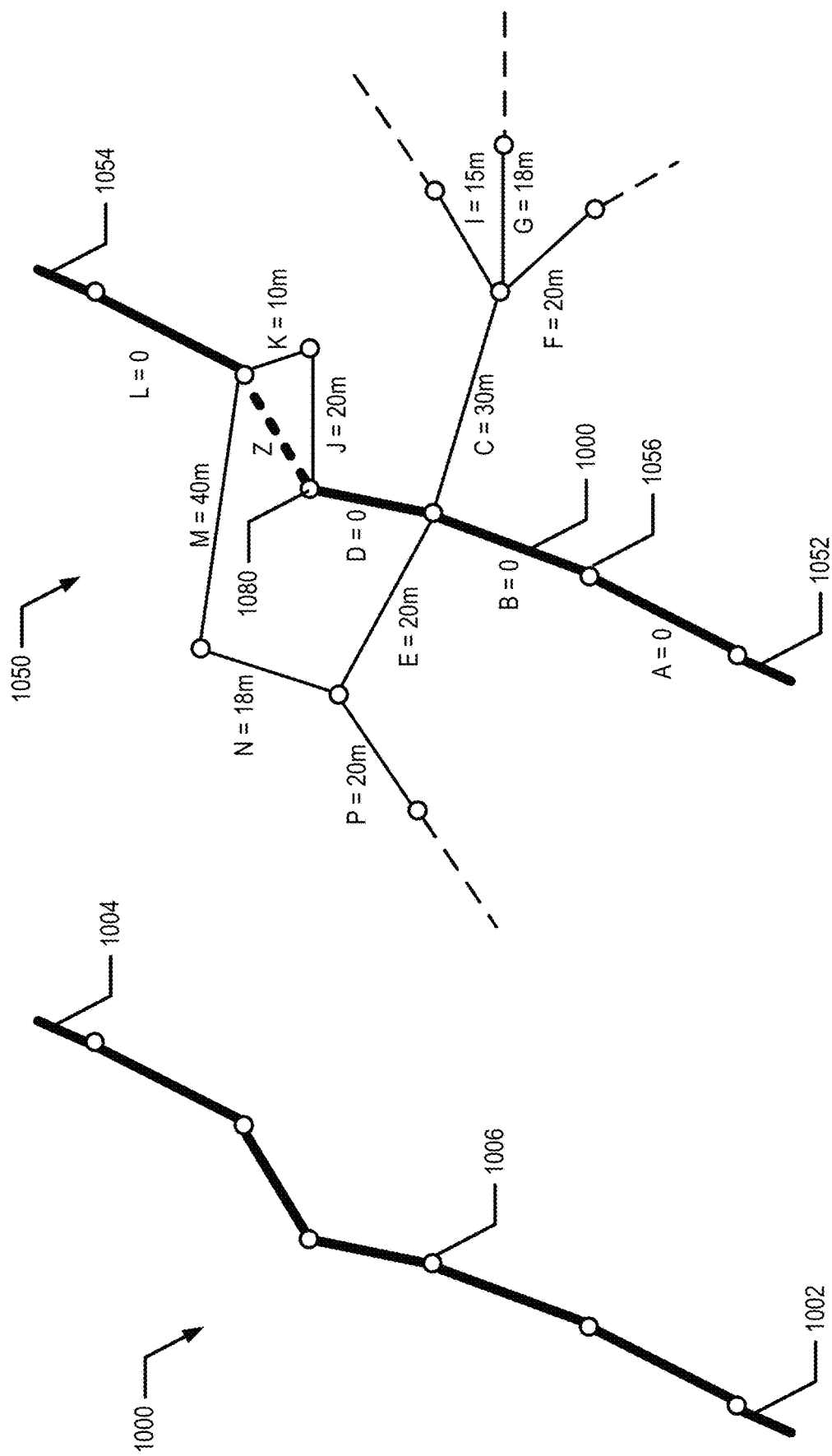
Figure 11:
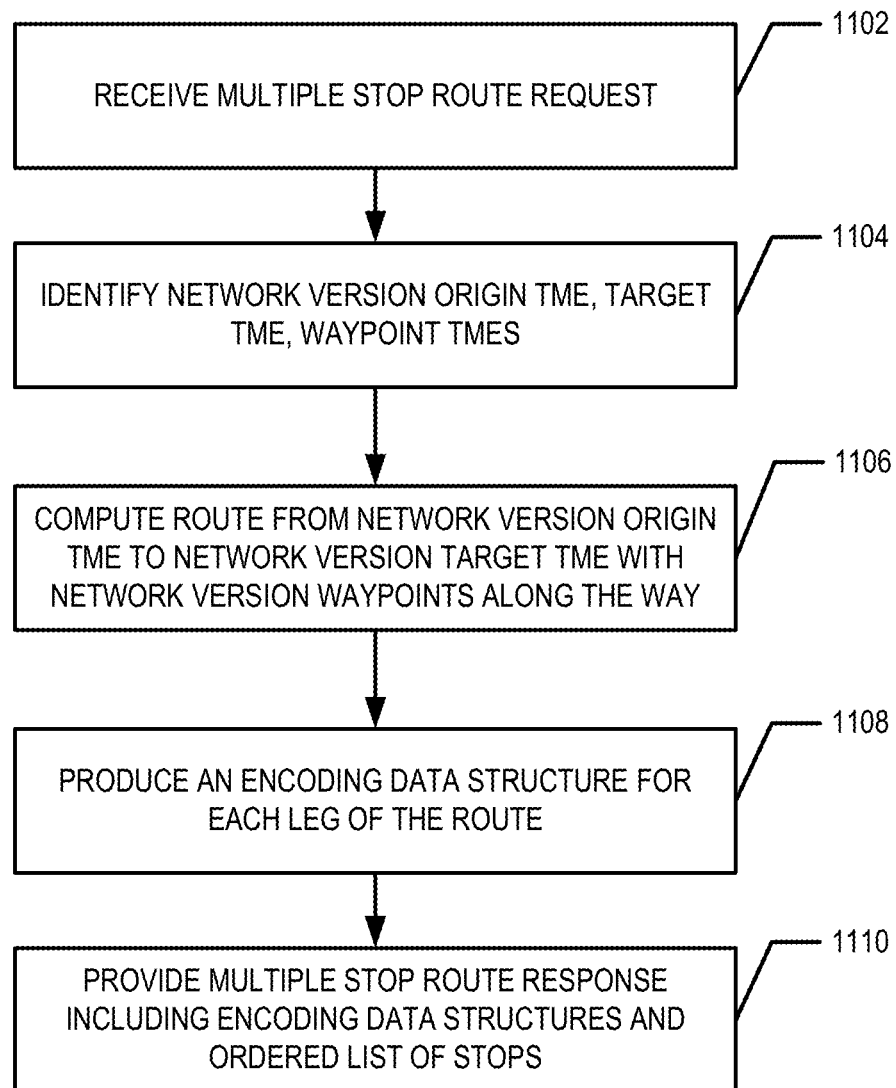
Figure 12:
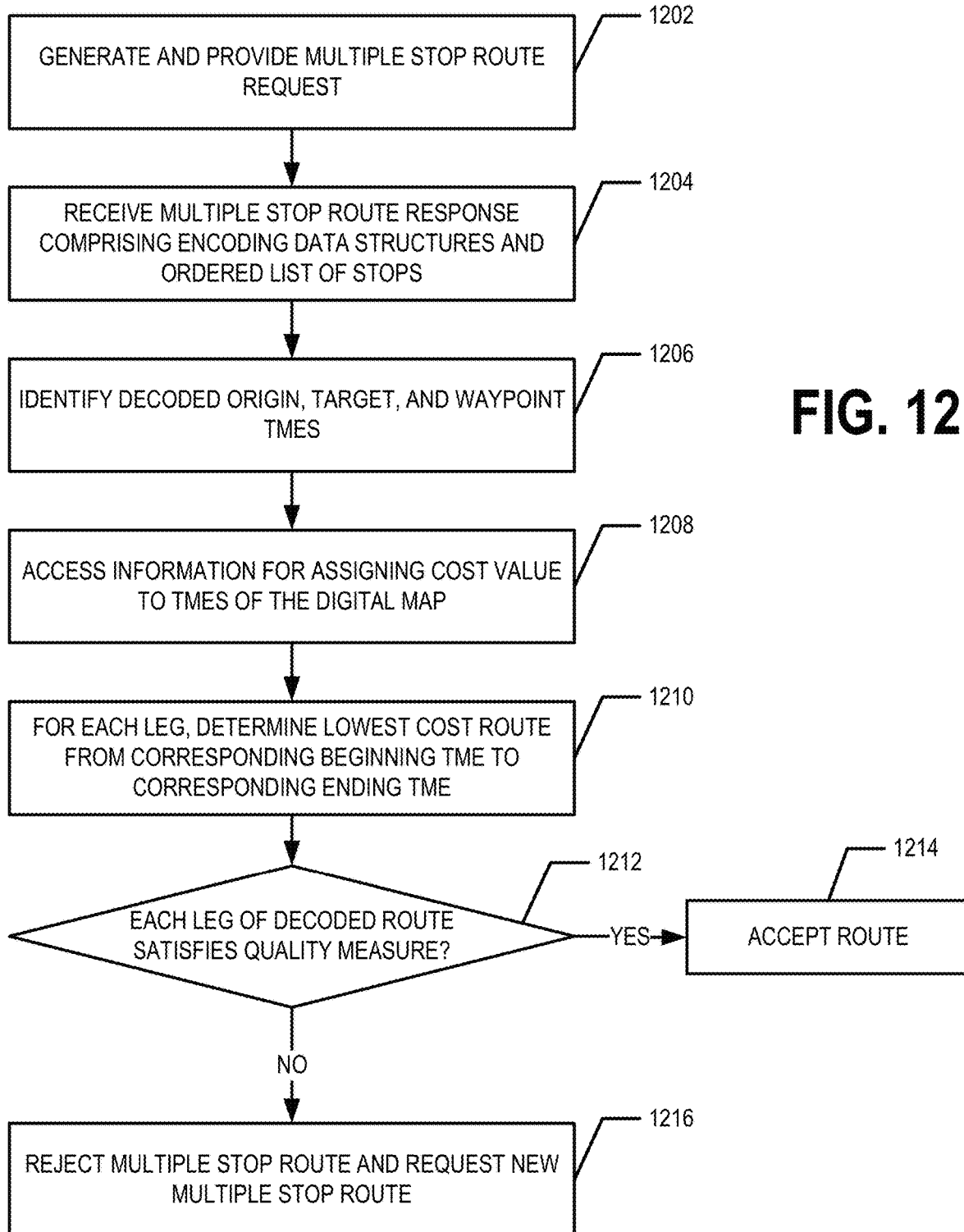
Figure 13:
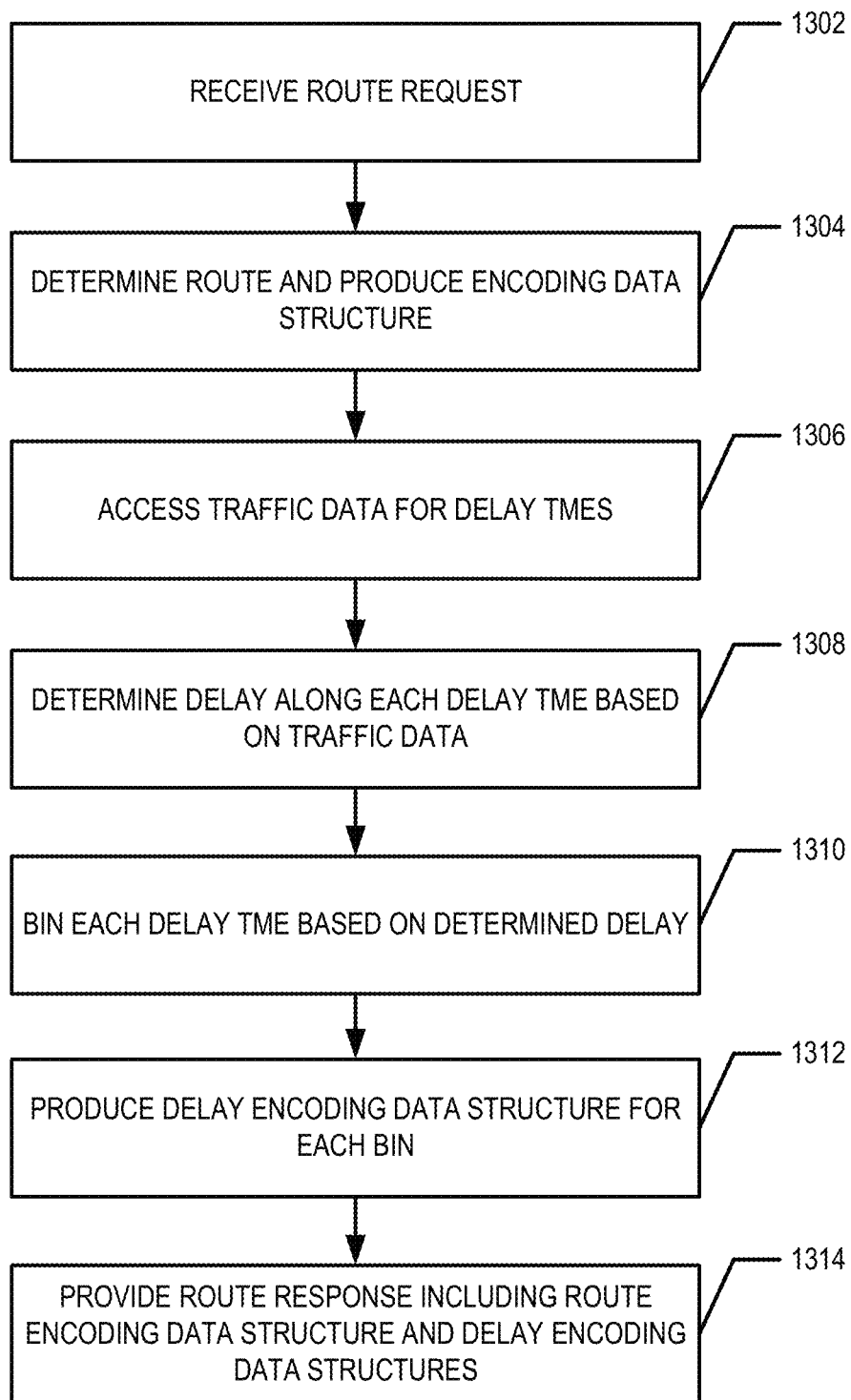
Figure 14:
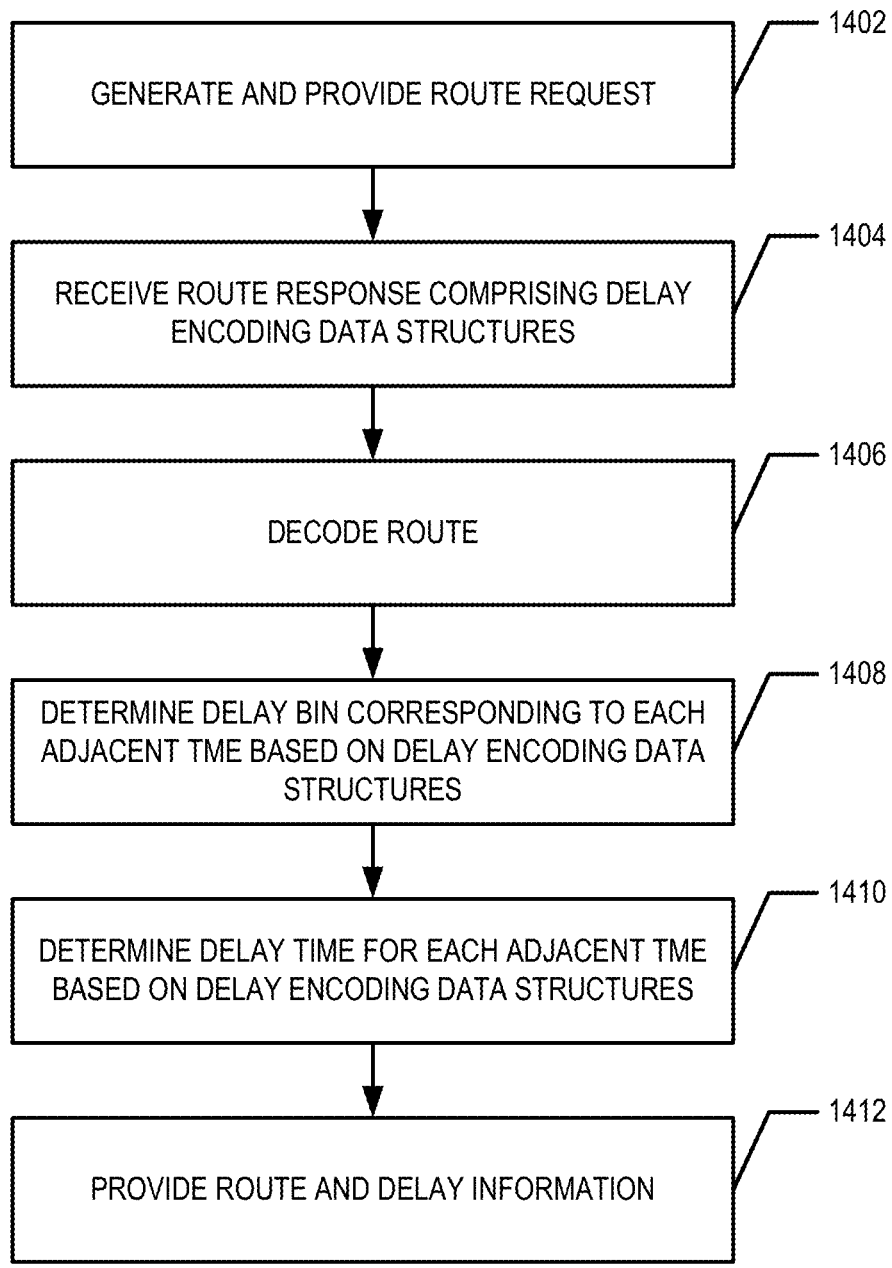
Figure 15:
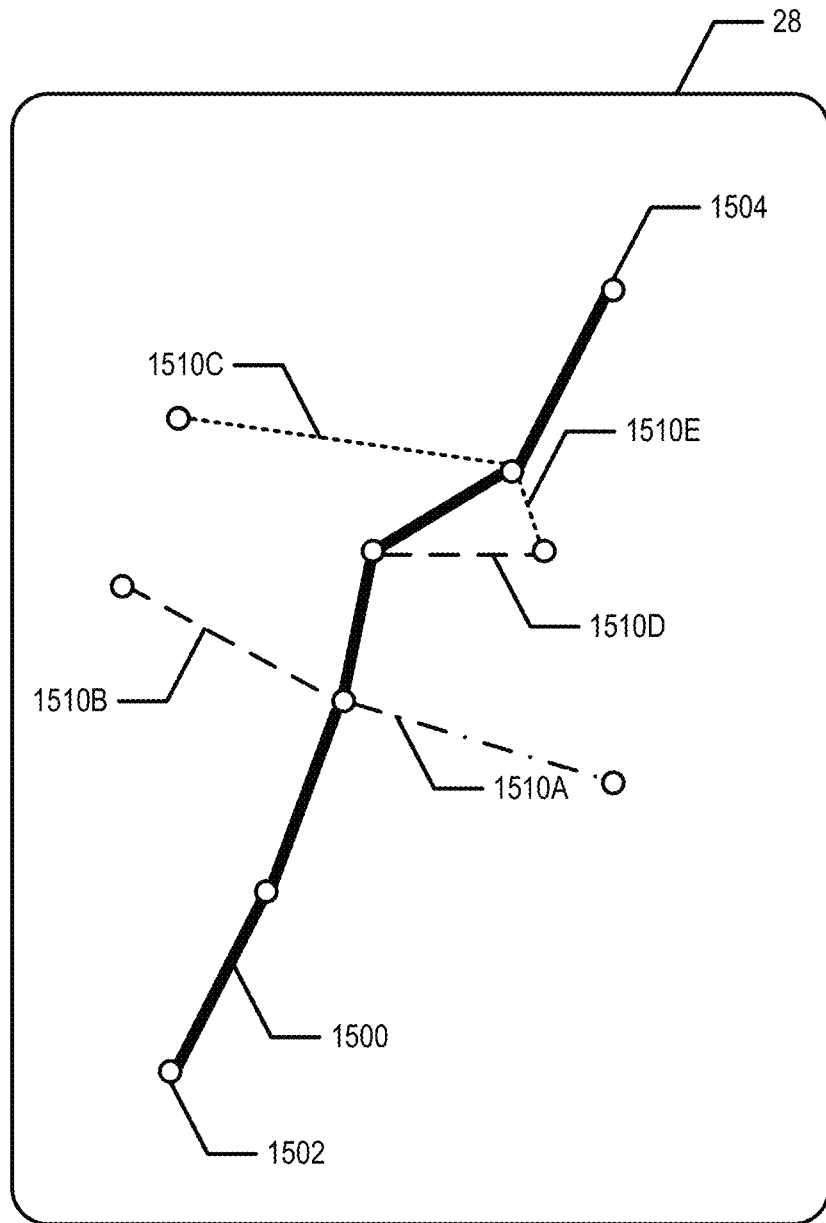
Figure 16:
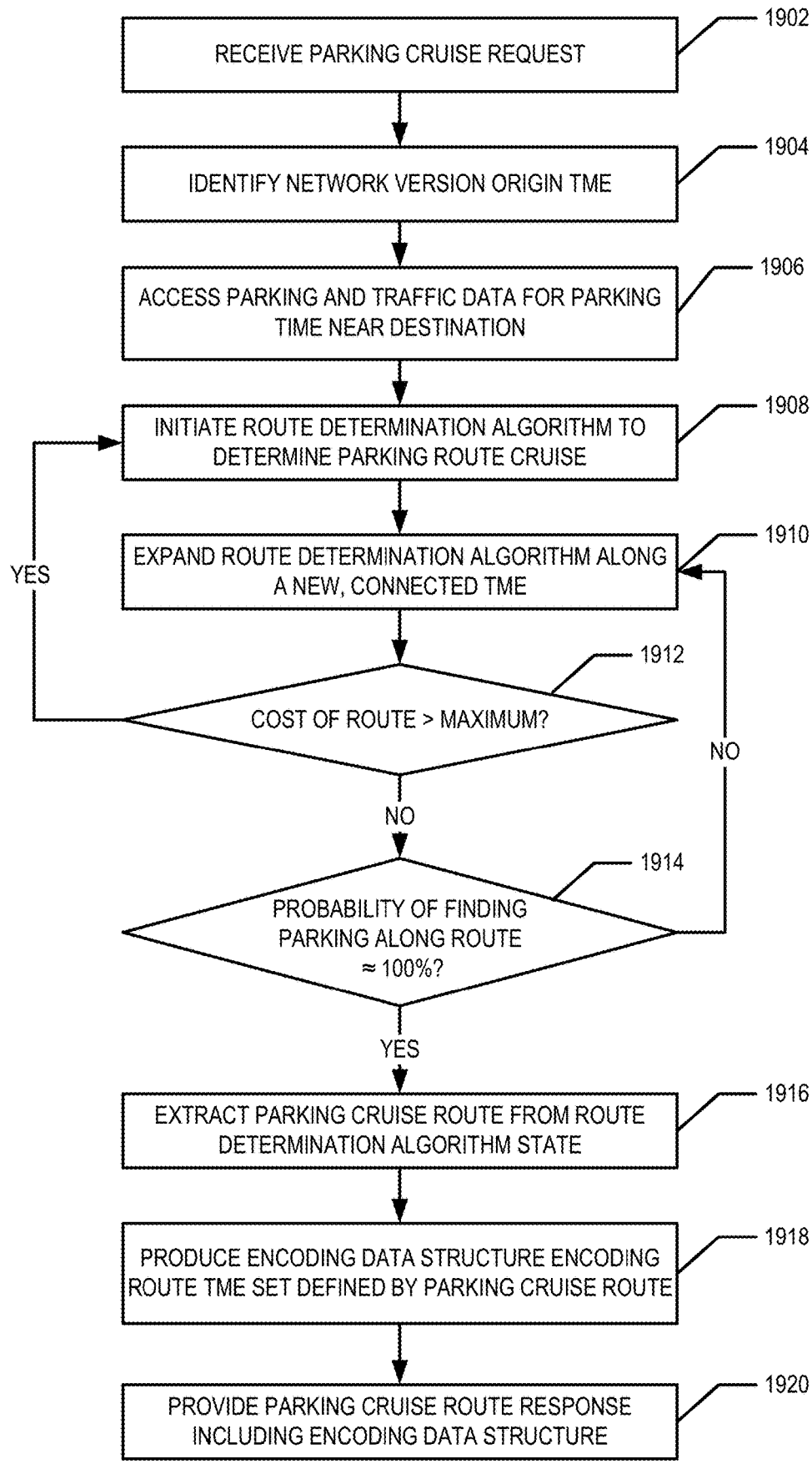
Figure 17:
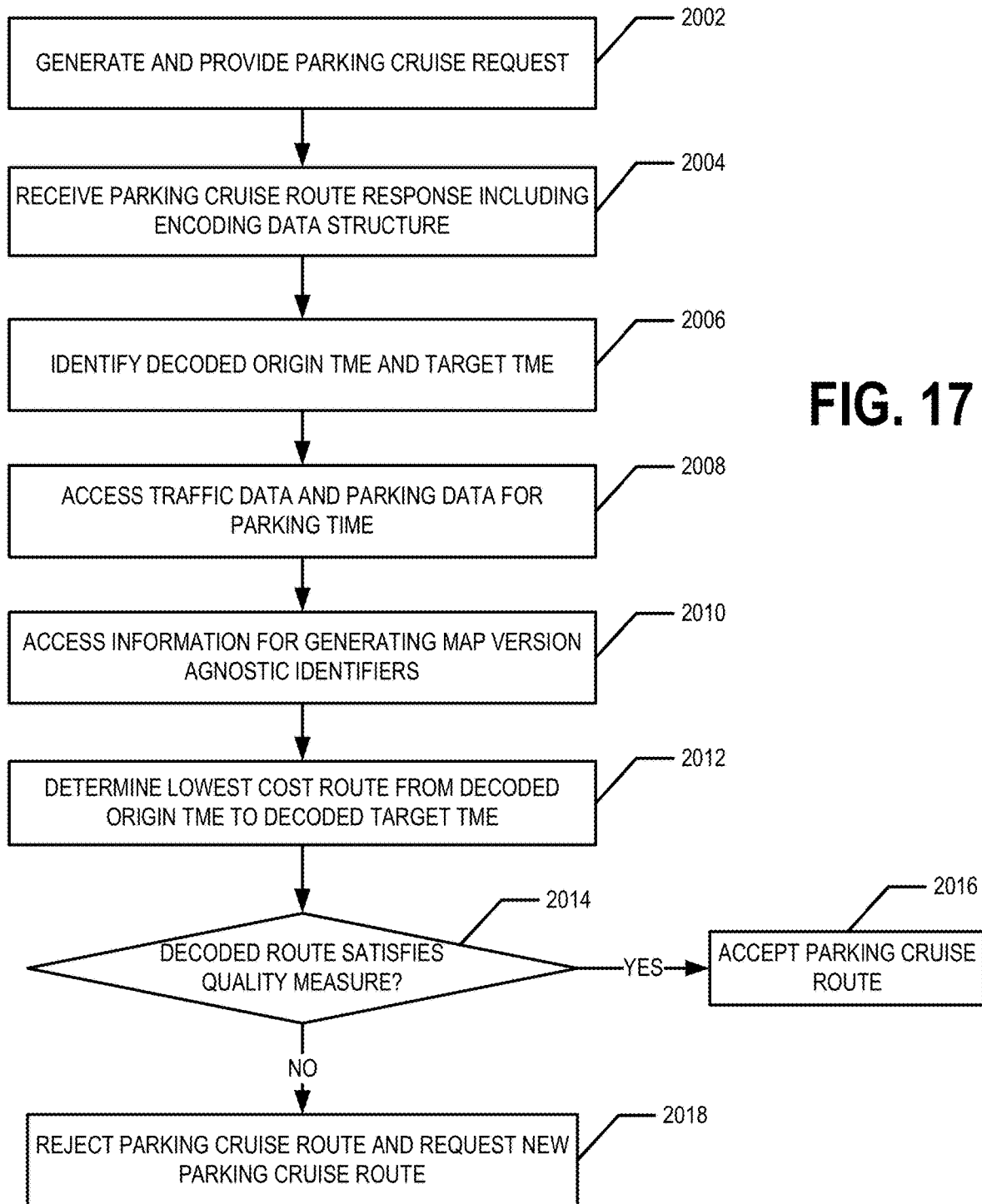
Figure 18:
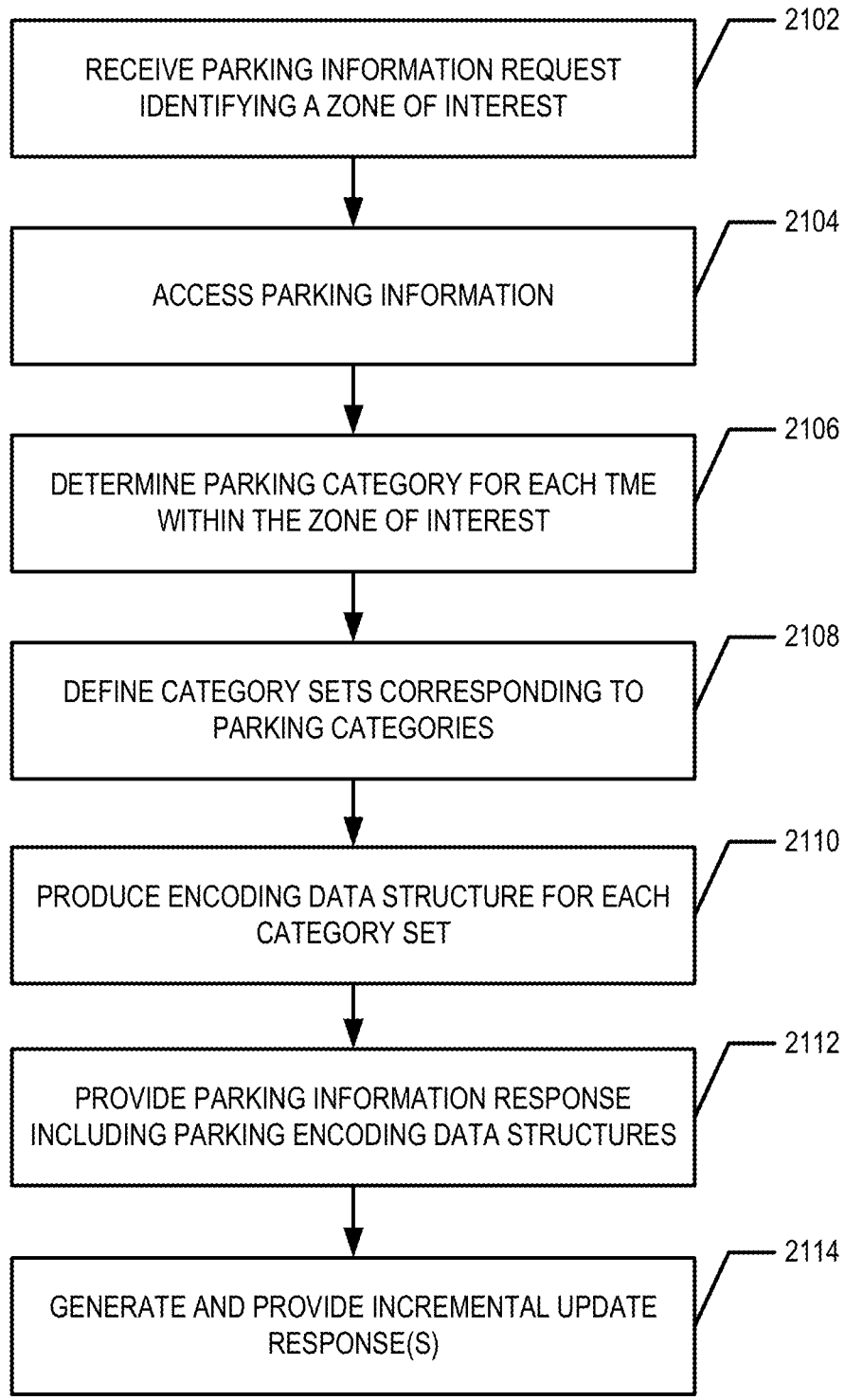
Figure 19:
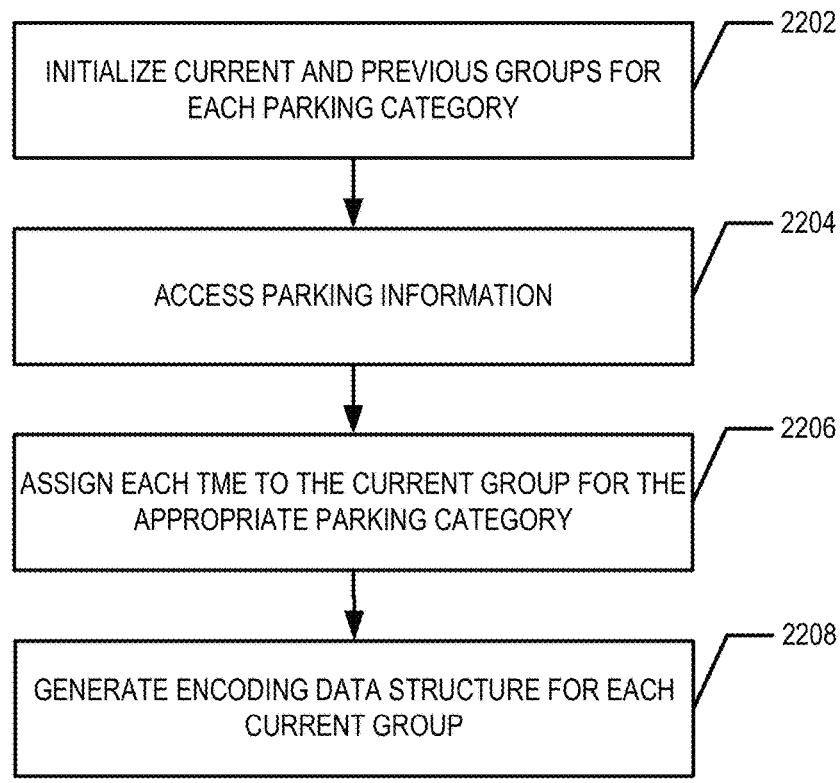
Figure 20:
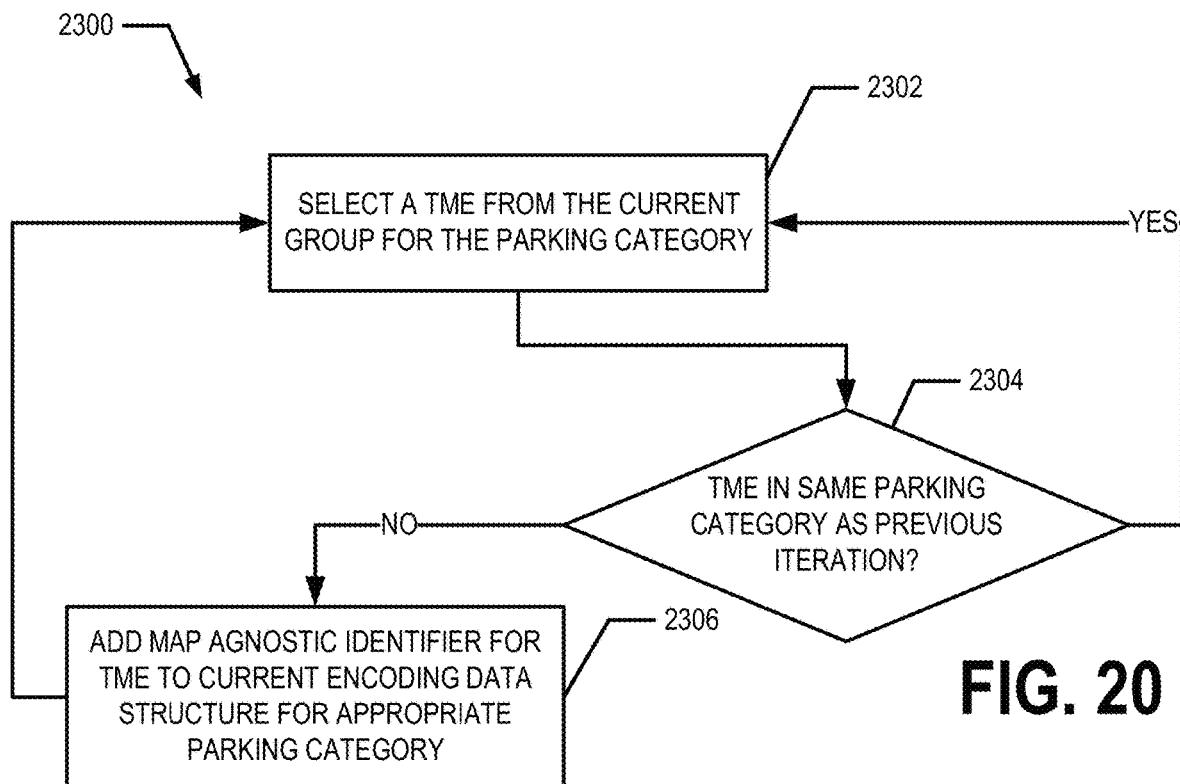
Figure 21:
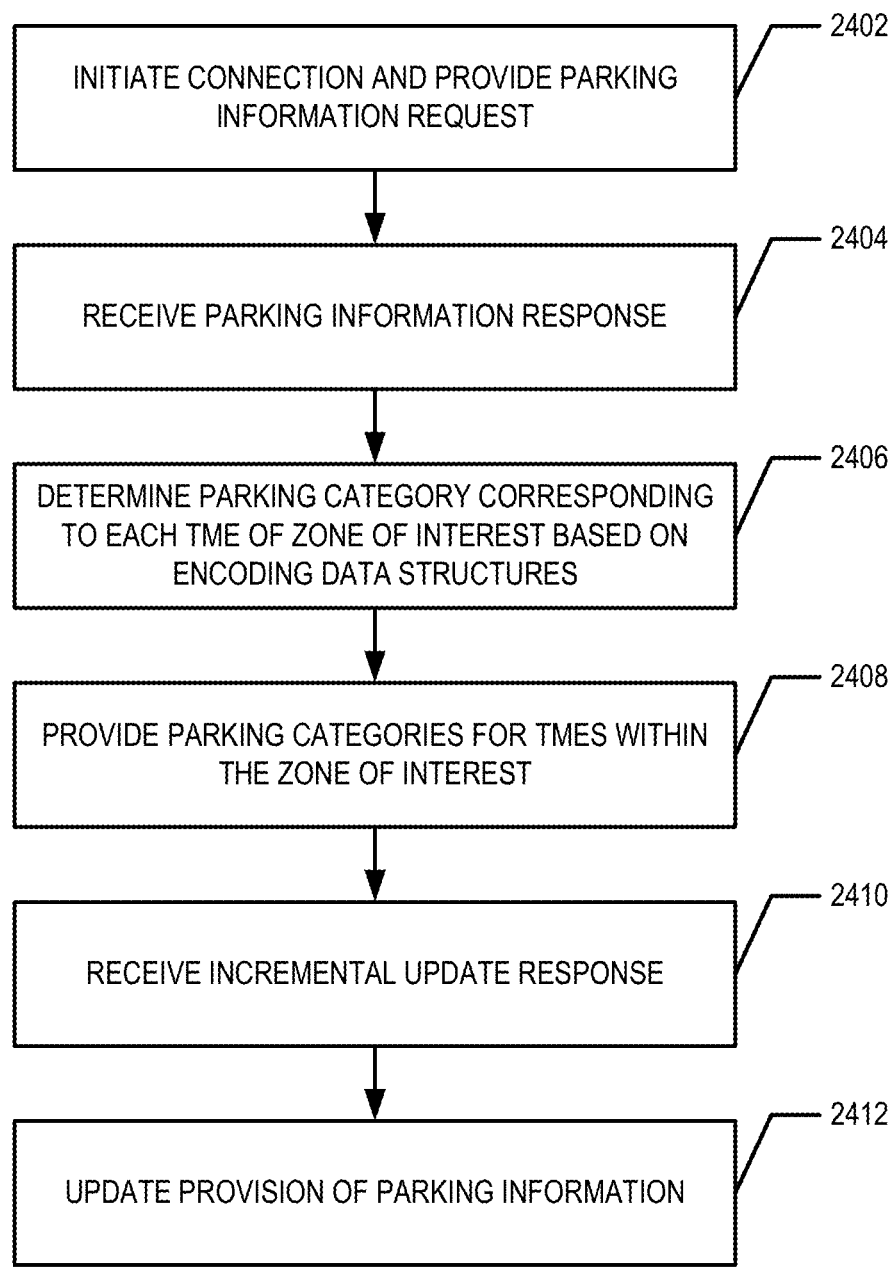
Figure 22:
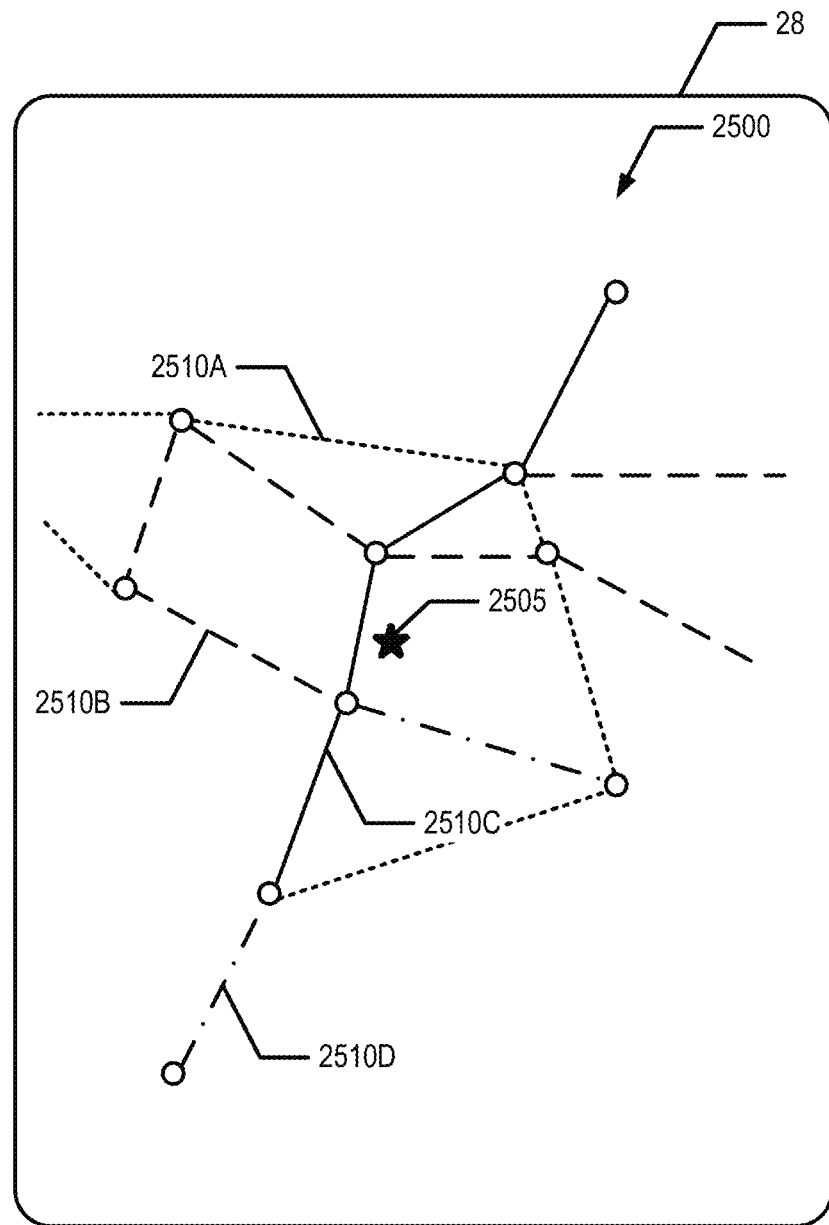

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment; and FIG. 2B is a block diagram of a mobile apparatus that may be specifically configured in accordance with an example embodiment;

FIG. 3 is a flowchart illustrating operations performed, such as by the network apparatus of FIG. 2A to produce a bloom filter, in accordance with an example embodiment;

FIG. 4 is a flowchart illustrating operations performed, such as by the network apparatus of FIG. 2A to produce a subtree data structure, in accordance with an example embodiment;

FIG. 5 is a flowchart illustrating operations performed, such as by the network apparatus of FIG. 2A to build the subtree data structure, in accordance with an example embodiment;

FIG. 6 illustrates an example subtree data structure and a table showing the corresponding bit values of the set elements encoded in the subtree data structure, in accordance with an example embodiment;

FIG. 7 is a flowchart illustrating operations performed, such as by the network apparatus of FIG. 2A to provide a route response, in accordance with an example embodiment;

FIG. 8 is a flowchart illustrating operations performed, such as by the mobile apparatus of FIG. 2B to decode a route based on a route TME set encoded by a bloom filter, in accordance with an example embodiment;

FIG. 9 is a flowchart illustrating operations performed, such as by mobile apparatus of FIG. 2B to determine a cost value for a TME based on an EDS, in accordance with an example embodiment;

FIG. 10A illustrates an example route, in accordance with an example embodiment; and FIG. 10B illustrates a process performed to generate a decoded route based on a bloom filter encoding a route TME set defined by the route shown in FIG. 10A, in accordance with an example embodiment;

FIG. 11 is a flowchart illustrating operations performed, such as by the network apparatus of FIG. 2A to provide a multiple stop route response, in accordance with an example embodiment;

FIG. 12 is a flowchart illustrating operations performed, such as by the mobile apparatus of FIG. 2B to decode legs of a multiple stop route based on a received multiple stop route response, in accordance with an example embodiment;

FIG. 13 is a flowchart illustrating operations performed, such as by the network apparatus of FIG. 2A to provide a route response including additional traffic information/data, in accordance with an example embodiment;

FIG. 14 is a flowchart illustrating operations performed, such as by the mobile apparatus of FIG. 2B to decode and use additional traffic information/data, in accordance with an example embodiment;

FIG. 15 is an example interactive user interface (IUT) of a user interface of a mobile apparatus of FIG. 2B providing a route and corresponding additional traffic information/data, in accordance with an example embodiment;

FIG. 16 is a flowchart illustrating operations performed, such as by the network apparatus of FIG. 2A to provide a parking cruise route response, in accordance with an example embodiment;

FIG. 17 is a flowchart illustrating operations performed, such as by the mobile apparatus of FIG. 2B to decode and use a parking cruise route, in accordance with an example embodiment;

FIG. 18 is a flowchart illustrating operations performed, such as by the network apparatus of FIG. 2A, to provide a parking information response with incremental updates, in accordance with an example embodiment;

FIG. 19 is a flowchart illustrating operations performed, such as by the network apparatus of FIG. 2A, for generating EDSs encoding parking information, in accordance with an example embodiment;

FIG. 20 is a flowchart illustrating operations performed, such as by the network apparatus of FIG. 2A, for generating incremental update EDSs encoding incremental updates to parking information, in accordance with an example embodiment;

FIG. 21 is a flowchart illustrating operations performed, such as by the mobile apparatus of FIG. 2B, to decode and use parking information, in accordance with an example embodiment; and FIG. 22 is an example interactive user interface (IUT) of a user interface of a mobile apparatus of FIG. 2B providing a categorical information for TMEs, such as likelihood of finding parking along a TME, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, and computer program products are provided in accordance with various embodiments in order to provide a set of TMEs encoded in a map version agnostic manner, provide (e.g., transmit) the encoded set of TMEs in a bandwidth efficient manner, and to decode and use the set of TMEs encoded in a map version agnostic manner to perform one or more navigation functions. For example, example embodiments, provide a route TME set or one or more categorical TME sets encoded in a map version agnostic manner, provide (e.g., transmit) an encoded route TME set and/or categorical TME set(s) in a bandwidth efficient manner, and to generate and use a decoded route based on a route TME set that was encoded in a map version agnostic manner or decode the categorical TME set(s) that was encoded in a map version agnostic manner for use in one or more navigation functions. Methods, apparatus, and computer program products are provided in accordance with various embodiments in order to provide incremental updates to information/data corresponding to TMEs (e.g., parking availability information/data) encoded in a map version agnostic manner, provide (e.g., transmit) encoded incremental updates to information/data corresponding to TMEs, and to generate and use decoded information/data corresponding to TMEs.

For example, various embodiments provide for encoding a route TME set or categorical TME set using map version agnostic identifiers configured to identify the TMEs that make up the route and categorical group that is encoded into an EDS (e.g., a bloom filter, subtree data structure, and/or the like), such that the encoded route TME set or encoded categorical TME set may be transmitted as a bit array. In various embodiments, the encoding may be performed such that the resulting EDS is the smallest EDS that is satisfied by route TMEs of the route (e.g., the coded map version agnostic identifiers of the TMEs of the TME set are members of the EDS) and that is not satisfied by TMEs of a test set (e.g., coded map version agnostic identifiers of TMEs in the test set are not members of the EDS). In an example embodiment, the TMEs of the test set are not TMEs in the TME set being encoded in the EDS. For example, when the TME set being encoded is a route TME set (e.g., consists of TMEs of a route), the test set may comprise adjacent TMEs. As used herein, an adjacent TME is a TME that intersects a route, but that is not part of the route.

In various embodiments, the EDSs may be generated that encode a route (e.g., a route TME set). In various embodiments, EDSs may be generated that encode categorical information/data regarding adjacent TMEs, TMEs within a zone of interest, and/or the like. For example, the categorical information/data may include parking availability information (e.g., an indication of whether the expected availability of parking along a TME is low, medium or high, for example), delay information/data (e.g., number of minutes of delay expected if an adjacent TME is traveled along rather than a route TME), and/or the like.

For example, a mobile apparatus may have a mobile version of a digital map stored in memory of the mobile apparatus. For example, the mobile apparatus may provide an information request corresponding to a zone of interest. In another example, the mobile apparatus may provide a route request including information identifying a starting location and a target location for a route. The information identifying the starting location and target location for the route is map version agnostic, in various embodiments. For example, the starting location may be provided as the midpoint and z-level of a mobile version origin TME corresponding to the current location/position of the mobile apparatus and/or a user provided location. The midpoint of a TME is the coordinate pair (e.g., latitude and longitude) of the point that is approximately halfway down the TME, where the ends of the TME are defined by intersections or nodes. For example, the midpoint of a TME is a point in the middle of the TME between the two intersections that define the ends of the TME. The z-level of a TME describes the relative location of roads that are stacked. For most TMEs, the z-level is 0 (e.g., unstacked and/or on ground level), however, for tunnels the z-level might be negative and for stacked roads/bridges z-level might be positive. For example, the target location for the route may be provided as the midpoint and z-level of a mobile version target TME corresponding to a user provided destination of the route and/or a predicted destination of the route.

For example, a network apparatus may have a network version of the digital map stored in memory of the network apparatus. In various situations, the mobile version and the network version may be different versions of the digital map. The network apparatus may receive the route request provided by the mobile apparatus and identify a network version origin TME corresponding to the starting location and a network version target TME corresponding to the target location. The network apparatus may then determine a route from the network version origin TME to the network version target TME using the network version of the digital map. In various embodiments, the network apparatus may determine the route using a best-first algorithm (e.g., Dijkstra's algorithm and/or a modified Dijkstra's algorithm) or another route determination algorithm. In various embodiments, the route determination algorithm is configured to determine a lowest cost route. In various embodiments, the route may be determined as an ordered list or set of route TMEs of the network version of the digital map to be traversed from the network version origin TME to the network version target TME. For example, the ordered list or set of route TMEs may comprise an ordered list of TME identifiers that identify the route TMEs in the network version of the digital map. The route TMEs of the ordered list or set of route TMEs define a route TME set. For example, the route TME set is a set having as members only the route TMEs of the ordered list or set of route TMEs.

The network apparatus may then encode the route TME set by determining, generating, and/or accessing map version agnostic identifiers for each of the route TMEs of the route TME set. For example, the map version agnostic identifier for a TME may be a particular element and/or particular combination of elements of map version agnostic map information/data corresponding to the TME. In various embodiments, map version agnostic map information/data is map information/data that is not expected to change between map versions of the digital map. For example, the map version agnostic map information/data may include a road name, TME length, a direction of travel of a TME, a functional class of a TME, speed limit, and/or the like. A set S is defined that consists of a map version agnostic identifier for each of the route TMEs of the route TME set (and/or for each TME of the TME set to be encoded). For example, the number of elements in the set S is equal to the number of route TMEs of the route. Each element of the set S (e.g., the map version agnostic identifiers for each of the route TMEs) may then be coded using one or more coding functions and added to an EDS (e.g., bloom filter, subtree data structure, and/or the like). The EDS may then be used to test one or more coded map version agnostic identifiers corresponding to test TMEs to determine if it is possible for the one or more map version agnostic identifiers corresponding to the test TMEs to be elements of the set S. For example, the EDS may be used to test whether one or more TMEs are route TMEs of the route (if a TME may be a member of the route TME set).

The network apparatus may then provide an information response or a route response in response to the request where the response comprises the EDS such that the mobile apparatus receives the response. In various embodiments, the mobile apparatus may then use the EDS and the mobile version of the digital map to decode the route or the TMEs of a category. In an example embodiment, the mobile apparatus may use the EDS to assign cost values to one or more TMEs of the mobile version of the digital map or to determine a category corresponding to a TME of the mobile version of the digital map. For example, if a first TME identified by a first map version agnostic identifier is found to possibly be a member of the set S (e.g., the coded first map version agnostic identifier satisfies the EDS), the cost value assigned to the first TME is a minimal cost value (e.g., zero and/or a smaller cost value than the cost value assigned to the TMEs that are found to not be members of the set S). If the first TME is found to definitely not be a member of the set S, (e.g., the coded first map version agnostic identifier does not satisfy the EDS), the first TME is assigned a cost value based on map information/data corresponding to the first TME (e.g., a length of the first TME, an expected traversal time for the first TME which may be determined based on current or historical traffic information/data, a traffic level indicator for the first TME, and/or the like). The mobile apparatus may then use the determined and/or assigned cost values to decode the route using a best-first algorithm (e.g., Dijkstra's algorithm and/or a modified version of Dijkstra's algorithm) or another cost minimization algorithm based on the mobile version of the digital map.

The mobile apparatus may then provide the route (e.g., via a user interface), control a vehicle such that the vehicle traverses the route, and/or use the route and/or other information/data provided in the route response to perform one or more navigation functions. Some non-limiting examples of navigation functions include providing a route or information corresponding to a geographic area (e.g., via a user interface), localization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

In another example, the mobile apparatus may determine a category corresponding to one or more TMEs by determining which of one or more EDSs a coded map version agnostic identifier satisfies. The mobile apparatus may then perform one or more navigation functions using as input the category associated with at least one TME.

Thus, the route and/or TME category, while determined using the network version of the digital map may then be decoded using the mobile version of the digital map such that differences between the network version and the mobile version of the digital map may be tolerated. Additionally, the bandwidth used to provide the route and/or information response is minimized by encoding the route TME set defined by the route and/or categorical TME sets using the smallest EDS that does not provide any false positives for any of the TMEs of a test set provided as bit array.

Various embodiments provide for the determining and encoding (e.g., by a network apparatus) route TME sets for shortest distance routes, shortest expected travel time routes, multiple way point routes, routes with additional traffic information/data, routes to points of interest (POIs) identified in a POI search, parking cruise routes, and/or the like. Various embodiments provide for the decoding and use (e.g., by a mobile apparatus) of shortest distance routes, shortest expected travel time routes, multiple way point routes, routes with additional traffic information/data, routes to POIs identified in a POI search, parking cruise routes, and/or the like. Various embodiments provide for encoding categorical information/data regarding adjacent TMEs, TMEs within a zone of interest, and/or the like. For example, the categorical information/data may include parking availability information (e.g., an indication of whether the expected availability of parking along a TME is low, medium or high, for example), delay information/data (e.g., number of minutes of delay expected if an adjacent TME is traveled along rather than a route TME), and/or the like. Various embodiments provide for decoding categorical information/data regarding various TMEs. In various embodiments, the version of the digital map used to encode the information/data (e.g., the network version) and the version of the digital map used to decode the information/data (e.g., the mobile version) may be different.

FIG. 1 provides an illustration of an example system that can be used in conjunction with various embodiments of the present invention. As shown in FIG. 1, the system may include one or more network apparatuses 10, one or more mobile apparatuses 20, one or more networks 50, and/or the like. In various embodiments, a mobile apparatus 20 may be onboard a vehicle 5. In various embodiments, the mobile apparatus 20 may be an in vehicle navigation system, vehicle control system, a mobile computing device, a mobile data gathering platform, and/or the like. For example, a mobile apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the mobile apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, the mobile apparatus 20 is configured to autonomously drive a vehicle 5 may perform multiple functions that are similar to those performed by a mobile apparatus 20 configured to be an ADAS (e.g., lane keeping, lane change assistance, maintaining a lane, merging, etc.). In some embodiments, a mobile apparatus 20 may be onboard a personal vehicle, commercial vehicle, public transportation vehicle, fleet vehicle, and/or other vehicle. In various embodiments, the mobile apparatus 20 may be a smartphone, tablet, personal digital assistant (PDA), personal computer, desktop computer, laptop, and/or other mobile computing device. In an example embodiment, a mobile apparatus 20 is onboard a vehicle 5 and is used to perform one or more navigation functions corresponding to the vehicle 5 traversing at least a portion of a road network. In an example embodiment, the network apparatus 10 is a server, group of servers, distributed computing system, and/or other computing system. In an example embodiment, the network apparatus 10 is not located onboard a vehicle. For example, the network apparatus 10 may be in communication with one or more mobile apparatuses 20 and/or the like via one or more wired or wireless networks 50.

In an example embodiment, a network apparatus 10 may comprise components similar to those shown in the example network apparatus 10 diagrammed in FIG. 2A. In an example embodiment, the network apparatus 10 is configured to receive route and/or information requests generated and provided by one or more mobile apparatuses 20, determine a route based on the route request and/or categorical information/data (e.g., traffic and/or parking information/data along the route, along TMEs near the route (e.g., adjacent TMEs and/or the like), and/or in a zone of interest;

POI information/data, and/or the like), encode the route TME set defined by the route and/or categorical TME sets using an EDS, and provide a route and/or information response including the EDS such that the mobile apparatus 20 receives the route and/or information response, and/or the like. For example, as shown in FIG. 2A, the network apparatus 10 may comprise a processor 12, memory 14, a user interface 18, a communications interface 16, and/or other components configured to perform various operations, procedures, functions or the like described herein. In various embodiments, the network apparatus 10 stores a network version of a digital map (e.g., in memory 14). In at least some example embodiments, the memory 14 is non-transitory.

In an example embodiment, a mobile apparatus 20 is a mobile computing entity. For example, in various embodiments, a mobile apparatus 20 is onboard a vehicle 5. In an example embodiment, the mobile apparatus 20 may be configured to determine a current location of the mobile apparatus and/or receive user input indicating an origin of a route, receive user input indicating a destination of a route and/or predict a destination, generate and provide a route and/or information request, receive a route and/or information response, generate a decode route based on a route TME set encoded by an EDS and provided as part of the route and/or information request, determine a category associated with a TME based on categorical TME sets encoded by EDSs, and provide the decoded route and/or category information/data to a user and/or to use the decoded route to control the vehicle to traverse the decoded route from the origin to the destination. In an example embodiment, the mobile apparatus 20 is configured to determine location information/data indicating a location (e.g., geolocation such as latitude and longitude and/or the like) of the vehicle 5 and/or mobile apparatus 20.

In an example embodiment, as shown in FIG. 2B, the mobile apparatus 20 may comprise a processor 22, memory 24, a communications interface 26, a user interface 28, one or more sensors 29 (e.g., a location sensor such as a GNSS sensor; IMU sensors; camera(s); image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the mobile apparatus 20 to determine the location of the mobile apparatus 20 and/or one or more features of the corresponding vehicle's 5 surroundings and/or monitor the vehicle's 5 operating parameters), and/or other components configured to perform various operations, procedures, functions or the like described herein. In various embodiments, the mobile apparatus 20 stores a mobile version of a digital map (e.g., in memory 24). In at least some example embodiments, the memory 24 is non-transitory.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a mobile apparatus 20 may be in communication with a network apparatus 10 via the network 50. For example, a mobile apparatus 20 may communicate with the network apparatus 10 via a network, such as the Cloud. For example, the Cloud may be a computer network that provides shared computer processing resources and data to computers and other devices connected thereto. For example, the mobile apparatus 20 may be configured to provide one or more route requests via the network 50. For example, the network apparatus 10 may configured to receive one or more route requests and provide corresponding route responses via the network 50. For example, a mobile apparatus 20 may be configured to receive a route response via the network 50.

Certain example embodiments of the network apparatus 10 and/or probe apparatus 20 are described in more detail below with respect to FIGS. 2A and 2B.

II. Example Operation

Methods, apparatus, and computer program products are provided in accordance with various embodiments in order to provide a set of TMEs encoded in a map version agnostic manner, provide (e.g., transmit) the encoded set of TMEs in a bandwidth efficient manner, and to decode and use the set of TMEs encoded in a map version agnostic manner to perform one or more navigation functions. For example, example embodiments, provide a route TME set or one or more categorical TME sets encoded in a map version agnostic manner, provide (e.g., transmit) an encoded route TME set and/or categorical TME set(s) in a bandwidth efficient manner, and to generate and use a decoded route based on a route TME set that was encoded in a map version agnostic manner or decode the categorical TME set(s) that was encoded in a map version agnostic manner for use in one or more navigation functions. Methods, apparatus, and computer program products are provided in accordance with various embodiments in order to provide incremental updates to information/data corresponding to TMEs (e.g., parking availability information/data) encoded in a map version agnostic manner, provide (e.g., transmit) encoded incremental updates to information/data corresponding to TMEs, and to generate and use decoded information/data corresponding to TMEs.

For example, a mobile apparatus may store a mobile version of a digital map and a network apparatus may store a network version of a digital map. The mobile version and the network version of the digital map may be the same version or different versions of the digital map. Thus, the route and/or categorical information/data must be provided in a manner that, if the network version is a different version of the digital map than the mobile version, the mobile apparatus can still decode and use the route and/or categorical information/data. TME identifiers that identify TMEs (e.g., traversable map elements (TMEs)) of the digital map may change between different versions of the map. Thus, providing the route and/or categorical information/data simply as a list of TME identifiers (or an encoded set of TME identifiers) determined based on the network version of the digital map may result in problems when the mobile apparatus attempts to decode the route using the mobile version of the digital map. Moreover, the network 50 may be a bandwidth limited network and/or the mobile apparatus 20 may have limited connectivity to the network 50 as the mobile apparatus 20 moves around. Thus, the size of the payload of the route and/or information response may be minimized and/or maintained at a reasonable size, in various embodiments.

Various embodiments provide for encoding a route TME set using map version agnostic identifiers configured to identify the route TMEs of the route TME set defined by the route, such that the encoded route TME set may be transmitted as a bit array. Various embodiments provide for encoding various categorical information/data (e.g., delay information/data, parking information/data, and/or the like) using map version agnostic identifier configured to identify TMEs of various categories such that the encoded categorical information/data may be transmitted as one or more bit arrays. In various embodiments, the encoding may be performed such that the resulting EDS is the smallest EDS that is satisfied by route TMEs of the route TME set being encoded (e.g., the members of the EDS are coded map version agnostic identifiers of the TMEs of the route determined in response to the route request) and that is not satisfied by adjacent TMEs of the route (e.g., coded map version agnostic identifiers of adjacent TMEs are not members of the EDS and therefore are not members of the route TME set). In various embodiments, the encoding may be performed such that the resulting one or more EDSs are each the smallest EDSs that are satisfied by the TMEs of the corresponding category but not by a test set of TMEs associated with different categories. Various embodiments provide for the determining and encoding (e.g., by a network apparatus) route TME sets for shortest distance routes, shortest expected travel time routes, multiple way point routes, routes with additional traffic information/data, routes to points of interest (POIs) identified in a POI search, parking cruise routes, and/or the like. Various embodiments provide for the decoding and use (e.g., by a mobile apparatus) route TMEs sets for shortest distance routes, shortest expected travel time routes, multiple way point routes, routes with additional traffic information/data, routes to POIs identified in a POI search, parking cruise routes, and/or the like.

A. Exemplary EDSs

In various embodiments, the EDS is a space-efficient probabilistic data structure that is used to test whether an element is a member of a set. False positive matches are possible, but false negatives are not. In other words, a query of an EDS returns either "possibly in set" or "definitely not in set." In various embodiments, the encoding may be performed such that the resulting EDS is the smallest EDS that is satisfied by TMEs of a set of TMEs being encoded (e.g., the members of the EDS are coded map version agnostic identifiers configured to identify the TMEs of the set of TMEs being encoded) and that is not satisfied by TMEs of a test set (e.g., coded map version agnostic identifiers configured to identify TMEs that are not members of the EDS that are chosen for testing the EDS). In various embodiments, the EDS may be provided as a bit array such that providing (e.g., transmitting) the EDS is bandwidth efficient. For example, the bandwidth used to provide a response comprising an EDS is minimized by encoding a set of TMEs to be encoded using the smallest bit array that does not provide any false positives for any of the test TMEs. Moreover, as the EDS may be provided as a bit array, more complicated data structures (e.g., an array of TME identifiers) need not be provided to provide the set of TMEs. Two example EDSs used in various embodiments are bloom filters and subtree data structures.

i. Bloom Filters

As noted above, one example EDS is a bloom filter. An empty bloom filter is a bit array of m bits all set to 0. One or more coding functions (e.g., k coding functions) are defined and used to map or code a set element to one of the m array positions. For example, to add a set element to the bloom filter, each of the k coding functions are used to identify k array positions. The k identified array positions are set to 1. To query the bloom filter to test whether a test element is in the set, the test element is coded using each of the k coding functions to determine k array positions corresponding to the test element. If any of the k array positions corresponding to the test element are 0, the test element does not satisfy the bloom filter and test element is definitely not in the set. If all of the k array positions corresponding to the test element are in the set, then the test element satisfies the bloom filter and it is possible that the test element is a member of the set encoded to by the bloom filter.

In an example embodiment, the network apparatus initiates the bloom filter with a size m that is relatively small (e.g., the number of route TMEs in the route TME set or the number of elements in the set S) such that the probability of false positives is arbitrarily high. The bloom filter may then be tested to determine if a query of the bloom filter provides a false positive for any of the adjacent TMEs of the route. For example, the adjacent TMEs of the route may be determined, a map version agnostic identifier corresponding to each adjacent TME of the route may be determined, and a test set T may be defined that consists of the map version agnostic identifiers corresponding to the adjacent TMEs of the route. As the test set T consists of map version agnostic identifiers of adjacent TMEs and the set S consists of map version agnostic identifiers of route TMEs, there is no overlap in the membership of test set T and set S (e.g., $S \cap T = 0$). The bloom filter may then be tested to see if, when coded using the one or more coding functions, any elements of the test set T receive false positives for being elements of the set S. If a query of the bloom filter provides a false positive for any of the adjacent TMEs (e.g., a coded map version agnostic identifier from test set T is found to possibly be a member of set S), a larger bloom filter may be generated based on coding the map version agnostic identifiers of each of the route TMEs using the k coding functions or a different set of coding functions to generate a bloom filter of m+1 bits. The testing process may be repeated until a query of the bloom filter does not return any false positives for the adjacent TMEs of the route. In various embodiments, the network apparatus 10 produces a bloom filter encoding a route TME set defined by a route and/or multiple bloom filters that encode categorical TME sets. The categorical TME sets may correspond to categorical information/data associated with the corresponding TMEs. For example, the categorical TME sets may correspond to the temporal length of travel delays along TMEs, the likelihood and/or probability of finding parking (e.g., on-street parking) along a TME, and/or the like. The network apparatus 10 may provide the bloom filter such that the mobile apparatus 20 receives the bloom filter for use in decoding the route (e.g., determining or generating a decoded route) and/or decoding the categorical TME sets. FIG. 3 provides a flowchart illustrating operations performed, such as by the network apparatus 10 to produce a bloom filter encoding a route, in accordance with an example embodiment.

Starting at block 302, after a route comprising one or more route TMEs is determined from the origin TME to the target TME (e.g., a route TME set is defined), map version agnostic information/data for each of the route TMEs is accessed. For example, the network apparatus 10 may access map version agnostic information/data for each of the route TMEs. For example, the network apparatus 10 may comprise means, such as processor 12, memory 14, and/or the like for accessing map version agnostic information/data for each of the route TMEs. For example, the network apparatus 10 may store (e.g., in memory 14) a geographic database storing the map information/data of the network version of the digital map. A TME record corresponding to a route TME may be accessed and map version agnostic information/data may be extracted therefrom. In an example embodiment, elements of the TME record to be accessed are pre-established and/or defined. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed may include a road name, TME length, a direction of travel of a TME, a functional class of a TME, speed limit, and/or the like, in various embodiments.

At block 304, a set S of map version agnostic route TME identifiers are generated for each route TME of the route TME set. For example, the network apparatus 10 may generate a set S of map version agnostic route TME identifiers. For example, the network apparatus 10 may comprise means, such as the processor 12, memory 14, and/or the like, for generating a set S of map version agnostic route TME identifiers. For example, the accessed map version agnostic information/data corresponding to a route TME may be combined in a pre-established and/or defined manner to generate a map version agnostic identifier configured to identify the route TME. For example, a map version agnostic identifier for each route TME of the route TME set (e.g. each route TME of the route) may be generated and added to the set S of map version agnostic route TME identifiers. In an example embodiment, one or more elements of map version agnostic information/data corresponding to a TME may be concatenated together and then hashed using a deterministic hashing function (e.g., secure hash algorithm (SHA), MD5, Whirlpool, and/or the like) to form a map version agnostic identifier for a TME. In an example embodiment, the text string formed by concatenating elements of map version agnostic information/data may be hashed to form map version agnostic identifiers of a configurable and/or predetermined length (e.g., number of bits). For example, in an example embodiment, the map version agnostic identifier may be a text string or a hash of a text string generated by concatenating a functional class indicator and a travel direction to a road name.

At block 306, the elements of the set S of map version agnostic route TME identifiers (e.g., the map version agnostic identifier for each route TME) are coded using one or more coding functions and added to the bloom filter. For example, the network apparatus 10 may code the elements of the set S of map version agnostic route TME identifiers using one or more coding functions and adding the coded version(s) of the elements of the set S to the bloom filter. For example, the network apparatus 10 may comprise means, such as processor 12, memory 14, and/or the like, for coding each of the elements of the set S of map version agnostic route TME identifiers using one or more coding functions (e.g., k coding functions) and adding the coded version(s) of the elements of the set S to the bloom filter. In an example embodiment, the one or more coding functions include one or more hashing functions. For example, the one or more coding functions may include a deterministic hashing function such as a SHA, MD5 message-digest algorithm, and/or the like. For example, each coding function may receive a map version agnostic identifier as input and provide as output a coded version of the map version agnostic identifier. In various embodiments, the coded version of the map version agnostic identifier is an index value corresponding to an index of the bloom filter. In an example embodiment, the bloom filter is initiated as a bit array of size m with all m bits of the bit array set to zero. In various embodiments, m is a positive integer. In an example embodiment, the bloom filter is initiated with a size that is relatively small (e.g., m equal to the number of route TMEs in the route TME set and/or the number of elements in the set S) such that the probability of false positives is arbitrarily high. The coded version of the map version agnostic identifier is added to the bloom filter by setting a bit of the bit array of the bloom filter corresponding to the index value equal to 1. Each map version agnostic identifier of the set S is coded with k coding functions and the corresponding k coded versions of the map version agnostic identifier are added to the bloom filter (e.g., by setting the index value of the corresponding position/bit in the bit array equal to 1). In various embodiments, k is a positive integer.

At block 308, the adjacent TMEs of the route are identified and map version agnostic information/data corresponding to each of the adjacent TMEs of the route is accessed. In various embodiments, an adjacent TME is a TME that intersects a route but that is not part of the route. For example, an adjacent TME is directly connected to a route TME, but is not a route TME (e.g., is associated with a same intersection or node as a route TME but is not a member of the route TME set). For example, FIG. 10B shows a route in bold line that comprises route TMEs A, B, D, Z, and L and having adjacent TMEs C, E, J, K, and M. For example, each adjacent TME shares a defining node or intersection 1006 with a route TME, but is not itself a route TME. For example, the network apparatus 10 may identify the adjacent TMEs of the route and access map version agnostic information/data for each of the adjacent TMEs. For example, the network apparatus 10 may comprise means, such as processor 12, memory 14, and/or the like for identifying the adjacent TMEs of a route and accessing map version agnostic information/data for each of the adjacent TMEs. For example, the network apparatus 10 may store (e.g., in memory 14) a geographic database storing the map information/data of the network version of the digital map. A TME record corresponding to an adjacent TME may be accessed and map version agnostic information/data may be extracted therefrom. In an example embodiment, elements of the adjacent record to be accessed are pre-established and/or defined and are the same elements that were accessed for the route TMEs. For example, the map version agnostic map information/data accessed may include a road name for the TME, TME length, a direction of travel of the TME, a functional class of the TME, speed limit associated with the TME, and/or the like, in various embodiments.

At block 310, a test set T of map version agnostic identifiers for the adjacent TMEs is generated. For example, the network apparatus 10 may generate a test set T of map version agnostic identifiers for the adjacent TMEs. For example, the network apparatus 10 may comprise means, such as the processor 12, memory 14, and/or the like, for generating a test set T of map version agnostic identifiers for the adjacent TMEs. For example, the accessed map version agnostic information/data corresponding to an adjacent TME may be combined in a pre-established and/or defined manner and, in an example embodiment, hashed to generate a map version agnostic identifier configured to identify the adjacent TME. For example, a map version agnostic identifier for each adjacent TME of the route may be generated and added to the test set T of map version agnostic identifiers for the adjacent TMEs. For example, in an example embodiment, the map version agnostic identifier may be a text string or a hash of a text string generated by concatenating a functional class indicator associated with the TME and a travel direction associated with the TME to a road name for the TME. In various embodiments, the map version agnostic identifiers for the adjacent TMEs are generated using the same combination of elements of map version agnostic map information/data as the map version agnostic identifiers for the route TMEs and, if the map version agnostic identifiers for the route TMEs were hashed, the map version agnostic identifiers for the adjacent TMEs may be hashed using the same hash function.

At block 312, it is determined if any of the elements of test set T satisfy the bloom filter. For example, the network apparatus 10 may determine if any of the elements of test set T satisfy the bloom filter. For example, the network apparatus 10 may comprise means, such as processor 12, memory 14, and/or the like for determining if any of the elements of test set T satisfy the bloom filter. For example, each element of the test set T of map version agnostic adjacent TME identifiers may be coded with the k coding functions to generate k coded versions of each map version agnostic identifier for each adjacent TME. It may be determined whether, for any of the map version agnostic identifiers of the test set T, all k of the coded versions of the map version agnostic identifier are present in the bloom filter. For example, it may be determined whether all k of the indexes/positions of the bloom filter corresponding to the k coded versions of the map version agnostic identifier of any of the adjacent TMEs of the route correspond to the value of 1 in the bit array of the bloom filter.

When it is determined that none of the elements of test set T satisfy the bloom filter, the process continues to block 314. For example, when the bloom filter does not provide a false positive for any of the adjacent TMEs (e.g., indicating that none of the adjacent TME are part of the route), the process continues to block 314. At block 314, the produced bloom filter is provided such that the route response comprising the bloom filter may be generated. For example, the network apparatus 10 may provide the bloom filter such that the route response comprising the bloom filter may be generated. For example, the network apparatus 10 may comprise means, such as processor 12, memory 14, and/or the like for providing the bloom filter such that the route response comprising the bloom filter may be generated. For example, a bloom filter producing module operating on and/or being executed by the network apparatus 10 may produce the bloom filter and then, at block 314, provide the bloom filter to a route response generation module operating on and/or being executed by the network apparatus 10.

When it is determined that at least one element of test set T satisfies the bloom filter, the process continues to block 316. For example, when the bloom filter provides a false positive for at least one of the adjacent TMEs (e.g., indicating that the at least one adjacent TME may be part of the route), the process continues to block 316. At block 316, a larger bloom filter is generated. For example, the bloom filter generated at block 306 may be of size m (e.g., be a bit array of m bits). At block 316, a bloom filter of size m+n (e.g., a bit array of m+n bits) may be generated. As used herein, n is a positive integer. In an example embodiment, n is 1, such that the minimum sized bloom filter that does not provide a false positive for any of the adjacent TMEs of the route is generated. For example, using j coding functions, the elements of the set S of map version agnostic identifiers for the route TMEs are coded using one or more encoding functions and added to the larger bloom filter. As used herein, j is a positive integer. The set of j coding functions may be the same set or a different set of coding functions as the k coding functions used to generate the original bloom filter. For example, the network apparatus 10 may generate a larger bloom filter based on the coded elements of the set S using the j coding functions. For example, the network apparatus 10 may comprise means, such as processor 12, memory 14, and/or the like, for generating a larger bloom filter based on the coded elements of the S using the j coding functions.

As should be understood, once the bloom filter of size m+n is generated, the process returns to block 312 to determine if any of the elements of test set T of the map version agnostic identifiers for the adjacent TMEs satisfy the bloom filter. For example, it is determined if the bloom filter indicates that any of the adjacent TMEs may be part of the route. Responsive to determining that the (larger) bloom filter does not indicate that any of the adjacent TMEs may be part of the route, the process will then continue to block 314 and the produced bloom filter will be provided. Responsive to determining that the (larger) bloom filter does indicate that at least one of the adjacent TMEs may be part of the route, the process returns to block 316 and a larger bloom filter is generated. For example, a bloom filter of size m+n+p, where p is a positive integer, may be generated. In an example embodiment, p is 1. The process continues until the produced bloom filter indicates that none of the adjacent TMEs are part of the route (e.g., none of the elements of test set T satisfy the bloom filter) and the produced bloom filter is provided at block 314.

In various embodiments, encoding categorical TME sets is similar to that described above with regard to encoding a route TME set. For example, when encoding a categorical TME set, the set S consists of the map version agnostic identifiers corresponding to and/or identifying the TMEs in the categorical TME set being encoded. In various embodiments, the test set T may comprise map version agnostic identifiers corresponding to and/or identifying TMEs that are adjacent to TMEs within the set S but that are not in the set S. In an example embodiment, the test set T may comprise map version agnostic identifiers corresponding to and/or identifying a random or non-random selection of TMEs within a zone of interest or within the same map tile as the zone of interest and that are not in the set S.

ii. Subtree Data Structures

Another example EDS is a subtree data structure. In an example embodiment, the subtree data structure is a prefix hash subtree and/or a prefix-compressed hash subtree. For example, to add a set element to the subtree data structure, each of K coding functions are used to identify K ordered bit values for the set element. The subtree data structure is then updated to include a node corresponding to each of the K ordered bit values for the set element with each bit value corresponding to a level of the subtree data structure. For example, a first coding function is evaluated for the set element to determine a first bit value (e.g., 0 or 1) and the subtree data structure is updated to include a node corresponding to the first bit value on the first level of the subtree data structure. A second coding function is evaluated for the set element to determine a second bit value (e.g., 0 or 1) and the subtree data structure is updated to include a node corresponding to the second bit value on the second level of the subtree data structure that is linked to and/or is a child node of the first bit value on the first level of the subtree data structure. The process continues until the subtree data structure includes a bit value corresponding to the set element for each level of the subtree data structure such that the subtree data structure may be traversed in a manner corresponding to the ordered bit values corresponding to the set element.

To query the subtree data structure to test whether a test element is in the set, the test element is coded using each of the K coding functions to determine K ordered bit values corresponding to the test element. If the subtree data structure cannot be traversed along a path corresponding to the K ordered bit values, the test element is definitely not in the set. If the subtree data structure can be traversed along a path corresponding to the K ordered bit values, then it is possible that the test element is a member of the set S encoded by the subtree data structure. In an example embodiment, the network apparatus initiates the subtree data structure with a size (K) that is relatively small (e.g., the number of route TMEs in the route TME set) such that the probability of false positives is arbitrarily high. The EDS may then be tested to determine if a query of the subtree data structure provides a false positive for any TMEs of a test set (e.g., the adjacent TMEs of the route). If a query of the subtree data structure provides a false positive for any of the TMEs of the test set, a deeper (e.g., larger K) subtree data structure may be generated based on coding the map version agnostic identifiers of each of the route segments using the K coding functions or a different set of coding functions to generate a larger/deeper EDS. For example, a subtree data structure with K+1 levels may be generated. The testing process may be repeated until a query of the subtree data structure does not return any false positives for the TMEs of the test set.

In an example embodiment, the network apparatus initiates the subtree data structure with a number of levels K that is relatively small (e.g., the number of route TMEs in the route TME set or the number of elements in the set S) such that the probability of false positives is arbitrarily high. The subtree data structure may then be tested to determine if a query of the subtree data structure provides a false positive for any TMEs of a test set of TMEs. For example, the test set may include the adjacent TMEs of the route. For example, the adjacent TMEs of the route may be determined, a map version agnostic identifier corresponding to each adjacent TME of the route may be determined, and a test set T may be defined that consists of the map version agnostic identifiers corresponding to the adjacent TMEs of the route. In an example embodiment, as the test set T consists of map version agnostic identifiers of adjacent TMEs and the set S consists of map version agnostic identifiers of route TMEs, there is no overlap in the membership of test set T and set S (e.g., S∩T=0). In an example embodiment, the test set T may be constructed such that the test set T and the set S have no overlap in membership. The subtree data structure may then be tested to see if, when coded using the one or more coding functions, any elements of the test set T receive false positives for being elements of the set S. For example, it may be determined whether a path corresponding to the ordered bit values generated by coding the map version agnostic identifiers of a TME of the test set T using the K coding functions is present in the subtree data structure. If a query of the subtree data structure provides a false positive for any of the adjacent TMEs (e.g., a coded map version agnostic identifier from test set T is found to possibly be a member of set S), a deeper subtree data structure may be generated based on coding the map version agnostic identifiers of each of the route TMEs using the K+1 coding functions or a different set of coding functions to generate a subtree data structure having K+1 levels. The testing process may be repeated until a query of the subtree data structure does not return any false positives for the TMEs of the test set T (e.g., adjacent TMEs of the route).

In various embodiments, the network apparatus 10 produces a subtree data structure encoding a route TME set defined by a route and/or multiple subtree data structures that encode categorical TME sets. The categorical TME sets may correspond to categorical information/data associated with the corresponding TMEs. For example, the categorical TME sets may correspond to the temporal length of travel delays along TMEs, the likelihood and/or probability of finding parking (e.g., on-street parking) along a TME during a particular time frame, and/or the like. The network apparatus 10 may provide the subtree data structure(s) such that the mobile apparatus 20 receives the subtree data structure(s) for use in decoding the route (e.g., determining or generating a decoded route) and/or decoding the categorical TME sets. FIG. 4 provides a flowchart illustrating operations performed, such as by the network apparatus 10 to produce a subtree data structure encoding a route, in accordance with an example embodiment.

Starting at block 402, after a route comprising one or more route TMEs is determined from the origin TME to the target TME (e.g., a route TME set is defined), map version agnostic information/data for each of the route TMEs is accessed. For example, the network apparatus 10 may access map version agnostic information/data for each of the route TMEs. For example, the network apparatus 10 may comprise means, such as processor 12, memory 14, and/or the like for accessing map version agnostic information/data for each of the route TMEs. For example, the network apparatus 10 may store (e.g., in memory 14) a geographic database storing the map information/data of the network version of the digital map. A TME record corresponding to a route TME may be accessed and map version agnostic information/data may be extracted therefrom. In an example embodiment, elements of the TME record to be accessed are pre-established and/or defined. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed may include a road name associated with the TME, TME length, a direction of travel of the TME, a functional class of the TME, speed limit associated with the TME, and/or the like, in various embodiments.

At block 404, a set S of map version agnostic identifiers is generated that includes a map version agnostic identifier for each route TME of the route. For example, the network apparatus 10 may generate a set S of map version agnostic route TME identifiers. For example, the network apparatus 10 may comprise means, such as the processor 12, memory 14, and/or the like, for generating a set S of map version agnostic route TME identifiers. For example, the accessed map version agnostic information/data corresponding to a route TME may be combined in a pre-established and/or defined manner to generate a map version agnostic identifier configured to identify the route TME. For example, a map version agnostic identifier for each route TME of the route TME set (e.g. each route TME of the route) may be generated and added to the set S of map version agnostic identifiers for the route TMEs. For example, in an example embodiment, the map version agnostic identifier for a TME may be a text string or a hash of a text string generated by concatenating a functional class indicator for the TME and a travel direction associated with the TME to a road name associated with the TME.

At block 406, the elements of the set S of map version agnostic identifiers for the route TMEs (e.g., the map version agnostic identifier for each route TME) are coded using one or more coding functions and added to the subtree data structures. For example, the network apparatus 10 may code the elements of the set S of map version agnostic identifiers for the route TMEs using one or more coding functions and add paths corresponding to the coded version(s) of the elements of the set S to the subtree data structure. For example, the network apparatus 10 may comprise means, such as processor 12, memory 14, and/or the like, for coding each of the elements of the set S of map version agnostic identifiers for the route TMEs using one or more coding functions and adding paths corresponding to the coded version(s) of the elements of the set S to the subtree data structure. For example, each coding function may receive a map version agnostic identifier as input and provide as output a coded version of the map version agnostic identifier. In various embodiments, the coded versions of the map version agnostic identifier comprises ordered bit values, where each bit value corresponds to a node and/or leaf of a corresponding level of the subtree data structure. In an example embodiment, the subtree data structure is initiated as a tree having K levels. In various embodiments, K is a positive integer. In an example embodiment, the subtree data structure is initiated with a size (e.g., number of levels) that is relatively small (e.g., K equal to the number of route TMEs in the route TME set and/or the number of elements in the set S) such that the probability of false positives is arbitrarily high. Each map version agnostic identifier of the set S is coded with K coding functions to generate K ordered bit values and paths corresponding to the coded versions of the map version agnostic identifiers (e.g., the K ordered bit values for each route TME) are added to the subtree data structure. In an example embodiment, the one or more coding functions include one or more hashing functions. For example, the one or more coding functions may include a deterministic hashing function such as a SHA, MD5 message-digest algorithm, and/or the like. In an example embodiment, the K coding functions are a hash function configured to receive a salt. In an example embodiment, the K coding functions are the same hash function with different salts. For example, the salt for a hash function may be and/or be determined based on the corresponding level of the subtree data structure. For example, the salt for level two of the subtree data structure may be the number two or a value determined by taking a hash of the number two using a hash function. In an example embodiment, the result of acting on map version agnostic identifier with a coding function is a multiple bit value and a particular bit (e.g., the first bit, last bit, third bit, and/or the like) is taken as the bit value for the corresponding level.

At block 408, the adjacent TMEs of the route are identified and map version agnostic information/data corresponding to each of the adjacent TMEs of the route is accessed. In various embodiments, an adjacent TME is a TME that intersects a route but that is not part of the route. For example, an adjacent TME is directly connected to a route TME, but is not a route TME (e.g., is associated with a same intersection or node as a route TME but is not a member of the route TME set). For example, the network apparatus 10 may identify the adjacent TMEs of the route and access map version agnostic information/data for each of the adjacent TMEs. For example, the network apparatus 10 may comprise means, such as processor 12, memory 14, and/or the like for identifying the adjacent TMEs of a route and accessing map version agnostic information/data for each of the adjacent TMEs. For example, the network apparatus 10 may store (e.g., in memory 14) a geographic database storing the map information/data of the network version of the digital map. A TME record corresponding to an adjacent TME may be accessed and map version agnostic information/data may be extracted therefrom. In an example embodiment, elements of the adjacent TME record to be accessed are pre-established and/or defined and are the same elements that were accessed for the route TMEs. For example, the map version agnostic map information/data accessed may include a road name associated with the TME, TME length, a direction of travel of the TME, a functional class of the TME, speed limit associated with the TME, and/or the like, in various embodiments.

At block 410, a test set T of map version agnostic adjacent TME identifiers are generated. For example, the network apparatus 10 may generate a test set T of map version agnostic adjacent TME identifiers. For example, the network apparatus 10 may comprise means, such as the processor 12, memory 14, and/or the like, for generating a test set T of map version agnostic adjacent TME identifiers. For example, the accessed map version agnostic information/data corresponding to an adjacent TME may be combined in a pre-established and/or defined manner to generate a map version agnostic identifier configured to identify the adjacent TME. For example, a map version agnostic identifier for each adjacent TME of the route may be generated and added to the test set T of map version agnostic adjacent TME identifiers. For example, in an example embodiment, the map version agnostic identifier may be a text string generated by concatenating a functional class indicator associated with the adjacent TME and a travel direction associated with the adjacent TME to a road name associated with the adjacent TME. In various embodiments, the map version agnostic identifiers for the adjacent TMEs are generated using the same combination of elements of map version agnostic map information/data as the map version agnostic identifiers for the route TMEs and, if the map version agnostic identifiers for the route TMEs were hashed, the map version agnostic identifiers for the adjacent TMEs may be hashed using the same hash function.

At block 412, it is determined if any of the elements of test set T satisfy the subtree data structure. For example, the network apparatus 10 may determine if any of the elements of test set T satisfy the subtree data structure. For example, the network apparatus 10 may comprise means, such as processor 12, memory 14, and/or the like for determining if any of the elements of test set T satisfy the subtree data structure. For example, each element of the test set T of map version agnostic identifiers for the adjacent TMEs may be coded with the K coding functions to generate K ordered bit values corresponding to the test element. If the subtree data structure cannot be traversed along a path corresponding to the K ordered bit values, the test element does not satisfy the subtree data structure. If the subtree data structure can be traversed along a path corresponding to the K ordered bit values, then the test element does satisfy the subtree data structure.

When it is determined that none of the elements of test set T satisfy the subtree data structure, the process continues to block 414. For example, when the subtree data structure does not provide a false positive for any of elements of the test set T such as the adjacent TMEs (e.g., indicating that none of the adjacent TME are part of the route), the process continues to block 414. At block 414, the produced subtree data structure is provided such that the route response comprising the subtree data structure may be generated. For example, the network apparatus 10 may provide the subtree data structure such that the route response comprising the subtree data structure may be generated. For example, the network apparatus 10 may comprise means, such as processor 12, memory 14, and/or the like for providing the subtree data structure such that the route response comprising the subtree data structure may be generated. For example, a subtree data structure producing module operating on and/or being executed by the network apparatus 10 may produce the subtree data structure and then, at block 414, provide the subtree data structure to a route response generation module operating on and/or being executed by the network apparatus 10.

When it is determined that at least one element of test set T satisfies the subtree data structure, the process continues to block 416. For example, when the subtree data structure provides a false positive for at least one of the elements of the test set T (e.g., indicating that the at least one adjacent TME may be part of the route), the process continues to block 416. At block 416, a deeper subtree data structure is generated. For example, the subtree data structure at block 406 may have K levels. At block 416, a subtree data structure having K+n levels may be generated. As used herein, n is a positive integer. In an example embodiment, n is 1, such that the subtree data structure with the least number of levels that does not provide a false positive for any of the test elements of the test set T (e.g., set of map version agnostic identifiers for the adjacent TMEs of the route) is generated. For example, using coding functions corresponding to the one or more levels being added to the subtree data structure, bit values corresponding to the one or more new levels of the subtree data structure may be determined by applying the appropriate coding functions to the elements of the set S of map version agnostic identifiers for the route TMEs (e.g., the map version agnostic identifier for each route TME). For example, a bit value corresponding to a new level of the subtree data structure for a route TME may be determined by executing a hash function based on the map version agnostic identifier for the route TME and a salt corresponding to the new level (e.g., equal to the level number and/or determined based thereon). For example, the network apparatus 10 may generate a deeper subtree data structure based on the ordered bit values determined by coding the elements of the set S using the coding functions. For example, the network apparatus 10 may comprise means, such as processor 12, memory 14, and/or the like, for generating a deeper subtree data structure based on the ordered bit values determined by coding the elements of the set S using the coding functions.

As should be understood, once the subtree data structure having K+n levels is generated, the process returns to block 412 to determine if any of the elements of test set T of the map version agnostic adjacent TME identifiers satisfy the subtree data structure. For example, it is determined if the subtree data structure indicates that any of the test elements of test set T (e.g., the adjacent TMEs) may be part of the route. Responsive to determining that the (deeper) subtree data structure does not indicate that any of the test elements of the test set T (e.g., adjacent TMEs) may be part of the route, the process will then continue to block 414 and the produced subtree data structure will be provided. Responsive to determining that the (deeper) subtree data structure does indicate that at least one of the test elements of the test set T may be part of the route, the process returns to block 416 and a deeper subtree data structure is generated. For example, a subtree data structure having K+n+p levels, where p is a positive integer, may be generated. In an example embodiment, p is 1. The process continues until the produced subtree data structure indicates that none of the test elements of the test set T (e.g., adjacent TMEs) are part of the route (e.g., none of the elements of test set T satisfy the subtree data structure) and the produced subtree data structure is provided at block 414.

In various embodiments, encoding categorical TME sets is similar to that described above with regard to encoding a route TME set. For example, when encoding a categorical TME set, the categorical TME set is the set S (e.g., the set being encoded). In various embodiments, the test set T may comprise map version agnostic identifiers for TMEs that are adjacent to TMEs within the set S but that are not in the set S. In an example embodiment, the test set T may comprise map version agnostic identifiers for a random or non-random selection of TMEs within a zone of interest or within the same map tile as the zone of interest and that are not in the set S.

FIG. 5 provides a flowchart illustrating operations performed, such as by the network apparatus 10 to build a subtree data structure encoding a set of TMEs, in accordance with an example embodiment. For example, the operations illustrated in FIG. 5 may be performed during block 406 of FIG. 4, in various embodiments.

Starting at block 502, an index J is initialized. For example, an index J may be set equal to 1. For example, the network apparatus 10 may initialize an index J. For example, the network apparatus 10 may comprise means, such as processor 12, memory 14, and/or the like for initializing an index J. For example, a subtree building module operating on the network apparatus 10 (e.g., via execution of corresponding subtree building module application and/or program code by the processor 12, for example) may cause the index J to be initialized. In an example embodiment, the subtree building module is configured to receive the set S as input. In various embodiments, the set S comprises a map version agnostic identifier for each TME of a route or of a category. In various embodiments, the index J corresponds to a level of the subtree data structure.

At block 504, a bit value corresponding to level J of the subtree data structure is determined for each TME of the set S (e.g., the set of TMEs to be encoded). For example, the network apparatus 10 may determine a bit value corresponding to level J of the subtree data structure for each TME of the set S. For example, the network apparatus 10 may comprise means, such as processor 12, memory 14, and/or the like, for determining a bit value corresponding to level J of the subtree data structure for each TME of the set S. In an example embodiment, determining the bit value corresponding to level J of the subtree data structure for a map version agnostic identifier comprises evaluating a coding function corresponding to level J of the subtree based on the map version agnostic identifier. For example, the coding function corresponding to level J of the subtree data structure may be evaluated based on the map version agnostic identifier being the input of the coding function. In various embodiments, the coding function is a hash function configured to receive a salt that corresponds to the level J of the subtree data structure. In an example embodiment, the coding function is a hash function configured to generate a bit value that corresponds to and/or is equal to a particular bit of a hash generated by passing the hash function the map version agnostic identifier and the salt corresponding to level J of the subtree data structure. In an example embodiment, the salt corresponding to level J of the subtree data structure is the value of J (e.g., the salt is equal to the level of the subtree).

As the bit values for various levels of the subtree data structure are determined, ordered bit values corresponding to each TME having a map version agnostic identifier in the set S are determined. For example, FIG. 6 illustrates an example subtree data structure 605 and a table 610 of the ordered bit values corresponding to four example TMEs. The set S comprises map version agnostic identifiers for TMEs A, B, and C, and test set T comprises a map version agnostic identifier for TME D. For example, the ordered bit values for TME A indicate that the bit value for TME A corresponding to level 1 of the subtree data structure is 0, the bit value for TME A corresponding to level 2 of the subtree data structure is 0, and the bit value for the TME A corresponding to level 3 of the subtree data structure is 0. The subtree data structure 605 includes a path that corresponds to the ordered bit values for TME A such that TME A satisfies the subtree data structure 605. For example, the subtree data structure comprises a 0 node at level 1, a 0 node at level 2 that is a sub-node of the 0 node at level 1, and a 0 node at level 3 that is a sub-node of the 0 node at level 2 that is a sub-node of the 0 node at level 1. Thus, there is a path corresponding to the ordered bit values corresponding to TME A in the subtree data structure 605 such that TME A satisfies the subtree data structure 605.

Continuing with FIG. 5, at block 506, level J of the subtree data structure is generated based on the ordered bit values determined for members of the set S. For example, the network apparatus 10 may generate level J of the subtree data structure based on the ordered bit values determined for members of the set S. For example, the network apparatus 10 may comprise means, such as processor 12, memory 14, and/or the like, for generating the level J of the subtree data structure based on the ordered bit values determined for members of the set S. For example, returning to the example shown in FIG. 6, when J=1, the ordered bit values determined for members of the set S (e.g., map version agnostic identifiers corresponding to TMEs A, B, and C), indicate that level 1 of the subtree data structure should include a 0 node that is a sub-node of the root node R and a 1 node that is a sub-node of the root node R. When J=2, the ordered bit values determined for members of the set S indicate that level 2 of the subtree data structure should include a 0 node that is a sub-node of the 0 node of level 1 of the subtree data structure and a 1 node that is a sub-node of the 1 node of the level 1 of the subtree data structure. However, the ordered bit values determined for the members of the set S indicate that level 2 of the subtree data structure should not include a 1 node that is a sub-node of the 0 node of level 1 and should not include a 0 node that is a sub-node of the 1 node of level 1, as the ordered bit values for members of the set S do not include such paths. When J=3, the ordered bit values determined for members of the set S indicate that level 3 of the subtree data structure should include a 0 node that is a sub-node of the 0 node of level 2 of the subtree data structure, a 1 node that is a sub-node of the 0 node of level 2 of the subtree data structure, and a 0 node that is a sub-node of the 1 node of the level 2 of the subtree data structure. However, the ordered bit values determined for the members of the set S indicate that level 3 of the subtree data structure should not include a 1 node that is a sub-node of the 1 node of level 2 as the ordered bit values determined for members of the set S do not include such a path. Thus, level J of the subtree data structure may be generated, defined, and/or the like based on the ordered bit values determined for the members of the set S.

At block 508, it is determined if the index J is equal to the goal depth of the subtree data structure K. For example, the network apparatus 10 may determine if the index J is equal to K, such that the subtree data structure is of the goal depth (e.g., includes a goal number of levels). For example, the network apparatus 10 may comprise means, such as processor 12, memory 14, and/or the like, for determining if the index J is equal to K, such that the subtree data structure is of the goal depth (e.g., includes a goal number of levels).

When, at block 508, it is determined that the index J is not equal to the goal depth of the subtree data structure K, the process continues to block 510. At block 510, the index J is incremented and the process returns to block 504. For example, the index J may be incremented by increasing the value of J by one. For example, the network apparatus 10 may increment the index J and continue building the subtree data structure by returning to block 504. For example, the network apparatus 10 may comprise means, such as processor 12, memory 14, and/or the like for incrementing the index J and continuing to build the subtree data structure by returning to block 504.

When, at block 508, it is determined that the index J is equal to the goal depth of the subtree data structure K, the process continues to block 512. At block 512, the built subtree data structure is returned. For example, when it is determined that the subtree data structure is of the goal depth (e.g., has the K levels), the subtree data structure is returned. In various embodiments, a succinct data structure is generated that encodes and/or is based on the subtree data structure. In various embodiments, a succinct data structure is a bit string or an array of bits that encodes a binary tree or subtree. For example, a succinct data structure may be generated that encodes the subtree data structure in a bit string or bit array and the succinct data structure may be returned as the EDS. In various embodiments, the encoding the subtree data structure as a succinct data structure acts to compress the subtree data structure. For example, the succinct data structure may be a prefix-compressed hash subtree. For example, the network apparatus 10 may return the subtree data structure to be tested at block 410. For example, the network apparatus 10 may comprise means, such as processor 12, memory 14, and/or the like for returning the subtree data structure to be tested at block 410. For example, the subtree building module may provide and/or return the subtree data structure to the subtree data structure producing module.

iii. Satisfying an EDS

In various embodiments, it is determined whether a TME may be part of a set S encoded by an EDS by determining whether the TME satisfies the EDS. To determine whether a TME satisfies an EDS, map information/data may be accessed from the corresponding TME data record and a map version agnostic identifier corresponding to the TME is determined and/or generated. The map version agnostic identifier corresponding to the TME is then coded using the coding functions utilized in the generation of the EDS. For example, when the EDS is a bloom filter, the coded map version agnostic identifier comprises k array positions corresponding to the TME. If any of the k array positions corresponding to the TME are 0, the TME does not satisfy the bloom filter and TME is definitely not in the set S encoded by the bloom filter. If all of the k array positions corresponding to the TME have a value of 1, then the TME satisfies the bloom filter and it is possible that the TME is a member of the set S encoded by the bloom filter. For example, when the EDS is a subtree data structure, the coded map version agnostic identifier comprises ordered bit values corresponding to the TME. If the subtree data structure does not comprise a path corresponding to the ordered bit values corresponding to the TME, then the TME does not satisfy the subtree data structure and the TME is definitely not in the set S encoded by the subtree data structure. If the subtree data structure does include a path corresponding to the ordered bit values corresponding to the TME, then the TME does satisfy the subtree data structure, and it is possible that the TME is a member of the set S encoded by the subtree data structure.

B. Shortest Distance and Shortest Expected Travel Time Routes

In various embodiments, a shortest distance route, a shortest expected travel time route, or various other types of routes (e.g., a toll avoided route, highway avoided route, and/or the like) may be generated. For example, a mobile apparatus 20 may generate (e.g., possibly based on user input received via the user interface 28) and provide a route request for a shortest distance route or shortest expected travel time route from an starting location to a target location. The network apparatus 10 may receive the route request, determine a route based on the route request, encode a route TME set defined by the route using an EDS and map version agnostic identifiers configured to identify the route TMEs of the route, and provide a route response comprising the EDS encoding the route TME set corresponding to the route. The mobile apparatus 20 may receive the route response comprising the EDS, generate a decoded route based on the EDS, and provide the decoded route and/or control a vehicle 5 such that the vehicle traverses the decoded route.

i. Exemplary Operation of a Network Apparatus

FIG. 7 provides a flowchart illustrating operations performed, such as by the network apparatus 10 to provide a route response, in accordance with an example embodiment. Starting at block 702, a route request is received. For example, the network apparatus 10 may receive a route request. For example, the network apparatus 10 may comprise means, such as processor 12, memory 14, communications interface 16, and/or the like for receiving a route request. In various embodiments, the route request may comprise a mobile apparatus identifier identifying the mobile apparatus that provided the route request, map version agnostic information/data identifying an starting location, map version agnostic information/data identifying a target location, one or more parameters for the route (e.g., shortest distance, shortest expected travel time, avoid tolls, avoid highways, driving route, biking route, walking route, and/or the like), and/or the like. In various embodiments, the information/data identifying the starting location and the target location are independent of a version of the digital map. In an example embodiment, the information/data identifying the starting location is provided as the midpoint and z-level of a mobile version TME corresponding to the current location/position of the mobile apparatus and/or a user provided origin for the route. For example, the information/data identifying the target location for the route may be provided as the midpoint and z-level of a mobile version TME corresponding to a user provided and/or selected destination of the route and/or a predicted destination of the route.

At block 704, the origin TME and target TME of the network version of the digital map are identified. For example, the network apparatus 10 may identify the origin TME and the target TME of the network version of the digital map. For example, the network apparatus 10 may comprise means, such as processor 12, memory 14, and/or the like for identifying the origin TME and identifying the target TME of the network version of the digital map. For example, the information/data identifying the starting location may be map-matched (e.g., using a map matching algorithm, engine, and/or the like) based on the network version of the digital map to identify the origin TME of the network version of the digital map. For example, the information/data identifying the target location may be map-matched (e.g., using a map matching algorithm, engine, and/or the like) based on the network version of the digital map to identify the target TME of the network version of the digital map. In various embodiments, the information/data identifying the origin TME and/or target TME may be map-matched to the network version of the digital map such that an error up to a preset error in the matching of the midpoint corresponding to the starting/target location to the midpoint of the corresponding TME of the network version of the digital map is tolerated. For example, in an example embodiment, the midpoint corresponding to the starting/target location provided in the route request may differ from the midpoint of corresponding TME of the network version of the digital map by up to a preset error (e.g., 1 meter and/or the like) and still be considered a match to the corresponding TME of the network version of the digital map. The origin TME of the network version of the digital map is also referred to as the network version origin TME herein. Similarly, the target TME of the network version of the digital map is also referred to as the network version target TME herein. The z-level corresponding to the starting location and/or the target location may be used for tie breaking in the case where the starting location and/or target location corresponds to a tunnel, bridge, stacked roads, and/or the like. If the network apparatus cannot exactly match (e.g., within the preset error) a origin TME and/or target TME of the network version of the digital map to the information/data identifying the start and/or target location, the route response may include a flag indicating such.

At block 706, a route is determined from the origin TME to the target TME. For example, the network apparatus 10 may determine a navigable route from the origin TME to the target TME using the network version of the digital map. For example, the network apparatus 10 may comprise means, such as processor 12, memory 14, and/or the like for determining a navigable route from the origin TME to the target TME using the network version of the digital map. A variety of route determining algorithms may be used in various embodiments. In various embodiments, a route determining algorithm that uses cost values is used to determine the route. For example, a best-first algorithm may be used to determine a route from the origin TME to the target TME. For example, a modified Dijkstra's algorithm may be used to determine the route from the origin TME to the target TME. In an example embodiment, the route may be designated as an ordered list or set of route TMEs. For example, to determine the route, an ordered list or set of route TMEs (and/or TME identifiers of the network version of the digital map identifying the route TMEs) may be generated. The route TMEs of the ordered list or set of route TMEs define a route TME set (e.g., a set including only the route TMEs of the route but that may not include the order information/data of the ordered list or set of route TMEs).

In an example embodiment, the cost value assigned to a TME may be the length of the TME, the expected time to traverse the TME, a traffic level indicator, and/or the like. For example, if the route request indicated a parameter corresponding to a shortest distance route, the cost value assigned to each TME is the length of the TME. In an example embodiment, the length of a TME is determined based on a TME record stored in a geographic database storing the map information/data of the network version of the digital map. In another example, if the route request indicated a parameter corresponding to a shortest expected travel time route, the cost value assigned to each TME is the expected traversal time of the TME. In an example embodiment, the expected traversal time of a TME is determined based on a length of the TME and an expected travel speed along the TME. In an example embodiment, the length of the TME is determined based on a TME record stored in a geographic database storing the map information/data of the network version of the digital map. In an example embodiment, the expected travel speed along the TME is determined based on current traffic information/data and/or historical traffic information/data corresponding to the TME. In an example embodiment, the current traffic information/data may be determined based on probe information/data corresponding to the TME and/or a traffic report provided by a traffic management office. In an example embodiment, the historical traffic information/data may be stored in association with an epoch or time period of a day, week, month, year, and/or the like in the TME record corresponding to the TME and stored in the geographic database storing the map information/data of the network version of the digital map. In still another example, the cost value assigned to each TME may be a traffic level indicator determined based on current and/or historical traffic information/data. For example, the cost value assigned to a TME could be the inverse of the free flow ratio for the TME based on current and/or historical traffic information/data. In an example embodiment, the free flow ratio along a TME is the ratio of a travel speed along the TME (e.g., as determined based on current and/or historical traffic information/data) divided by a free flow speed for the TME.

At block 708, an EDS encoding the route TME set defined by the route from the origin TME to the target TME is produced. For example, the network apparatus 10 may produce an EDS encoding the route TME set defined by the route from the origin TME to the target TME. For example, the network apparatus 10 may comprise means, such as processor 12, memory 14, and/or the like, for producing an EDS encoding the route TME set defined by the route from the origin TME to the target TME. For example, the EDS may be produced as described with respect to FIG. 3 or FIG. 4, depending on whether the EDS is bloom filter or a subtree data structure. Thus, an EDS may be produced that encodes the map version agnostic identifiers of each of the route TMEs of the route.

At block 710, a route response is generated and provided such that the mobile apparatus 20 receives the route response. For example, the network apparatus 10 may generate and provide a route response such that the mobile apparatus 20 receives the route response. For example, the network apparatus 10 may comprise means, such as processor 12, memory 14, communication interface 16, and/or the like for generating and providing (e.g., transmitting) a route response such that the mobile apparatus 20 receives the route response. In various embodiments, the route response comprises the EDS (e.g., as a bit array). In an example embodiment, the route response comprises information/data identifying a network version starting location and information/data identifying a network version target location. In various embodiments, the information/data identifying the network version starting location and network version target location is map version agnostic. For example, in an example embodiment, the information/data identifying the network version starting location is the midpoint of (or other point along) the network version origin TME and the z-level of the network version origin TME, and the information/data identifying the network version target TME is the midpoint of (or other point along) the network version target TME and the z-level of the network version target TME. In an example embodiment, generating the route response includes determining a length of the route. For example, the length of each route TME may be summed to determine a length of the route. The length of the route may then be included in the route response, in an example embodiment.

iii. Exemplary Operation of a Mobile Apparatus

In various embodiments, a mobile apparatus 20 provides (e.g., transmits) a route request. A network apparatus 10 receives the route request, generates a route, encodes a route TME set defined by the route, and provides a route response. The mobile apparatus 20 receives the route response and then generates a decoded route based on an EDS provided by the route response. The mobile apparatus 20 may then use the decoded route to perform one or more navigation functions. Some non-limiting examples of navigation functions include providing a route or information corresponding to a geographic area (e.g., via a user interface), localization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

FIG. 8 provides a flowchart illustrating operations performed, such as by the mobile apparatus 20 to request, receive, and decode a route TME set encoded by an EDS, in accordance with an example embodiment. Starting at block 802, a route request is generated and provided such that the network apparatus 10 receives the route request. For example, the mobile apparatus 20 may generate and provide (e.g., transmit) a route request. For example, the mobile apparatus 20 may comprise means, such as processor 22, memory 24, communications interface 26, user interface 28, location sensor 29, and/or the like, for generating and providing a route request.

In various embodiments, the route request may comprise a mobile apparatus identifier identifying the mobile apparatus 20 that generated and provided the route request, map version agnostic information/data identifying a starting location, map version agnostic information/data identifying a target location, one or more parameters for the route (e.g., shortest distance, shortest expected travel time, avoid tolls, avoid highways, driving route, biking route, walking route, and/or the like), and/or the like. In various embodiments, the information/data identifying the starting location and the target location are independent of a version of the digital map.

For example, a user may interact with the user interface 28 and request a route. For example, the user may, operate the user interface 28 of mobile apparatus 20 to indicate an origin of the route, a destination of the route, and/or one or more parameters for the route (e.g., shortest distance, shortest expected travel time, avoid tolls, avoid highway, driving route, biking route, walking route, and/or the like). The user may then operate the user interface 28 to submit the user provided and/or selected information/data and to initiate the generation of the route request. In an example embodiment, the origin of the route is the current location of the mobile apparatus 20 as determined by on one or more location sensors 29 of the mobile apparatus. In another example, a mobile apparatus 20 may determine that the mobile apparatus 20 is moving and/or that a trip is expected to begin (e.g., based on historical information/data corresponding to the user and/or the mobile apparatus 20). The mobile apparatus 20 may determine a current location of the mobile apparatus (e.g., via the location sensor(s) 29) and determine a predicted destination of the route (based on past trips, information/data stored in a digital calendar corresponding to a user of the mobile apparatus 20, based on planned trips, and/or the like). The mobile apparatus 20 may then automatically initiate the generation of a route request.

As noted above, the mobile apparatus 20 may receive (e.g., via user interface 28 and/or from location sensor 29) an origin of the route. The mobile apparatus 20 may then map match the origin of the route to a TME of the mobile version of the digital map. This mobile version origin TME (e.g., a TME of a mobile version of the digital map to which the origin has been map-matched) is used to determine the map version agnostic information/data identifying the starting location. In an example embodiment, the information/data identifying the starting location is provided as the midpoint and z-level of the mobile version origin TME. The mobile apparatus may further map match the destination for the route to a TME of the mobile version of the digital map. This mobile version target TME (e.g., a TME of the mobile version of the digital map to which the destination has been map-matched) is used to determine the map version agnostic information/data identifying the target location. For example, the information/data identifying the target location for the route may be provided as the midpoint and z-level of a mobile version target TME.

At block 804, a route response is received. For example, the network apparatus 10 may generate and provide a route response, in response to the route request, and provide the route response such that the mobile apparatus 20 receives the route response. For example, the mobile apparatus 20 may receive the route response. For example, the mobile apparatus 20 may comprise means, such as processor 22, memory 24, communications interface 26, and/or the like for receiving the route response. In various embodiments, the route response comprises the EDS (e.g., as a bit array). In an example embodiment, the route response comprises information/data identifying a network version starting location and information/data identifying a network version target location. In various embodiments, the information/data identifying the network version starting location and network version target location is map version agnostic. For example, in an example embodiment, the information/data identifying the network version starting location is the midpoint of (or other point along) the network version origin TME and the z-level of the network version origin TME, and the information/data identifying the network version target TME is the midpoint of (or other point along) the network version target TME and the z-level of the network version target TME. In an example embodiment, the route response includes a route length indicating the length (e.g., in miles, kilometers, feet, meters, and/or the like) for the encoded route TME set defined by the route.

At block 806, a decoded origin TME and decoded target TME are identified. For example, the mobile apparatus 20 may identify and/or determine a decoded origin TME and a decoded target TME using the mobile version of the digital map. For example, the mobile apparatus 20 may comprise means, such as processor 22, memory 24, and/or the like, for identifying and/or determining a decoded origin TME and a decoded target TME using the mobile version of the digital map. For example, the map version agnostic information/data identifying the network version starting location may be map-matched using the mobile version of the digital map to identify a decoded origin TME corresponding to the network version starting location. Similarly, the map version agnostic information/data identifying the network version target location may be map-matched using the mobile version of the digital map to identify a decoded target TME corresponding to the network version target location. In various embodiments, the information/data identifying the decoded origin TME and/or decoded target TME may be map-matched to the mobile version of the digital map such that an error up to a preset error in the matching of the midpoint corresponding to the starting/target location to the midpoint of the corresponding TME of the mobile version of the digital map is tolerated.

At block 808, map information/data from the mobile version of the digital map for assigning cost values to TMEs of the mobile version of the digital map is accessed. For example, the mobile apparatus 20 may access map information/data from a geographic database storing map information/data of the mobile version of the digital map from memory 24.

In various embodiments, the cost value assigned to a TME is determined based on whether the TME satisfies the EDS. For example, if a coded map version agnostic identifier corresponding to a first TME satisfies the EDS, the first TME is assigned a minimal cost value. For example, the first TME may be assigned a cost value of zero. However, if the coded map version agnostic identifier corresponding to the first TME does not satisfy the EDS, the first TME is assigned a positive cost value (e.g., based on the length of the TME, expected time of traversal for the TME, a current or expected traffic level for the TME, and/or the like).

FIG. 9 provides a flowchart illustrating operations performed, such as by the mobile apparatus 20 to assign a cost value to a TME, in accordance with an example embodiment. Starting at block 902, the TME record from the mobile version of the digital map is accessed. For example, the mobile apparatus 20 may access the TME record and/or map information/data corresponding to the TME from the mobile version of the digital map. For example, the mobile apparatus 20 may comprise means, such as processor 22, memory 24, and/or the like, for accessing the TME record and/or map information/data corresponding to the TME from the mobile version of the digital map. For example, a TME record of the mobile version of the digital map and corresponding to the TME may be accessed and map version agnostic information/data may be extracted therefrom. In an example embodiment, elements of the TME record to be accessed for generating a map version agnostic identifier for the TME are pre-established and/or defined. In particular, the elements of the TME record to be accessed for use in generating a map version agnostic identifier are the same elements of the network version of the digital map used by the network apparatus to generate the map version agnostic identifiers that were coded to produce the EDS. For example, the map version agnostic identifier may be generated using a map version agnostic identifier algorithm and the mobile apparatus 20 and the network apparatus 10 may use the same map version agnostic identifier algorithm. For example, the map version agnostic map information/data corresponding to a TME accessed from the mobile version of the digital map may include a road name associated with the TME, TME length, a direction of travel of the TME, a functional class of the TME, speed limit associated with the TME, and/or the like, in various embodiments.

The map version agnostic map information/data corresponding to a TME may then be used to generate a map version agnostic identifier for the TME at block 904. For example, the mobile apparatus 20 may generate a map version agnostic identifier for the TME based on the accessed map information/data of the mobile version of the digital map. For example, the mobile apparatus 20 may comprise means, such as processor 22, memory 24, and/or the like, for generating a map version agnostic identifier for the TME. For example, the accessed map version agnostic information/data corresponding to a TME may be combined in a pre-established and/or defined manner (e.g., in the same manner as the generation of the map version agnostic identifiers where generated by the network apparatus 10) to generate a map version agnostic identifier configured to identify the TME.

At block 906, the map version agnostic identifier may then be used to determine if the corresponding TME satisfies the EDS. For example, when the EDS is a bloom filter, the coded map version agnostic identifier comprises k array positions corresponding to the TME. If any of the k array positions corresponding to the TME are 0, the TME does not satisfy the bloom filter and TME is definitely not in the set S encoded by the bloom filter. If all of the k array positions corresponding to the TME have a value of 1, then the TME satisfies the bloom filter and it is possible that the TME is a member of the set S encoded by the bloom filter. For example, when the EDS is a subtree data structure, the coded map version agnostic identifier comprises ordered bit values corresponding to the TME. If the subtree data structure does not comprise a path corresponding to the ordered bit values corresponding to the TME, then the TME does not satisfy the subtree data structure and the TME is definitely not in the set S encoded by the subtree data structure. If the subtree data structure does include a path corresponding to the ordered bit values corresponding to the TME, then the TME does satisfy the subtree data structure, and it is possible that the TME is a member of the set S encoded by the subtree data structure.

When it is determined, at block 906, that the TME satisfies the EDS, the process continues to block 908. At block 908, the TME is assigned a minimal (e.g., zero) cost value. For example, the mobile apparatus 20 assigns the TME a minimal (e.g., zero) cost value. For example, the mobile apparatus 20 comprises means, such as processor 22, memory 24, and/or the like, for assigning the TME a minimal (e.g., zero) cost value.

When it is determined, at block 908, that the TME does not satisfy the EDS (e.g., the TME is definitely not part of the route determined by the network apparatus 10), the process continues to block 910. At block 910, a cost value for the TME is determined based on map information/data accessed from the TME record corresponding to the TME of the mobile version of the digital map. For example, the mobile apparatus 20 may determine a cost value for the TME based on map information/data corresponding to the TME. For example, the mobile apparatus 20 may comprise means, such as processor 22, memory 24, and/or the like for determining a cost value for the TME based on map information/data corresponding to the TME. For example, the accessed map information/data may include map information/data that may be used to assign a cost value to a TME of the mobile version of the digital map. In an example embodiment, the cost value assigned to a TME may be the length of the TME, the expected time to traverse the TME, a traffic level indicator, and/or the like, as described above.

At block 912, the TME is assigned the cost value determined based on the map information/data. For example, the mobile apparatus 20 assigns the TME the cost value determined based on the map information/data. For example, the mobile apparatus 20 comprises means, such as processor 22, memory 24, and/or the like, for assigning the TME the cost value determined based on the map information/data.

Returning to FIG. 8, at block 810, a decoded route is determined by identifying the lowest cost route from the decoded origin TME to the decoded target TME. For example, the mobile apparatus 20 may determine a decoded route by determining the lowest cost route from the decoded origin TME to the decoded target TME. For example, the mobile apparatus 20 may comprise means, such as processor 22, memory 24, and/or the like, for determining a decoded route by determining the lowest cost route from the decoded origin TME to the decoded target TME. For example, the lowest cost route may be determined based on the cost value assigned to TMEs between the decoded origin TME and the decoded target TME. In various embodiments, a best-first algorithm may be used to determine the decoded route. In an example embodiment, a version of Dijkstra's algorithm or another cost minimization algorithm may be used to determine the decoded route.

In an example embodiment, block 808 may be performed concurrently with block 810 such that the map information/data for assigning a cost value to a first TME is accessed when a route determining algorithm is expanded to the first TME. For example, map information/data for assigning a cost value to a first TME may be accessed and the cost value assigned to the first TME based thereon, in response to a route determining algorithm considering whether the first TME is part of the decoded route.

FIG. 10A illustrates a route 1000 from network version origin TME 1002 to network version target TME 1004. The route TMEs of the route 1000 are separated by intersections and/or nodes 1006. FIG. 10B illustrates a portion of the road network 1050 as represented by the mobile version of the digital map with the corresponding cost values indicated. The route 1000 is included as bold lines between the decoded origin TME 1052 and the decoded target TME 1054. TME Z is shown as a dashed line without an assigned cost value as TME Z is not present in the mobile version of the digital map (e.g., the mobile version of the digital map does not comprise a TME record corresponding to TME Z). The TMEs are separated by intersections and/or nodes 1056 of the mobile version of the digital map. As can be seen from FIGS. 10A and 10B, the TMEs of the mobile version of the digital map that satisfy the EDS are assigned a minimal (e.g., zero) cost value. In the illustrated embodiment, the TMEs of the mobile version of the digital map that do not satisfy the EDS are assigned a cost value that is equal to the length of the TME. The TMEs of the mobile version of the digital map that correspond to the adjacent TMEs of the route (according to the network version of the digital map) do not satisfy the EDS and are therefore assigned positive cost values. As should be understood, the cost value assigned to a TME will always be zero or larger (i.e., not negative). Therefore, any algorithm used to determine the lowest cost route will be biased toward selecting the TMEs of the mobile version of the digital map that correspond to the route TMEs of the network version of the digital map. For example, for the route illustrated in FIGS. 10A and 10B, the lowest cost route from the decoded origin TME 1052 to the decoded target TME 1054 includes TME A, TME B, TME D, TME J, TME K, and TME L having a total cost of 30m. If the mobile version of the digital map included TME Z, the lowest cost route from the decoded origin TME 1052 to the decoded target TME 1054 would include TME A, TME B, TME D, TME Z, and TME L having a total cost of 0. However, the route including TME A, TME B, TME E, TME N, TME M, and TME L would not be selected as the decoded route as it is not the lowest cost route from the decoded origin TME 1052 to the decoded target TME 1054. Thus, various embodiments provide for the determination of a decoded route using a map version that is different from the map version used to encode the route TME set defined by the route that allows for automatic and efficient self-healing of the route for disparities between the map version used to encode the route TME set and the map version used to generate the decoded route.

Continuing with FIG. 8, at block 812, it is determined if the decoded route satisfies one or more quality measures. In an example embodiment, the one or more quality measures comprise the length of the decoded route being similar to the route length provided as part of the route response. For example, a decoded route length may be determined and compared to the route length provided by the route response. In an example embodiment, the decoded route length is determined by summing the length of each TME in the decoded route based on the mobile version of the digital map. For example, it may be determined if the decoded route length and the route length satisfy a similarity threshold requirement. In an example embodiment, the ratio of the decoded route length and the route length may be compared to a similarity range to determine if the decoded route length and the route length satisfy a similarity threshold requirement. For example, if the ratio of the decoded route length to the route length is in within the similarity range, it may be determined that the decoded route is an acceptable route. If the ratio of the decoded route length to the route length is not within the similarity range, it may be determined that the decoded route is not an acceptable route. In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length and the route length satisfy a similarity threshold requirement. For example, the mobile apparatus 20 may comprise means, such as processor 22, memory 24, and/or the like, for determining if the decoded route length and the route length satisfy the similarity threshold requirement.

In an example embodiment, the one or more quality measures may include determining whether the number of elements in the EDS that the mobile apparatus 20 cannot resolve satisfies a quality threshold requirement. For example, as shown in FIGS. 10A and 10B, the route 1000 generated by the network apparatus 10 may comprise TME Z. However, TME Z is not present in the mobile version of the digital map (e.g., the mobile version of the digital map does not comprise a TME record corresponding to TME Z). Thus, the mobile apparatus 20 cannot resolve TME Z from the EDS. In an example embodiment, the mobile apparatus 20 may determine that an unresolved element of the EDS exists because, for the example of route 1000, TME D is not the decoded target TME for the decoded route 1050, but a TME that leaves TME D and that satisfies the EDS cannot be identified based on the mobile version of the digital map. As routes must be continuous, there must be a TME of the network version of the digital map that leaves TME D (e.g., is also associated with intersection 1080) that does satisfy the EDS. However this TME is not a part of the mobile version of the digital map, in the illustrated scenario and therefore is identified as an element of the EDS that cannot be resolved by the mobile apparatus 20. When the number of elements of the EDS that cannot be resolved by the mobile apparatus 20 fails to satisfy a quality threshold requirement (e.g., exceeds a quality threshold number), it may be determined that the decoded route fails to satisfy a quality measure.

When it is determined that the decoded route satisfies the one or more quality measures (e.g., the decoded route length and the route length satisfy the similarity threshold requirement), the process continues to block 814 and the route is accepted. For example, the mobile apparatus 20 may accept the route and use the route to complete one or more navigation functions. For example, the mobile apparatus 20 may comprise means, such as processor 22, memory 24, communications interface 26, user interface 28, sensors 29, and/or the like, for (responsive to determining that the decoded route satisfies the one or more quality measures) accepting the decoded route and using the decoded route to perform one or more navigation functions. Some non-limiting examples of navigation functions include providing a route or information corresponding to a geographic area (e.g., via a user interface), localization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. In an example embodiment, as the mobile apparatus 20 traverses the decoded route, if it is determined that the mobile apparatus 20 is traversing a TME that is not part of the decoded route and/or does not satisfy the EDS, the mobile apparatus 20 may automatically request a new route from the network apparatus 10.

When it is determined that the decoded route does not satisfy at least one quality measure (e.g., the decoded route length and the route length do not satisfy the similarity threshold requirement), the process continues to block 816. At block 816, the route is rejected and a new route is requested. For example, the mobile apparatus 20 may reject the route and request a new route. For example, the mobile apparatus 20 may comprise means, such as processor 22, memory 24, communications interface 26, and/or the like for (responsive to determining that the decoded route fails to satisfy at last one quality measure) rejecting the route and requesting a new route. In an example embodiment, the request for the new route may provide information/data that may be used by the network apparatus 10 to identify the elements of the EDS that could not be resolved by the mobile apparatus 20 such that the network apparatus 10 may avoid using the corresponding TMEs in a new route. For example, the information/data that may be used by the network apparatus 10 to identify the elements of the EDS that could not be resolved by the mobile apparatus 20 may include a map version agnostic identifier for the TME immediately preceding and/or immediately succeeding the unresolved element, information/data identifying a node and/or intersection corresponding to the unresolved element, and/or the like. For example, the mobile apparatus 20 may generate an updated and/or modified route request and provide (e.g., transmit) the updated and/or modified route request such that the network apparatus 10 receives the updated and/or modified route request. In response to the updated and/or modified route request, the network apparatus 10 may generate a new route, encode a route TME set defined by the same or the new route with a larger EDS (e.g., a bit array having more bits than the previously provided EDS) and/or the like. The network apparatus 10 may then provide an updated and/or modified route response comprising the route TME set defined by the new route encoded as an EDS, the route TME set defined by the previous route encoded with a larger EDS, and/or the like. The mobile apparatus 20 receives the updated and/or modified route response and determines an updated and/or modified decoded route. In an example embodiment, the mobile apparatus 20 determines if the updated and/or modified decoded route satisfies one or more quality measures to determine if the updated and/or modified decoded route is to be accepted or rejected and a new route is to be requested. The test performed by the network apparatus 10 (e.g., at block 312 or block 410) validates that a false-positive may not occur if the mobile apparatus 20 is on the same map version as the network apparatus 10. If the network version and mobile version of the digital map differ, there is a chance that false-positives may still occur, as the mobile version of the digital map may have TMEs that no longer exist in the network version of the digital map. A false-positive may cause the decoded route to not satisfy a quality measure. In this case, it would help to further refine the match set by increasing the depth/size of the EDS. If a match is not found after this iterative process, the client will have to update.

C. Multiple Stop Routes

In various embodiments, a multiple stop route may be requested. For example, a user may interact with a mobile apparatus 20 (e.g., via user interface 28) to provide a list of errands to be run, stops to be made, and/or the like. The mobile apparatus 20 may generate and provide a multiple stop route request based on the user provided information. A network apparatus 10 may receive the multiple stop route request, determine an optimal tour of the multiple stops, determine a route for each leg of the multiple stop route, encode the route TME set defined by each leg of the multiple stop route using an EDS, and provide a multiple stop route response that includes the EDS for each leg of the multiple stop route. The mobile apparatus 20 may then determine a decoded route for each leg of the multiple stop route based on the corresponding EDS. FIG. 11 provides a flowchart illustrating operations performed, such as by the network apparatus 10, to provide a multiple stop route response, in accordance with an example embodiment, and FIG. 12 provides a flowchart illustrating operations performed, such as by the mobile apparatus 20, to decode legs of a multiple stop route based on a received multiple stop route response, in accordance with an example embodiment.

i. Exemplary Operation of a Network Apparatus

Starting at block 1102 of FIG. 11, a multiple stop route request is received. For example, the network apparatus 10 may receive a multiple stop route request. For example, the network apparatus 10 may comprise means, such as processor 12, memory 14, communications interface 16, and/or the like for receiving a multiple stop route request. In various embodiments, the multiple stop route request may comprise a mobile apparatus identifier identifying the mobile apparatus 20 that provided the multiple stop route request, map version agnostic information/data identifying a starting location, map version agnostic information/data identifying a target location, map version agnostic information/data identifying each stop location, one or more parameters for the route (e.g., shortest distance, shortest expected travel time, avoid tolls, avoid highways, driving route, biking route, walking route, and/or the like), and/or the like. In various embodiments, the information/data identifying the starting location, the target location, and each of the stop locations is independent of a version of the digital map. In an example embodiment, the information/data identifying the starting location is provided as the midpoint and z-level of a mobile version TME corresponding to the current location/position of the mobile apparatus and/or a user provided origin for the route. For example, the information/data identifying the target location for the route may be provided as the midpoint and z-level of a mobile version TME corresponding to a user provided and/or selected destination of the route and/or a predicted destination of the route. In various embodiments, the information/data identifying the stop location(s) for the route may be provided as the midpoint and z-level of a mobile version TME corresponding to a user requested stop, a POI name (e.g., the name of a particular store), a geolocation for the stop (e.g., latitude and longitude), a street address for the stop, and/or other map version agnostic information/data identifying a stop location. In an example embodiment, the multiple stop route request may further include one or more order conditions. For example, the multiple stop route request may indicate that a particular stop needs to be completed first (e.g., dropping a child off at daycare), a particular stop needs to be completed last (e.g., picking up perishables at the grocery store or a farmer's market), a particular stop needs to be completed around or by particular time (e.g., picking a child up from soccer practice), and/or the like.

At block 1104, the origin TME, target TME, and waypoint TME(s) of the network version of the digital map are identified. For example, the network apparatus 10 may identify the origin TME, target TME, and waypoint TME(s) of the network version of the digital map. For example, the network apparatus 10 may comprise means, such as processor 12, memory 14, and/or the like for identifying the origin TME, target TME, and waypoint TME(s) of the network version of the digital map. For example, the information/data identifying the starting location may be map-matched (e.g., using a map matching algorithm, engine, and/or the like) based on the network version of the digital map to identify the origin TME of the network version of the digital map (also referred to as the network version origin TME herein). For example, the information/data identifying the target location may be map-matched (e.g., using a map matching algorithm, engine, and/or the like) based on the network version of the digital map to identify the target TME of the network version of the digital map (also referred to as the network version target TME herein). For example, the information/data identifying each stop location may be map-matched (e.g., using a map matching algorithm, engine, and/or the like) based on the network version of the digital map to identify a corresponding waypoint TME of the network version of the digital map (also referred to as a network version waypoint TME herein). In various embodiments, the information/data identifying the starting location, target location, and/or stop location(s) may be map-matched to the network version of the digital map such that an error up to a preset error in the matching of the midpoint corresponding to the starting/target/stop location to the midpoint of the corresponding TME of the network version of the digital map is tolerated. The z-level corresponding to the starting location, target location, and/or stop location(s) may be used for tie breaking in the case where the starting location, target location, and/or stop location(s) corresponds to a tunnel, bridge, stacked roads, and/or the like. If the network apparatus cannot exactly match (e.g., within the preset error) a network version origin TME, network version target TME, and/or network version waypoint TME(s) to the information/data identifying the starting location, target location, and/or stop location(s), the multiple stop route response may include a flag indicating such.

At block 1106, a route starting at the network version origin TME, passing through each of the network version waypoint TMEs, and ending at the network version target TME is determined. For example, the network apparatus 10 may determine a route starting at the network version origin TME, passing through each of the network version waypoint TMEs, and ending at the network version target TME. For example, the network apparatus 10 may comprise means, such as processor 12, memory 14, and/or the like, for determining a route starting at the network version origin TME, passing through each of the network version waypoint TMEs, and ending at the network version target TME. In various embodiments, the route is determined in accordance with any order conditions provided in the multiple stop route request.

A variety of route determining algorithms may be used, in various embodiments, to determine a route starting at the network version origin TME, passing through each of the network version waypoint TMEs, and ending at the network version target TME. In various embodiments, a route determining algorithm that uses cost values is used to determine the route. For example, a best-first algorithm may be used to determine a route starting at the network version origin TME, passing through each of the network version waypoint TMEs, and ending at the network version target TME. For example, a modified Dijkstra's algorithm or another cost minimization algorithm may be used to determine the route starting at the network version origin TME, passing through each of the network version waypoint TMEs, and ending at the network version target TME. In an example embodiment, the route may be designated as an ordered list or set of route TMEs for each leg of the route (e.g., between the network version origin TME and the first network version waypoint TME, between consecutive network version waypoint TMEs, and/or between the final network version waypoint TME and the network version target TME) and an ordered list of destinations for each leg. For example a route TME set may be defined for each leg. For example, to determine the route, an ordered list or set of route TMEs for each leg (and/or TME identifiers of the network version of the digital map identifying the route TMEs) and an ordered list of destinations for each leg may be generated.

At block 1108, an EDS is produced for each leg of the route. For example, EDSs that each encode a route TME set corresponding to an individual leg of the route may be produced. For example, the network apparatus 10 may produce an EDS corresponding to each leg of the route, wherein the EDS encodes the route TMEs set corresponding to the associated leg of the route. For example, the network apparatus 10 may comprise means, such as processor 12, memory 14, and/or the like for producing an EDS corresponding to each leg of the route, wherein the EDS encodes the route TMEs set corresponding to the associated leg of the route. In various embodiments, each leg may be encoded into a separate EDS. For example, for a route having a network waypoint TMEs (e.g., a intermediary stops between the origin and the final destination of the route), α+1 EDSs are produced. In various embodiments, the EDSs are produced in a manner similar to that described with respect to FIG. 3 or FIG. 4.

At block 1110, a multiple stop route response is generated and provided. For example, the network apparatus 10 may generate and provide a multiple stop route request. For example, the network apparatus 10 may comprise means, such as processor 12, memory 14, communications interface 16, and/or the like, for generating and providing (e.g., transmitting) a multiple stop route request. In various embodiments, the route response comprises the EDSs (e.g., as bit arrays). In an example embodiment, the route response comprises an ordered list of stops or waypoints. For example, the ordered list of stops or waypoints may include information/data identifying a network version starting location, each network version waypoint location (in the order they are to be visited along the multiple stop route) and a network version target location. In various embodiments, the information/data identifying the network version starting location, each network version waypoint location, and network version target location is map version agnostic. For example, in an example embodiment, the information/data identifying the network version starting location is the midpoint of (or other point along) the network version origin TME and the z-level of the network version origin TME. Similarly, the information/data identifying a network version waypoint location may be the midpoint of (or other point along) the corresponding network version waypoint TME and the z-level of the corresponding network version waypoint TME. In an example embodiment, the information/data identifying the network version target TME is the midpoint of (or other point along) the network version target TME and the z-level of the network version target TME. In an example embodiment, generating the multiple stop route response includes determining a length of each leg of the route. For example, the length of each route TME of a leg may be summed to determine a length of the corresponding leg of the route. The length of each leg of the route may then be included in the route response, in an example embodiment. For example, the ordered list of stops or waypoints may include a length for each leg of the route. In an example embodiment a total length of the route may be determined and provided as part of the multiple stop route response in addition to and/or in place of the length of each leg of the route.

ii. Exemplary Operation of a Mobile Apparatus

Starting at block 1202 of FIG. 12, a multiple stop route request is generated and provided such that the network apparatus 10 receives the multiple stop route request. For example, the mobile apparatus 20 may generate and provide (e.g., transmit) a multiple stop route request. For example, the mobile apparatus 20 may comprise means, such as processor 22, memory 24, communications interface 26, user interface 28, location sensor 29, and/or the like, for generating and providing a multiple stop route request.

In various embodiments, the multiple stop route request may comprise a mobile apparatus identifier identifying the mobile apparatus 20 that generated and provided the multiple stop route request, map version agnostic information/data identifying a starting location, map version agnostic information/data identifying a target location, map version agnostic information/data identifying one or more intermediate stops, one or more parameters for the route (e.g., shortest distance, shortest expected travel time, avoid tolls, avoid highways, driving route, biking route, walking route, and/or the like), one or more order conditions corresponding to requirements or preferences regarding the order or timing with which intermediate stops of the route should be made, and/or the like. In various embodiments, the information/data identifying the starting location, one or more intermediate stops, and the target location are independent of a version of the digital map.

For example, a user may interact with the user interface 28 and request a multiple stop route. For example, the user may operate the user interface 28 of the mobile apparatus 20 to indicate an origin of the route, one or more intermediate stops of the route, a destination of the route, one or more order/timing conditions, and/or one or more parameters for the route (e.g., shortest distance, shortest expected travel time, avoid tolls, avoid highway, driving route, biking route, walking route, and/or the like). The user may then operate the user interface 28 to submit the user provided and/or selected information/data and to initiate the generation of the multiple stop route request. In an example embodiment, the origin of the route is the current location of the mobile apparatus 20 as determined by on one or more location sensors 29 of the mobile apparatus. In another example, a mobile apparatus 20 may determine that the mobile apparatus 20 is moving and/or that a trip is expected to begin. The mobile apparatus 20 may determine a current location of the mobile apparatus (e.g., via the location sensor(s) 29) and determine a predicted destination and/or waypoint(s) of the route (based on past trips, information/data stored in a digital calendar corresponding to a user of the mobile apparatus 20, based on planned trips, and/or the like). The mobile apparatus 20 may then automatically initiate the generation of a route request.

As noted above, the mobile apparatus 20 may receive (e.g., via user interface 28 and/or from location sensor 29) an origin of the route. The mobile apparatus 20 may then map match the origin of the route to a TME of the mobile version of the digital map. This mobile version origin TME (e.g., a TME of a mobile version of the digital map to which the origin has been map-matched) is used to determine the map version agnostic information/data identifying the starting location. In an example embodiment, the information/data identifying the starting location is provided as the midpoint and z-level of the mobile version origin TME. The mobile apparatus may further map match the destination for the route to a TME of the mobile version of the digital map. This mobile version target TME (e.g., a TME of the mobile version of the digital map to which the destination has been map-matched) is used to determine the map version agnostic information/data identifying the target location. For example, the information/data identifying the target location for the route may be provided as the midpoint and z-level of a mobile version target TME. In various embodiments, the information/data identifying the stop location(s) for the route may be provided as the midpoint and z-level of a mobile version TME corresponding to a user requested stop, a POI name (e.g., the name of a particular store), a geolocation for the stop (e.g., latitude and longitude), a street address for the stop, and/or other map version agnostic information/data identifying a stop location.

At block 1204, a multiple stop route response is received. For example, the network apparatus 10 may generate and provide a multiple stop route response, in response to the multiple stop route request, and provide the multiple stop route response such that the mobile apparatus 20 receives the multiple stop route response. For example, the mobile apparatus 20 may receive the multiple stop route response. For example, the mobile apparatus 20 may comprise means, such as processor 22, memory 24, communications interface 26, and/or the like for receiving the multiple stop route response. In various embodiments, the multiple stop route response comprises an EDS (e.g., as a bit array) for each leg of the route. In an example embodiment, the multiple stop route response comprises an ordered list of stops or waypoints. For example, the ordered list of stops or waypoints may include information/data identifying a network version starting location, each network version waypoint location (in the ordered they are to be visited along the multiple stop route) and a network version target location. The ordered list of stops or waypoints may further include a length for each leg of the route. In an example embodiment, the multiple stop route response includes a total length of the route in addition to and/or in place of the length of each leg of the route.

At block 1206, a decoded origin TME, one or more decoded waypoint TMEs, and a decoded target TME are identified. For example, the mobile apparatus 20 may identify and/or determine a decoded origin TME, one or more decoded waypoint TMEs, and a decoded target TME using the mobile version of the digital map. For example, the mobile apparatus 20 may comprise means, such as processor 22, memory 24, and/or the like, for identifying and/or determining a decoded origin TME, one or more decoded waypoint TMEs, and a decoded target TME using the mobile version of the digital map. For example, the map version agnostic information/data identifying the network version starting location may be map-matched using the mobile version of the digital map to identify a decoded origin TME corresponding to the network version starting location. For example, the map version agnostic information/data identifying each of the network version stop locations may be map-matched using the mobile version of the digital map to identify a corresponding decoded waypoint TME. Similarly, the map version agnostic information/data identifying the network version target location may be map-matched using the mobile version of the digital map to identify a decoded target TME corresponding to the network version target location.

At block 1208, map information/data from the mobile version of the digital map for assigning cost values to TMEs of the mobile version of the digital map is accessed. For example, the mobile apparatus 20 may access map information/data from a geographic database storing map information/data of the mobile version of the digital map from memory 24.

In various embodiments, a decoded leg route is determined for each leg of the route independently. For example, the multiple stop route response includes a first leg EDS and a second leg EDS. The first leg EDS is used, in conjunction with the corresponding beginning TME (e.g., the decoded origin TME or one of the one or more decoded waypoint TMEs) corresponding to the origin of the first leg and ending TME (e.g., one of the one or more decoded waypoint TMEs or the decoded target TME) corresponding to the destination of the first leg, to assign costs to TMEs (e.g., in a manner similar to that described with respect to FIG. 9) for determining the first decoded leg route. The second leg EDS is used, in conjunction with the corresponding beginning TME corresponding to the origin of the second leg and the ending TME corresponding to the destination of the second leg, to assign costs to TMEs (e.g., in a manner similar to that described with respect to FIG. 9) for determining the second decoded leg route. The first decoded leg route and the second decoded leg route are determined independent of one another. Thus, the determination of each decoded leg route may be performed independently and a cost value is assigned to a first TME during the determination of the first decoded leg route may be different from a cost value assigned to the first TME during the determination of the second decoded leg route.

In various embodiments, the cost value assigned to a TME during the determination of a particular decoded leg route is determined based on whether the TME satisfies the EDS corresponding to the particular leg of the route. For example, if a coded map version agnostic identifier corresponding to a first TME satisfies the EDS corresponding to a particular leg of the route, the first TME is assigned a minimal cost value for the determination of the particular decoded leg route. For example, the first TME may be assigned a cost value of zero. However, if the coded map version agnostic identifier corresponding to the first TME does not satisfy the EDS corresponding to the particular leg of the route, the first TME is assigned a positive cost value determined based on map information/data corresponding to the first TME (e.g., based on the length of the TME, expected time of traversal for the TME, a current or expected traffic level for the TME, and/or the like) for the determination of the particular decoded leg route. For example, TMEs may be assigned a cost for each determination of a decoded leg route for each leg of the multiple stop route in a manner similar to that described above with respect to FIG. 9.

In an example embodiment, block 1208 may be performed concurrently with block 1210 such that the map information/data for assigning a cost value to a first TME is accessed when a route determining algorithm is expanded to the first TME. For example, map information/data for assigning a cost value to a first TME may be accessed and the cost value assigned to the first TME based thereon, in response to a route determining algorithm considering whether the first TME is part of the decoded route or a particular decoded leg route.

At block 1210, a decoded leg route is determined for each leg of the multiple stop route. For example, a particular decoded leg route is determined for the particular leg of the multiple stop route by identifying the lowest cost route from the beginning TME (e.g., the decoded origin TME or one of the one or more decoded waypoint TMEs) corresponding to the origin of the particular leg and ending TME (e.g., one of the one or more decoded waypoint TMEs or the decoded target TME) corresponding to the destination of the particular leg. For example, the mobile apparatus 20 may determine a decoded leg route for each leg of the route by determining the lowest cost route from the beginning TME to the ending TME for that leg. For example, the mobile apparatus 20 may comprise means, such as processor 22, memory 24, and/or the like, for determining a decoded leg route for each leg of the route by determining the lowest cost route from the beginning TME to the ending TME of that route. For example, the lowest cost route for a leg may be determined based on the cost value assigned (based on the EDS for that leg) to TMEs between the beginning TME and the ending TME of the leg. In various embodiments, a best-first algorithm may be used to determine each of the decoded leg routes. In an example embodiment, a version of Dijkstra's algorithm may be used to determine each of the decoded leg routes. A decoded route is then generated by ordering the decoded leg routes based on the ordered list of stops or waypoints provided by the multiple stop route response.

At block 1212, it is determined if the decoded multiple stop route and/or if each decoded leg route satisfies one or more quality measures. In an example embodiment, the one or more quality measures comprise the total length of the decoded route (e.g., the sum of the lengths of each of the decoded leg routes) being similar to the total route length provided as part of the multiple stop route response (and/or determined by summing the leg lengths provided in the multiple stop route response). For example, a decoded route length may be determined and compared to the total route length provided by the multiple stop route response. In an example embodiment, the decoded route length is determined by summing the length of each TME in each of the decoded leg routes based on the mobile version of the digital map. For example, it may be determined if the decoded route length and the total route length satisfy a similarity threshold requirement. In an example embodiment, the ratio of the decoded route length and the total route length may be compared to a similarity range to determine if the decoded route length and the total route length satisfy a similarity threshold requirement. For example, if the ratio of the decoded route length to the total route length is in within the similarity range, it may be determined that the decoded route is an acceptable route. If the ratio of the decoded route length to the total route length is not within the similarity range, it may be determined that the decoded route is not an acceptable route. In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length and the total route length satisfy a similarity threshold requirement. For example, the mobile apparatus 20 may comprise means, such as processor 22, memory 24, and/or the like, for determining if the decoded route length and the total route length satisfy the similarity threshold requirement. In various embodiments, rather than and/or in addition to determining if the decoded route length and the total route length satisfy the similarity threshold requirement, it may be determined if the length of each decoded leg route and the corresponding length of the leg provided in the multiple stop route response satisfy a similarity threshold requirement.

In an example embodiment, the one or more quality measures may include determining whether the number of elements in the EDS(s) that the mobile apparatus 20 cannot resolve satisfies a quality threshold requirement. When the number of elements of the EDS(s) that cannot be resolved by the mobile apparatus 20 fails to satisfy a quality threshold requirement (e.g., exceeds a quality threshold number), it may be determined that the decoded route fails to satisfy a quality measure.

When it is determined that the decoded route and/or each of the decoded leg routes satisfy the one or more quality measures, the process continues to block 1214 and the route is accepted. For example, the mobile apparatus 20 may accept the decoded route and use the decoded route to complete one or more navigation functions. For example, the mobile apparatus 20 may comprise means, such as processor 22, memory 24, communications interface 26, user interface 28, sensors 29, and/or the like, for (responsive to determining that the decoded route satisfies the one or more quality measures) accepting the decoded route and using the decoded route to perform one or more navigation functions. Some non-limiting examples of navigation functions include providing a route or information corresponding to a geographic area (e.g., via a user interface), localization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

When it is determined that the decoded route does not satisfy at least one quality measure, the process continues to block 1216. At block 1216, the route and/or one or more legs of the route are rejected and a new route is requested. For example, the mobile apparatus 20 may rejected the route and/or one or more legs of the route and request a new route and/or one or more new legs of the route. For example, the mobile apparatus 20 may comprise means, such as processor 22, memory 24, communications interface 26, and/or the like for (responsive to determining that the decoded route fails to satisfy at last one quality measure) rejecting the route and/or one or more legs of the route and requesting a new route and/or one or more new legs of the route. For example, the mobile apparatus 20 may generate an updated and/or modified multiple stop route request and provide (e.g., transmit) the updated and/or modified multiple stop route request such that the network apparatus 10 receives the updated and/or modified multiple stop route request. In response to the updated and/or modified multiple stop route request, the network apparatus 10 may generate a new route or new legs of the route, encode a route TME set defined by the same or the new route with a larger EDS for at least one of the legs (e.g., a bit array having more bits than the previously provided EDS for the at least one of the legs) and/or the like. The network apparatus 10 may then provide an updated and/or modified multiple stop route response comprising a plurality of EDSs (e.g., one EDS for each leg of the route), and/or the like. The mobile apparatus 20 receives the updated and/or modified multiple stop route response and determines an updated and/or modified decoded route. In an example embodiment, the mobile apparatus 20 determines if the updated and/or modified decoded route satisfies one or more quality measures to determine if the updated and/or modified decoded route is to be accepted or rejected and a new route is to be requested.

D. Routes with Additional Traffic Information/Data

In various embodiments, a route may be provided with additional traffic information/data. For example, the additional traffic information/data may include an approximate delay time for traveling along adjacent TMEs of a route. For example, the additional traffic information/data may give at least a first order detour cost for taking a detour along an adjacent TME of the route. In various embodiments, the additional traffic information/data may be used by a mobile apparatus 20 when assigning a cost value to one or more TMEs during the determination of a decoded route by determining a lowest cost route. In various embodiments, the additional traffic information/data may be used to provide information/data to a user regarding traffic the user may experience if the user deviates from the route. For example, the additional traffic information/data may be used to display a traffic heat map (e.g., via the user interface 28). As described above, the route TME set defined by the route may be encoded using an EDS. The additional traffic information/data may also be encoded using one or more EDSs configured to encode categorical information/data. FIG. 13 provides a flowchart illustrating operations performed, such as by the network apparatus 10 to provide a route response including additional traffic information/data, in accordance with an example embodiment. FIG. 14 is a flowchart illustrating operations performed, such as by the mobile apparatus 20 to decode and use additional traffic information/data, in accordance with an example embodiment.

i. Exemplary Operation of a Network Apparatus

In various embodiments, a network apparatus may generate and provide additional traffic information/data and/or other categorical information/data corresponding to TMEs and/or POIs, as part of a route response for various types of route responses. For example, additional traffic information/data may be generated and provided along with a shortest distance, shortest travel time route, and/or the like. Similarly, additional traffic information/data may be generated and provided along with a multiple stop route, routes to POIs identified based on a proximity search, a parking cruise route, and/or other routes.

Starting at block 1302 of FIG. 13, a route request is received. For example, the network apparatus 10 may receive a route request. For example, the network apparatus 10 may comprise means, such as processor 12, memory 14, communications interface 16, and/or the like for receiving a route request. In various embodiments, the route response may be a multiple stop route request, POI request, parking cruise request, and/or the like. In various embodiments, the route request may comprise a mobile apparatus identifier identifying the mobile apparatus that provided the route request, map version agnostic information/data identifying a starting location, map version agnostic information/data identifying a target location, one or more parameters for the route (e.g., shortest distance, shortest expected travel time, avoid tolls, avoid highways, driving route, biking route, walking route, include delay EDSs, and/or the like), and/or the like. In various embodiments, the information/data identifying the starting location and the target location are independent of a version of the digital map. In an example embodiment, the information/data identifying the starting location is provided as the midpoint and z-level of a mobile version TME corresponding to the current location/position of the mobile apparatus and/or a user provided origin for the route. For example, the information/data identifying the target location for the route may be provided as the midpoint and z-level of a mobile version TME corresponding to a user provided and/or selected destination of the route and/or a predicted destination of the route. The route request may include various other types of (map version agnostic) information/data as appropriate for the type of route request (e.g., multiple stop route request, POI request, parking cruise request, and/or the like).

At block 1304, the route may be determined and a route EDS encoding the route TME set defined by the route may be produced. In the case where the route request is a multiple stop route request, a plurality of route EDSs may be produced, with each route EDS encoding a leg of the multiple stop route. For example, the network apparatus 10 may determine a route and produce a route EDS encoding the route TME set defined by the route. For example, the network apparatus 10 may comprise means, such as processor 12, memory 14, and/or the like, for determining a route and producing a route EDS encoding the route TME set defined by the route. For example, a network version origin TME and network version target TME may be identified based on the information/data identifying the starting location and the target location for the route. A route between the network version origin TME and the network version target TME may be determined. The route TME set defined by the route may then be encoded in a route EDS. For example, a route EDS encoding the route TME set defined by the route may be produced as described above with respect to FIG. 3 or FIG. 4.

At block 1306, traffic information/data may be accessed for one or more delay TMEs. As used herein, the term delay TMEs is used to identify the set of TMEs for which additional traffic information/data is provided in the route response. In various embodiments, the delay TMEs comprise the adjacent TMEs for the route. For example, the adjacent TMEs for a route may be identified during the determination of the route and/or producing of an EDS encoding the route TME set defined by the route. In an example embodiment, the delay TMEs further comprise connected TMEs, wherein connected TMEs are TMEs that are directly connected to the adjacent TMEs (e.g., share a node or intersection with an TME route) that are not route TMEs (e.g., not a member of the route TME set).

In various embodiments, the traffic information/data may be current traffic information/data and/or historical/archived traffic information/data. In various embodiments, the traffic information/data is current traffic information/data corresponding to real time or near real time traffic conditions. In various embodiments, the traffic information/data is historical/archived traffic information/data associated with an epoch that corresponds to a request time associated with the received request. In various embodiments, an epoch is a particular time period of a day, week, month, year, and/or the like. In various embodiments, the request time corresponds to the time at which the route is expected to be traversed. For example, if the route is expected to be traversed directly (e.g., as soon as the route is provided to the user and/or the like), the request time may be the current time (e.g., the time at which the traffic information/data is being accessed). In another example, if the route is expected to be traversed at a point of time in the future (e.g., as indicated in the route request), the request time may be the time at which the route is expected to be traversed (e.g., as indicated in the route request).

In various embodiments, the accessed traffic information/data corresponding to each delay TME may correspond to a travel speed along at least a portion of the corresponding delay TME. For example, the accessed traffic information/data may provide a representative speed of traffic along the corresponding TME, a free flow ratio for the TME, a traversal time for the TME and/or the like based on current probe information/data and/or based on historical/archived traffic information/data corresponding to the appropriate epoch for the request time. For example, the network apparatus 10 may access traffic information/data corresponding to the delay TMEs. For example, the network apparatus 10 may comprise means, such as processor 12, memory 14, communications interface 16, and/or the like, for accessing traffic information/data corresponding to the delay TMEs.

At block 1308, the delay along each delay TME is determined based on the corresponding accessed traffic information/data. For example, the network apparatus 10 may determine a delay along each delay TME based on the corresponding accessed traffic information/data. For example, the network apparatus 10 may comprise means, such as processor 12, memory 14, and/or the like for determining a delay along each delay TME based on the corresponding accessed traffic information/data. As used herein the term delay corresponds to the difference in time for traversing a TME under free flow conditions (e.g., traveling at the speed limit and/or another free flow speed) and the expected time for traversing the TME based on the traffic information/data. For example, based on the accessed traffic information/data corresponding to a delay TME, an expected time for traversing the delay TME may be determined. For example, if the accessed traffic information/data provides a travel speed along the delay TME, the length of the delay TME, according to the network version of the digital map, may be divided by the travel speed along the delay TME to determine the expected time for traversing the delay TME. The delay for the delay TME may then be determined by subtracting the time for traversing the delay TME under free flow conditions (e.g., the length of the TME divided by the free flow speed for the delay TME) from the expected time for traversing the delay TME under the current and/or expected traffic conditions (e.g., based on the traffic information/data). For example, the delay for a delay TME may be the additional number of minutes needed to traverse the TME under the current and/or expected traffic conditions compared to free flow conditions.

At block 1310, the delay TMEs are binned based on the corresponding delay. For example, a plurality of delay groups may be defined where each delay group corresponds to a range of delays. In an example embodiment, four delay groups are defined with a first group corresponding to delays in a first range (e.g., zero to two minutes), a second group corresponding to delays in a second range (e.g., three minutes to eight minutes), a third group corresponding to delays in a third range (e.g., nine minutes to fifteen minutes), and a fourth group corresponding to delays in a fourth range (e.g., longer than fifteen minutes). In an example embodiment, each of the plurality of groups may consist of sixteen groups with a zeroth group corresponding to a delay of zero minutes, a first group corresponding to a delay of one minute, a second group corresponding to a delay of two minutes, etc., and a fifteenth group corresponding to delays of fifteen minutes or longer. Each delay TME is assigned to a delay group based on the delay determined for the delay TME. For example, if a first delay determined for a first delay TME is one minute and a second delay determined for a second delay TME is ten minutes, the first delay TME is assigned to the first group from the above example (e.g., a one minute delay is within the range of zero to two minutes) and the second delay TME is assigned to the third group from the above example. In another example embodiment, three delay groups are defined with each delay group corresponding to a particular range of delays and the delay TMEs are assigned to delay groups based on the corresponding determined delay. Various numbers of delay groups and delay ranges may be defined in various embodiments. For example, the network apparatus 10 may assign each delay TME to a delay group based on the delay determined for the delay TME being within the delay range associated with the delay group. For example, the network apparatus 10 may comprise means, such as processor 12, memory 14, and/or the like, for assigning each delay TME to a delay group based on the delay determined for the delay TME being within the delay range associated with the delay group.

At block 1312, a delay EDS is produced for each delay group. For example, the network apparatus 10 may produce a delay EDS encoding each delay group. For example, the network apparatus 10 may comprise means, such as processor 12, memory 14, and/or the like for producing a plurality of delay EDSs, with each delay EDS encoding a delay group. For example, map version agnostic map information/data for each delay TME may be accessed from the network version of the digital map and a map version agnostic identifier for each delay TME may be generated. The map version agnostic identifier for each delay TME within a delay group may then be encoded into a delay EDS. It may then be determined if any of the delay TMEs that were assigned to a different delay group satisfy the delay EDS. For example, it may be determined if a second delay TME assigned to a second group satisfies a first delay EDS encoding the map version agnostic identifiers of the delay TMEs assigned to a first group. If the second delay TME assigned to the second group satisfies the first delay EDS corresponding to the first group, the size of the first delay EDS may be increased (e.g., from $m_1$ to $m_1+1$). For example, a larger first delay EDS may be generated. In an example embodiment, each delay EDS may be incrementally increased in size until the only delay TMEs that satisfy the delay EDS are the delay TMEs assigned to the corresponding delay group. In an example embodiment, the delay EDSs are produced in a manner similar to that described above with respect to FIG. 3 or FIG. 4.

At block 1314, a route response is generated and provided. In various embodiments, the route response comprises route information/data and the delay EDSs. For example, the route information/data may comprise the route EDS (s), information/data identifying a origin TME of the route, information/data identifying a target TME of the route, and/or the like. For example, the network apparatus 10 generates and provides a route response including route information/data and the delay EDSs. For example, the network apparatus 10 may comprise means, such as processor 12, memory 14, communications interface 16, and/or the like, for generating and providing a route response including the route information/data and the delay EDSs. For example, the network apparatus 10 may provide (e.g., transmit) the route response such that the mobile apparatus 20 corresponding to the mobile apparatus identifier provided in the route request receives the route response. In an example embodiment, the route and delay EDSs are provided as an array. For example, the route response may comprise an array populated with the bit arrays of the route and delay EDSs. For example, in an embodiment wherein three delay EDSs are produced, the array may comprise the route EDS in a zeroth position of the array, a first delay EDS corresponding to a first delay range in a first position of the array, a second delay EDS corresponding to a second delay range in a second position of the array, and a third delay EDS corresponding to a third delay range in a third position of the array. If the ranges of delays are preset, the route response may not include the ranges of delays and the range of delays corresponding to the delay EDSs may be determined (e.g., by the mobile apparatus 20) based on the position of the delay EDSs within the array provided in the route response.

ii. Exemplary Operation of a Mobile Apparatus

In various embodiments, a mobile apparatus 20 may receive a route response comprising one or more delay EDSs (e.g., possibly in addition to a route EDS). In various embodiments, the mobile apparatus 20 may use the one or more delay EDSs to determine a delay or delay range for one or more TMEs near a route. In various embodiments, the determined delays and/or delay ranges may be used to provide a visualization (e.g., via user interface 28) of delays near a route. In an example embodiment, the determined delays and/or delay ranges may be used in the decoding of the route (e.g., to assign cost values to TMEs when decoding the TME route TME set encoded in the route EDS).

Starting at block 1402, a route request is generated and provided such that the network apparatus 10 receives the route request. For example, the mobile apparatus 20 may generate and provide (e.g., transmit) a route request. For example, the mobile apparatus 20 may comprise means, such as processor 22, memory 24, communications interface 26, user interface 28, location sensor 29, and/or the like, for generating and providing a route request. In various embodiments, the route request may comprise a mobile apparatus identifier identifying the mobile apparatus 20 that generated and provided the route request, map version agnostic information/data identifying a starting location, map version agnostic information/data identifying a target location, one or more parameters for the route (e.g., shortest distance, shortest expected travel time, avoid tolls, avoid highways, driving route, biking route, walking route, include delay bloom filters, and/or the like), and/or the like. In various embodiments, the information/data identifying the starting location and the target location are independent of a version of the digital map.

For example, a user may interact with the user interface 28 and request a route. For example, the user may, operate the user interface 28 to indicate an origin of the route, a destination of the route, and/or one or more parameters for the route (e.g., shortest distance, shortest expected travel time, avoid tolls, avoid highway, driving route, biking route, walking route, and/or the like). The user may then operate the user interface 28 to submit the user provided and/or selected information/data and to initiate the generation of the route request. In an example embodiment, the origin of the route is the current location of the mobile apparatus 20 as determined by on one or more location sensors 29 of the mobile apparatus. In another example, a mobile apparatus 20 may determine that the mobile apparatus 20 is moving and/or that a trip is expected to begin. The mobile apparatus 20 may determine a current location of the mobile apparatus (e.g., via the location sensor(s) 29) and determine a predicted destination of the route (based on past trips, information/data stored in a digital calendar corresponding to a user of the mobile apparatus 20, based on planned trips, and/or the like). The mobile apparatus 20 may then automatically initiate the generation of a route request.

As noted above, the mobile apparatus 20 may receive (e.g., via user interface 28 and/or from location sensor 29) an origin of the route. The mobile apparatus 20 may then map match the origin of the route to a TME of the mobile version of the digital map. This mobile version origin TME (e.g., a TME of a mobile version of the digital map to which the origin has been map-matched) is used to determine the map version agnostic information/data identifying the starting location. In an example embodiment, the information/data identifying the starting location is provided as the midpoint and z-level of the mobile version origin TME. The mobile apparatus may further map match the destination for the route to a TME of the mobile version of the digital map. This mobile version target TME (e.g., a TME of the mobile version of the digital map to which the destination has been map-matched) is used to determine the map version agnostic information/data identifying the target location. For example, the information/data identifying the target location for the route may be provided as the midpoint and z-level of a mobile version target TME.

At block 1404, a route response is received. For example, the network apparatus 10 may generate and provide a route response in response to the route request, and provide the route response such that the mobile apparatus 20 receives the route response. For example, the mobile apparatus 20 may receive the route response. For example, the mobile apparatus 20 may comprise means, such as processor 22, memory 24, communications interface 26, and/or the like for receiving the route response. In various embodiments, the route response comprises route information/data and one or more delay EDSs. For example, in various embodiments, the route response comprises a route EDS and one or more delay EDSs (e.g., as an array of bit arrays). In an example embodiment, the route response comprises information/data identifying a network version starting location and information/data identifying a network version target location. In various embodiments, the information/data identifying the network version starting location and network version target location is map version agnostic. For example, in an example embodiment, the information/data identifying the network version starting location is the midpoint of (or other point along) the network version origin TME and the z-level of the network version origin TME, and the information/data identifying the network version target TME is the midpoint of (or other point along) the network version target TME and the z-level of the network version target TME. In an example embodiment, the route response includes a route length indicating the length (e.g., in miles, kilometers, feet, meters, and/or the like) for the encoded route TME set.

At block 1406, the route is decoded. For example, the mobile apparatus 20 may decode the route TME set encoded by the route EDS (s) provided by the route response. For example, the mobile apparatus 20 may comprise means, such as processor 22, memory 24, and/or the like, for decoding the route TME set encoded by the route EDS (s) provided by the route response.

For example, a decoded origin TME and decoded target TME are identified. For example, the mobile apparatus 20 may identify and/or determine a decoded origin TME and a decoded target TME using the mobile version of the digital map. For example, the mobile apparatus 20 may comprise means, such as processor 22, memory 24, and/or the like, for identifying and/or determining a decoded origin TME and a decoded target TME using the mobile version of the digital map. For example, the map version agnostic information/data identifying the network version starting location may be map-matched using the mobile version of the digital map to identify a decoded origin TME corresponding to the network version starting location. Similarly, the map version agnostic information/data identifying the network version target location may be map-matched using the mobile version of the digital map to identify a decoded target location corresponding to the network version target location.

In various embodiments, map information/data from the mobile version of the digital map for assigning cost values to TMEs of the mobile version of the digital map is accessed. For example, the mobile apparatus 20 may access map information/data from a geographic database storing map information/data of the mobile version of the digital map from memory 24.

In various embodiments, the cost value assigned to a TME is determined based on whether the TME satisfies the route EDS and/or one of the delay EDSs. For example, if a coded map version agnostic identifier corresponding to a first TME satisfies the route EDS, the first TME is assigned a minimal cost value. For example, the first TME may be assigned a cost value of zero. However, if the coded map version agnostic identifier corresponding to the first TME does not satisfy the route EDS, the first TME is assigned a positive cost value (e.g., based on the length of the TME, expected time of traversal for the TME, a current or expected traffic level for the TME, a delay or delay range determined for the TME based on a delay EDS, and/or the like). Thus, accessing map information/data for use in assigning cost values to TMEs further includes accessing map information/data from the mobile version of the digital map that may be used for determining if a TME satisfies the route EDS and/or one of the delay EDSs. For example, a TME record corresponding to a TME may be accessed and map version agnostic information/data may be extracted therefrom. In an example embodiment, elements of the TME record to be accessed for generating a map version agnostic identifier for the TME are pre-established and/or defined. In particular, the elements of the TME record to be accessed for use in generating a map version agnostic identifier are the same elements of the network version of the digital map used by the network apparatus 10 to generate the map version agnostic identifiers that were coded to produce the route EDS (s) and the delay EDSs. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed for a TME may include a road name associated with the TME, TME length, a direction of travel of the TME, a functional class of the TME, speed limit associated with the TME, and/or the like, in various embodiments.

The map version agnostic map information/data corresponding to a TME may then be used to generate a map version agnostic identifier for the TME. For example, the accessed map version agnostic information/data corresponding to the TME may be combined in a pre-established and/or defined manner (e.g., in the same manner as the generation of the map version agnostic identifiers where generated by the network apparatus 10) to generate a map version agnostic identifier configured to identify the TME. The map version agnostic identifier may then be used to determine if the corresponding TME satisfies the route EDS(s) and/or one of the delay EDSs. If the TME satisfies the route EDS, the TME is assigned a minimal (e.g., zero) cost value. If the TME does not satisfy the route EDS, the TME may be assigned a cost value based on map information/data and/or a delay or delay range corresponding to one of the delay EDSs (e.g., if the TME satisfies the one of the delay EDSs). For example, the accessed map information/data may include map information/data that may be used to assign a cost value to a TME of the mobile version of the digital map. In an example embodiment, the cost value assigned to a TME may be the length of the TME, the expected time to traverse the TME, a traffic level indicator, and/or the like, as described above.

In various embodiments, a decoded route is determined by identifying the lowest cost route from the decoded origin TME to the decoded target TME. For example, the mobile apparatus 20 may determine a decoded route by determining the lowest cost route from the decoded origin TME to the decoded target TME. For example, the mobile apparatus 20 may comprise means, such as processor 22, memory 24, and/or the like, for determining a decoded route by determining the lowest cost route from the decoded origin TME to the decoded target TME. For example, the lowest cost route may be determined based on the cost value assigned to TMEs between the decoded origin TME and the decoded target TME. In various embodiments, a best-first algorithm may be used to determine the decoded route. In an example embodiment, a version of Dijkstra's algorithm may be used to determine the decoded route.

In various embodiments, it is determined if the decoded route satisfies one or more quality measures. In an example embodiment, the one or more quality measures comprise the length of the decoded route being similar to the route length provided as part of the route response. For example, a decoded route length may be determined and compared to the route length provided by the route response. In an example embodiment, the decoded route length is determined by summing the length of each TME in the decoded route based on the mobile version of the digital map. For example, it may be determined if the decoded route length and the route length satisfy a similarity threshold requirement. In an example embodiment, the ratio of the decoded route length and the route length may be compared to a similarity range to determine if the decoded route length and the route length satisfy a similarity threshold requirement. For example, if the ratio of the decoded route length to the route length is in within the similarity range, it may be determined that the decoded route is an acceptable route. If the ratio of the decoded route length to the route length is not within the similarity range, it may be determined that the decoded route is not an acceptable route. In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length and the route length satisfy a similarity threshold requirement. For example, the mobile apparatus 20 may comprise means, such as processor 22, memory 24, and/or the like, for determining if the decoded route length and the route length satisfy the similarity threshold requirement.

In an example embodiment, the one or more quality measures may include determining whether the number of elements in the route EDS that the mobile apparatus 20 cannot resolve satisfies a quality threshold requirement. When the number of elements of the route EDS that cannot be resolved by the mobile apparatus 20 fails to satisfy a quality threshold requirement (e.g., exceeds a quality threshold number), it may be determined that the decoded route fails to satisfy a quality measure.

When it is determined that the decoded route satisfies the one or more quality measures (e.g., the decoded route length and the route length satisfy the similarity threshold requirement), the route is accepted. For example, the mobile apparatus 20 may accept the route and use the route to complete one or more navigation functions. For example, the mobile apparatus 20 may comprise means, such as processor 22, memory 24, communications interface 26, user interface 28, sensors 29, and/or the like, for (responsive to determining that the decoded route satisfies the one or more quality measures) accepting the decoded route and using the decoded route to perform one or more navigation functions. Some non-limiting examples of navigation functions include providing a route or information corresponding to a geographic area (e.g., via a user interface), localization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like.

When it is determined that the decoded route does not satisfy at least one quality measure (e.g., the decoded route length and the route length do not satisfy the similarity threshold requirement), the route is rejected and a new route is requested. For example, the mobile apparatus 20 may rejected the route and request a new route. For example, the mobile apparatus 20 may comprise means, such as processor 22, memory 24, communications interface 26, and/or the like for (responsive to determining that the decoded route fails to satisfy at last one quality measure) rejecting the route and requesting a new route. For example, the mobile apparatus 20 may generate an updated and/or modified route request and provide (e.g., transmit) the updated and/or modified route request such that the network apparatus 10 receives the updated and/or modified route request. In response to the updated and/or modified route request, the network apparatus 10 may generate a new route, encode a route TME set defined by the same or the new route with a larger/deeper route EDS (e.g., a bit array having more bits than the previously provided bloom filter or a subtree data structure having more levels that the previously provided subtree data structure) and/or the like. The network apparatus 10 may then provide an updated and/or modified route response comprising a route TME set defined by the new route encoded as a route EDS, a route TME set defined by the previous route encoded with a larger/deeper route EDS, and/or the like. The mobile apparatus 20 receives the updated and/or modified route response and determines an updated and/or modified decoded route. In an example embodiment, the mobile apparatus 20 determines if the updated and/or modified decoded route satisfies one or more quality measures to determine if the updated and/or modified decoded route is to be accepted or rejected and a new route is to be requested.

At block 1408, the adjacent TMEs for the decoded route are identified and the delay EDS corresponding to each of the respective adjacent TMEs is identified. For example, the mobile apparatus 20 may identify the adjacent TMEs for the decoded route and determine the delay EDS satisfied by each of the adjacent TMEs. For example, the mobile apparatus 20 may comprise means, such as processor 22, memory 24, and/or the like, for identifying the adjacent TMEs for the decoded route and determining the delay EDS satisfied by each of the adjacent TMEs. For example, the adjacent TMEs for the decoded route may be identified by determining the TMEs that are defined by and/or that are directly connected to the same intersections or nodes as the route TMEs of the decoded route. A map version agnostic identifier for each adjacent TME may be generated, and the delay EDS that the map version agnostic identifier satisfies is determined.

At block 1410, the delay range for each adjacent TME for the route is determined. For example, the mobile apparatus 20 may determine the delay range for each adjacent TME for the route based on the corresponding delay EDS. For example, the mobile apparatus 20 may comprise means, such as processor 22, memory 24, and/or the like, for determining the delay range for each adjacent TME for the route based on the corresponding delay EDS. For example, if a first adjacent TME for the route satisfies a first delay EDS, it is determined that the delay range corresponding to the first adjacent TME is a first range associated with the first delay EDS. In an example embodiment, the route response includes an indication of the first range. In an example embodiment, the delay ranges are preset and the position of the first delay EDS within the bloom filter array included in the route response provides an indication of the present delay range associated with the first delay EDS.

At block 1412, the decoded route and delay information/data is provided. For example, the decoded route and delay information/data may be displayed via a display (e.g., of the user interface 28). For example, the mobile apparatus 20 may provide the decoded route and the delay information/data. For example, the mobile apparatus 20 may comprise means, such as processor 22, memory 24, user interface 28, and/or the like, for providing the decoded route and delay information/data. In various embodiments, the delay information/data may be an indication of the delay range associated with one or more adjacent TMEs for the route. For example, FIG. 15 provides an example view of an IUI of the user interface 28 showing the decoded route 1500 from the decoded origin TME 1502 to the decoded target TME 1504. The adjacent TMEs 1510 (e.g., 1510A-E) are displayed in a manner such that the delay range corresponding to the adjacent TMEs may be determined. For example, the adjacent TMEs 1510C and 1510E may be associated with the shortest delay range (e.g., zero to five minutes and/or the like) and may be shown in green and/or another manner that visually illustrates that the delay associated with adjacent TMEs 1510C and 1510E is relatively small. For example, the adjacent TMEs 1510B and 1510D may be associated with a middle delay range (e.g., five to ten minutes and/or the like) and may be shown in yellow/orange and/or another manner that visually illustrates that the delay associated with adjacent TMEs 1510B and 1510D is a moderate delay. For example, the adjacent TME 1510A may be associated with the longest delay range (e.g., longer than ten minutes, and/or the like) and may be shown in red and/or another manner that visually illustrates that the adjacent TME 1510A is relatively large. For example, a user may view the display of the decoded route and delay information/data and determine, if the user wishes to take a detour from the decoded route, which adjacent TMEs to avoid (e.g., due to long delays along the adjacent TMEs) and which adjacent TMEs are associated with a shorter delay. As should be understood, a path along at least one adjacent TME may be used to build a new route to the destination (e.g., if the user decides to take a detour from the decoded route); however, the full routes that detour from the decoded route are not shown in FIG. 15 for the sake of clarity.

E. Parking Cruise Route

In various embodiments, a user may interact with a mobile apparatus 20 (e.g., via the user interface 28) to request a parking cruise route. In an example embodiment, the mobile apparatus 20 may automatically request a parking cruise route when the mobile apparatus 20 is approaching the destination of a route. In various embodiments, a parking cruise route is a route along which it is expected that parking may be found. In various embodiments, a parking cruise route is a route along which it is expected that on-street parking may be found. In an example embodiment, it is expected that parking will be found along the parking cruise route within a maximum distance of a destination, maximum walking time from the destination, maximum cruising time, and/or the like. FIG. 16 provides a flowchart illustrating operations performed, such as by the network apparatus 10 to provide a parking cruise route response, in accordance with an example embodiment. FIG. 17 provides a flowchart illustrating operations performed, such as by the mobile apparatus 20 to decode and use a parking cruise route, in accordance with an example embodiment.

i. Exemplary Operation of a Network Apparatus

Starting at block 1902 of FIG. 16, a parking cruise request is received. For example, a network apparatus 10 may receive a parking cruise request. For example, a network apparatus 10 may comprise means, such as processor 12, memory 14, communications interface 16, and/or the like for receiving a parking cruise request. In various embodiments, the parking cruise request may comprise a mobile apparatus identifier identifying the mobile apparatus that provided the route request, a parking time (e.g., the time at which parking is desired), map version agnostic information/data identifying a starting location, a maximum distance from a destination, a maximum walking time from a destination, a maximum cruising time (e.g., time expected for a parking spot to be found), a destination near which parking is desired, and/or the like. In various embodiments, the information/data identifying the starting location is independent of a version of the digital map. In an example embodiment, the information/data identifying the starting location is provided as the midpoint and z-level of a mobile version TME corresponding to the current location/position of the mobile apparatus and/or a user provided origin for the route. In various embodiments, the destination near which the user would like to park is provided in a map version agnostic manner. For example, the destination may be provided as a geolocation (e.g., latitude and longitude), street address, POI name, and/or the like.

At block 1904, the network version origin TME is identified. For example, the network apparatus 10 may identify the network version origin TME. For example, the network apparatus 10 may comprise means, such as processor 12, memory 14, and/or the like for identifying the network version origin TME. For example, the information/data identifying the starting location may be map-matched (e.g., using a map matching algorithm, engine, and/or the like) based on the network version of the digital map to identify the network version origin TME. In various embodiments, the information/data identifying the starting location may be map-matched to the network version of the digital map such that an error up to a preset error in the matching of the midpoint corresponding to the starting location to the midpoint of the corresponding TME of the network version of the digital map is tolerated. The z-level corresponding to the starting location may be used for tie breaking in the case where the starting location corresponds to a tunnel, bridge, stacked roads, and/or the like. If the network apparatus cannot exactly match (e.g., within the preset error) a network version origin TME to the information/data identifying the starting location, the POI route response may include a flag indicating such. In an example embodiment, the parking cruise request further includes map version agnostic information/data identifying and/or corresponding to a destination near which parking is desired. The network version destination TME corresponding to the destination near which parking is desired may also be identified.

At block 1906, parking information/data and traffic information/data for TMEs in the vicinity of the destination are accessed. For example, parking and traffic information/data may be accessed (e.g., from a geographic database stored in the memory 14 that stores map information/data corresponding to a network version of a digital map) for TMEs within the maximum distance from the destination. For example, the network apparatus 10 may access parking and traffic information/data for TMEs in the vicinity of the destination. For example, the network apparatus 10 may comprise means, such as processor 12, memory 14, communications interface 16, and/or the like, for accessing parking and traffic information/data for TMEs in the vicinity of the destination. For example, the parking information/data may indicate the probability of finding parking (e.g., on-street parking) on the corresponding TME during a particular epoch (e.g., time window of a day, week, month, year, and/or the like). In an example embodiment, the traffic information/data may provide a travel speed and/or indication thereof (e.g., free flow ratio, and/or the like) along the corresponding TME during a particular epoch (e.g., based on real time or near real time traffic information/data and/or historical/archived traffic information/data). The parking and/or traffic information/data may be accessed corresponding to a particular epoch that corresponds to the parking time. In various embodiments, a variety of other information/data regarding the TMEs within the vicinity of the destination may be accessed from the network version of the digital map, including, for example, a TME length.

At block 1908, a route determination algorithm is initiated at the network version origin TME. For example, the network apparatus 10 may initiate a route determination algorithm at the network version origin TME. For example, the network apparatus 10 may comprise means, such as processor 12, memory 14, and/or the like, for initiating a route determination algorithm at the network version origin TME.

For example, the route determination algorithm may be best-first algorithm, such as a Dijkstra's algorithm, and/or the like. In various embodiments, the route determination algorithm is configured to find a lowest cost route.

At block 1910, the route determination algorithm is expanded to a new TME. For example, the network apparatus 10 may expand the route determination algorithm to a new TME. For example, the network apparatus 10 may comprise means, such as processor 12, memory 14, and/or the like for expanding the route determination algorithm to a new TME. For example, the route determination algorithm is expanded to a new TME that is directly connected to a TME that has already been considered in the algorithm. For example, two TMEs are directly connected if they are both defined by and/or are directly connected to the same intersection or node. Thus, when the route determination algorithm is expanded to the new TME, the state of the route determination algorithm includes a route from the network version origin TME to the new TME.

At block 1912, it is determined if the cost of traversing a route from the network version origin TME to the new TME is greater than a maximum cost value. In an example embodiment, the maximum cost value is the maximum distance from the destination and the cost of traversing a first TME is the length of the TME. In an example embodiment, the maximum cost value is the expected time before finding parking when traversing the route from the network version origin TME to the new TME. For example, the cost for traversing a first TME may be $$\frac{\ell}{(\min(v_c, v_t))} *(1-P),$$

where $\ell$ is the length of the first TME, P is probability of finding parking along the first TME at the parking time (e.g., the time that it is expected the user will be seeking parking), $v_c$ is a cruising cap speed (e.g., the speed it is expected a user would drive when searching for a parking spot) and $v_t$ is the traffic speed along the first TME at the parking time. For example, P may be determined based on the accessed parking information/data corresponding to the first TME and $v_t$ may be determined based on the accessed traffic information/data corresponding to the first TME. For example, the cost of a route may be determined by summing the cost value for each TME of the route. For example, the network apparatus 10 may determine if the cost of traversing a route from the network version origin TME to the new TME is greater than the maximum cost. For example, the network apparatus 10 may comprise means, such as processor 12, memory 14, and/or the like, for determining whether the cost of traversing a route from the network version origin TME to the new TME is greater than the maximum cost. In various embodiments, the maximum cost may be determined based on an element of the parking cruise request or may be a predetermined value.

When it is determined that the cost of traversing the route from the network version origin TME to the new TME is greater than the maximum cost, the process returns to block 1908 and the route determination begins another exploration of the map starting at the network version origin TME. In particular, if the cost of traversing the route from the network version origin TME to the new TME is greater than the maximum cost, it is expected that parking will not be found along the route within the maximum distance of the destination, within a maximum walking time from the destination, or within a maximum cruising time. The route determination algorithm will then attempt to find a new route with a higher probability of parking.

When it is determined that the cost of traversing the route from the network version origin TME to the new TME is not greater than the maximum cost, the process continues to block 1914. At block 1914, it is determined whether the probability of finding parking along the route from the network version origin TME to the new TME is approximately one hundred percent. For example, the network apparatus 10 may determine if it is likely that parking will be found along the route from the network version origin TME to the new TME. For example, the network apparatus 10 may comprise means, such as processor 12, memory 14, and/or the like, for determining whether it is likely that parking will be found along the route from the network version origin TME to the new TME. For example, it may be determined if the likelihood that parking will be found along the route from the network version origin TME to the new TME (during the particular epoch) satisfies a threshold probability requirement. In an example embodiment, a route satisfies a threshold probability requirement when the likelihood that parking will be found along the route exceeds a threshold probability. In various embodiments, the threshold probability is 80%, 85%, 90%, 95%, 99%, and/or the like.

When it is determined that the route from the network version origin TME to the new TME does not satisfy the threshold probability requirement, the process returns to block 1910 and the route determination algorithm is expanded to another new TME that is directly connected to TMEs already considered by the route determination algorithm (e.g., directly connected to the previous new TME).

When it is determined that the route from the network version origin TME to the new TME does satisfy the threshold probability requirement, the new TME is set as the network version target TME for the parking cruise route and the process continues to block 1916. At block 1916, the parking cruise route is extracted from a state of the route determination algorithm. For example, the route from the network version origin TME to the new TME is extracted from the state of the route determination algorithm as the parking cruise route. For example, the network apparatus 10 may extract the route from the network version origin TME to the new TME from the state of the route determination algorithm as the parking cruise route. For example, the network apparatus 10 may comprise means, such as processor 12, memory 14, and/or the like for extracting a route from the network version origin TME to the new TME from the state of the route determination algorithm as the parking cruise route. A route TME set is defined based one the parking cruise route and the route TMEs thereof.

At block 1918, an EDS encoding the route TME set defined by the parking cruise route is produced. For example, the network apparatus 10 may produce an EDS encoding the route TME set defined by the parking cruise route. For example, the network apparatus 10 may comprise means, such as processor 12, memory 14, and/or the like, for producing an EDS encoding the route TME set defined by the parking cruise route. For example, map version agnostic identifiers may be generated for each route TME of the parking cruise route. The map version agnostic identifiers of the route TMEs may then be coded (e.g., using the k or K coding functions) and used to build an EDS. The EDS may then be tested to ensure that none of the adjacent TMEs of the parking cruise route satisfy the EDS. For example, an EDS encoding the route TME set for the parking cruise route may be produced as described above with respect to FIG. 3 or FIG. 4.

At block 1920, a parking cruise route response may be generated and provided. In an example embodiment, the parking cruise route response includes the EDS encoding the route TME set defined by the parking cruise route. For example, the network apparatus 10 may generate and provide a parking cruise route response including the EDS encoding the route TME set defined by the parking cruise route. For example, the network apparatus 10 may comprise means, such as processor 12, memory 14, communications interface 16, and/or the like for generating and providing (e.g., transmitting) a parking cruise route response including the EDS encoding the route TME set defined by the parking cruise route. In an example embodiment, the parking cruise route response may further include a route length of the parking cruise route, information/data identifying a network version starting location of the route, information/data identifying a network version target location of the route, and/or the like. As should be understood, the information/data identifying the network version starting and target locations of the parking cruise route is map version agnostic. For example, in an example embodiment, the information/data identifying the network version starting location is the midpoint of (or other point along) the network version origin TME and the z-level of the network version origin TME, and the information/data identifying the network version target TME is the midpoint of (or other point along) the network version target TME and the z-level of the network version target TME. In various embodiments, the parking cruise route response is provided such that the mobile apparatus 20 that provided the parking cruise request (e.g., as indicated by the mobile apparatus identifier provided in the parking cruise request) receives the parking cruise route response.

ii. Exemplary Operation of a Mobile Apparatus

Starting at block 2002 of FIG. 17, a parking cruise request is generated and provided such that the network apparatus 10 receives the parking cruise request. For example, the mobile apparatus 20 may generate and provide (e.g., transmit) a parking cruise request. For example, the mobile apparatus 20 may comprise means, such as processor 22, memory 24, communications interface 26, user interface 28, location sensor 29, and/or the like, for generating and providing a parking cruise request. In various embodiments, the parking cruise request may comprise a mobile apparatus identifier identifying the mobile apparatus 20, map version agnostic information/data identifying a starting location, a maximum distance from a destination, a maximum walking time from a destination, a maximum cruising time (e.g., time expected for a parking spot to be found), a destination near which parking is desired, a parking time (e.g., the time at which parking is desired), and/or the like. In various embodiments, the information/data identifying the starting location is independent of a version of the digital map. In an example embodiment, the information/data identifying the starting location is provided as the midpoint and z-level of a mobile version TME corresponding to the current location/position of the mobile apparatus and/or a user provided origin for the route. In various embodiments, the destination near which the user would like to park is provided in a map version agnostic manner. For example, the destination may be provided as geolocation (e.g., latitude and longitude), address (e.g., a street address), a street name, a POI name (e.g., city hall, Aden's Famous Ice Cream), and/or the like. For example, a user may interact with the user interface 28 and request a parking cruise route. For example, the user may, operate the user interface 28 to indicate (e.g., provide, select, and/or the like) a destination near which parking is desired, a maximum distance from a destination, a maximum walking time from a destination, a maximum cruising time (e.g., time expected for a parking spot to be found), a parking time, and/or the like. The user may then operate the user interface 28 to submit the user provided and/or selected information/data and to initiate the generation of the parking cruise request. In an example embodiment, the origin of the route is the current location of the mobile apparatus 20 as determined by one or more location sensors 29 of the mobile apparatus. In an example, embodiment, one or more of the parking time, maximum distance from a destination, a maximum walking time from a destination, or a maximum cruising time (e.g., time expected for a parking spot to be found) may be automatically determined based on user preferences (e.g., stored in a user profile corresponding to the user or stored by the mobile apparatus 20). In an example embodiment, the mobile apparatus 20 may automatically generate and provide (e.g., transmit) a parking cruise request when the mobile apparatus 20 is approaching a destination (e.g., without user input or only with user input confirming that a parking cruise request should be generated). For example, the mobile apparatus 20 (e.g., based on location information/data determined by location sensor 29) may determine that the mobile apparatus 20 is within a threshold distance and/or a threshold travel time of the destination and, responsive thereto, generate and provide a parking cruise request.

As noted above, the mobile apparatus 20 may receive (e.g., via user interface 28 and/or from location sensor 29) an origin of the parking cruise route. The mobile apparatus 20 may then map match the origin of the parking cruise route to a TME of the mobile version of the digital map. This mobile version origin TME (e.g., a TME of a mobile version of the digital map to which the origin has been map-matched) is used to determine the map version agnostic information/data identifying the starting location. In an example embodiment, the information/data identifying the starting location is provided as the midpoint and z-level of the mobile version origin TME.

At block 2004, a parking cruise route response is received. For example, the network apparatus 10 may generate and provide a parking cruise route response, in response to the parking cruise request, and provide the parking cruise route response such that the mobile apparatus 20 receives the parking cruise route response. For example, the mobile apparatus 20 may receive the parking cruise route response. For example, the mobile apparatus 20 may comprise means, such as processor 22, memory 24, communications interface 26, and/or the like for receiving the parking cruise route response. In an example embodiment, the parking cruise route response includes an EDS (e.g., as a bit array) encoding the route TME set defined by the parking cruise route determined by the network apparatus 10. In an example embodiment, the parking cruise route response may further include a route length of the parking cruise route, information/data identifying a network version starting location of the route, information/data identifying a network version target location of the route, and/or the like. As should be understood, the information/data identifying the network version starting and target locations of the parking cruise route is map version agnostic. For example, in an example embodiment, the information/data identifying the network version starting location is the midpoint of (or other point along) the network version origin TME and the z-level of the network version origin TME, and the information/data identifying the network version target TME is the midpoint of (or other point along) the network version target TME and the z-level of the network version target TME.

At block 2006, a decoded origin TME and decoded target TME for the parking cruise route are identified. For example, the mobile apparatus 20 may identify and/or determine a decoded origin TME and a decoded target TME for the parking cruise route using the mobile version of the digital map. For example, the mobile apparatus 20 may comprise means, such as processor 22, memory 24, and/or the like, for identifying and/or determining a decoded origin TME and a decoded target TME for the parking cruise route using the mobile version of the digital map. For example, the map version agnostic information/data identifying the network version starting location may be map-matched using the mobile version of the digital map to identify a decoded origin TME corresponding to the network version starting location. Similarly, the map version agnostic information/data identifying the network version target location may be map-matched using the mobile version of the digital map to identify a decoded target location corresponding to the network version target location.

At block 2008, traffic and/or parking information/data is accessed. For example, the mobile apparatus 20 may access traffic and/or parking information/data. For example, the mobile apparatus 20 may comprise means, such as processor 22, memory 24, and/or the like, for accessing traffic and/or parking information/data. In various embodiments, the traffic and/or parking information/data is accessed for TMEs near and/or between the decoded origin TME and the decoded target TME for an epoch corresponding to the parking time. For example, the parking information/data may indicate the probability of finding parking (e.g., on-street parking) on the corresponding TME during a particular epoch (e.g., time window of a day, week, month, year, and/or the like) corresponding to the parking time. In an example embodiment, the traffic information/data may provide a travel speed and/or indication thereof (e.g., free flow ratio, and/or the like) along the corresponding TME during a particular epoch corresponding to the parking time. In various embodiments, the traffic and/or parking information/data is accessed from a geographic database (e.g., stored in memory 24) storing map information/data of the mobile version of the digital map. For example, the traffic and/or parking information/data accessed for a first TME may include P, the probability of finding parking along the first TME during an epoch corresponding to the parking time (e.g., the time that it is expected the user will be seeking parking), and $v_t$, the traffic speed along the first TME during an epoch corresponding to the parking time.

At block 2010, map information/data from the mobile version of the digital map for generating map version agnostic identifiers for TMEs is accessed. For example, the mobile apparatus 20 may access map information/data from a geographic database storing map information/data of the mobile version of the digital map from memory 24.

In various embodiments, the cost value assigned to a TME is determined based on whether the TME satisfies the EDS. For example, if a coded map version agnostic identifier corresponding to a first TME satisfies the EDS, the first TME is assigned a minimal cost value. For example, the first TME may be assigned a cost value of zero. However, if the coded map version agnostic identifier corresponding to the first TME does not satisfy the EDS, the first TME is assigned a positive cost value (e.g., based on the length of the TME, expected time of traversal for the TME, a current or expected traffic level for the TME, the probability of finding parking along the TME, and/or the like). Thus, map information/data for generating map version agnostic identifiers for TMEs may be accessed from the mobile version of the digital map for use in determining whether a TME satisfies the EDS. For example, a TME record corresponding to a TME may be accessed and map version agnostic information/data may be extracted therefrom. In an example embodiment, elements of the TME record to be accessed for generating a map version agnostic identifier for the TME are pre-established and/or defined. In particular, the elements of the TME record to be accessed for use in generating a map version agnostic identifier are the same elements of the network version of the digital map used by the network apparatus to generate the map version agnostic identifiers that were coded to produce the EDS. For example, the map version agnostic identifier may be generated using a map version agnostic identifier algorithm and the mobile apparatus 20 and the network apparatus 10 may use the same map version agnostic identifier algorithm. For example, the map version agnostic identifier may be generated using a map version agnostic identifier algorithm and the mobile apparatus 20 and the network apparatus 10 may use the same map version agnostic identifier algorithm. For example, the map version agnostic map information/data accessed for a TME may include a road name associated with the TME, TME length, a direction of travel of the TME, a functional class of the TME, speed limit associated with the TME, and/or the like, in various embodiments.

The map version agnostic map information/data corresponding to a TME may then be used to generate a map version agnostic identifier for the TME. For example, the accessed map version agnostic information/data corresponding to a TME may be combined in a pre-established and/or defined manner (e.g., in the same manner as the generation of the map version agnostic identifiers where generated by the network apparatus 10) to generate a map version agnostic identifier configured to identify the TME. The map version agnostic identifier may then be used to determine if the corresponding TME satisfies the EDS. If the TME satisfies the EDS, the TME is assigned a minimal (e.g., zero) cost value. If the TME does not satisfy the EDS, the TME may be assigned a cost value based on map information/data (e.g., length of the TME, probability of finding (on-street) parking along the TME during an epoch corresponding to the parking time, travel speed along the TME during an epoch corresponding to the parking time, and/or the like). In an example embodiment, the cost value assigned to a TME may be the length of the TME divided by the travel speed along the TME during an epoch corresponding to the parking time (e.g., $\ell/v_t$). In an example embodiment, the cost value assigned to a TME may be the length of the TME divided by the travel speed along the TME during an epoch corresponding to the parking time and multiplied by one minus the probability of finding (on-street) parking along the TME during the epoch corresponding to the parking time $$\left(\text{e.g.,} \ \frac{\ell}{v_t} * (1-P)\right).$$

In an example embodiment, blocks 2008 and 2010 may be performed concurrently with block 2012 such that the traffic, parking, and/or map information/data for generating a map version agnostic identifier and assigning a cost value to a first TME is accessed when a route determining algorithm is expanded to the first TME. For example, traffic, parking, and/or map information/data for assigning a cost value to a first TME (e.g., including the map version agnostic information/data used to generate a map version agnostic identifier for use in determining if the first TME satisfies the EDS) may be accessed and the cost value assigned to the first TME based thereon, in response to a route determining algorithm considering whether the first TME is part of the decoded route.

At block 2012, a decoded route is determined by identifying the lowest cost route from the decoded origin TME to the decoded target TME. For example, the mobile apparatus 20 may determine a decoded route by determining the lowest cost route from the decoded origin TME to the decoded target TME. For example, the mobile apparatus 20 may comprise means, such as processor 22, memory 24, and/or the like, for determining a decoded route by determining the lowest cost route from the decoded origin TME to the decoded target TME. For example, the lowest cost route may be determined based on the cost value assigned to TMEs between the decoded origin TME and the decoded target TME. In various embodiments, a best-first algorithm may be used to determine the decoded route. In an example embodiment, a version of Dijkstra's algorithm or another cost minimization algorithm may be used to determine the decoded route.

At block 2014, it is determined if the decoded route satisfies one or more quality measures. In an example embodiment, the one or more quality measures comprise the length of the decoded route being similar to the route length provided as part of the route response. For example, a decoded route length may be determined and compared to the route length provided by the route response. In an example embodiment, the decoded route length is determined by summing the length of each TME in the decoded route based on the mobile version of the digital map. For example, it may be determined if the decoded route length and the route length satisfy a similarity threshold requirement. In an example embodiment, the ratio of the decoded route length and the route length may be compared to a similarity range to determine if the decoded route length and the route length satisfy a similarity threshold requirement. For example, if the ratio of the decoded route length to the route length is within the similarity range, it may be determined that the decoded route is an acceptable route. If the ratio of the decoded route length to the route length is not within the similarity range, it may be determined that the decoded route is not an acceptable route. In various embodiments, the similarity range is a predetermined range. In some example embodiments, the similarity range is 0.7 to 1.3, 0.75 to 1.25, 0.8 to 1.2, 0.85 to 1.15, 0.9 to 1.1, and/or 0.95 to 1.05. For example, the mobile apparatus 20 may determine if the decoded route length and the route length satisfy a similarity threshold requirement. For example, the mobile apparatus 20 may comprise means, such as processor 22, memory 24, and/or the like, for determining if the decoded route length and the route length satisfy the similarity threshold requirement.

In an example embodiment, the one or more quality measures may include determining whether the number of elements in the EDS that the mobile apparatus 20 cannot resolve satisfies a quality threshold requirement. When the number of elements of the EDS that cannot be resolved by the mobile apparatus 20 fails to satisfy a quality threshold requirement (e.g., exceeds a quality threshold number), it may be determined that the decoded route fails to satisfy a quality measure.

When it is determined that the decoded route satisfies the one or more quality measures (e.g., the decoded route length and the route length satisfy the similarity threshold requirement), the process continues to block 2016 and the route is accepted. For example, the mobile apparatus 20 may accept the route and use the route to complete one or more navigation functions. For example, the mobile apparatus 20 may comprise means, such as processor 22, memory 24, communications interface 26, user interface 28, sensors 29, and/or the like, for (responsive to determining that the decoded route satisfies the one or more quality measures) accepting the decoded route and using the decoded route to perform one or more navigation functions. Some non-limiting examples of navigation functions include providing a route or information corresponding to a geographic area (e.g., via a user interface), localization, route determination, lane level route determination, operating a vehicle along at least a portion of a route, operating a vehicle along at least a portion of a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, and/or the like. For example, the mobile apparatus 20 may provide the decoded route to a user such that the user may control the vehicle along at least a portion of the decoded route in search of parking. In an example embodiment, when the mobile apparatus 20 determines that the vehicle 5 is traversing the decoded route, the mobile apparatus 20 may cause one or more sensors 29 of the vehicle 5 to operate in a parking mode to automatically identify available parking spaces along the decoded route and provide a user perceivable alert when an available parking space is identified. For example, the mobile apparatus 20 may control the vehicle 5 in a parking cruise mode to traverse at least a portion of the decoded route in search of parking and may (automatically) park the vehicle 5 in an (automatically) identified parking space. In an example embodiment, when the vehicle 5 is parked, the mobile apparatus 20 may provide a communication such that the communication is received by the network apparatus 10 indicating the location where parking was found such that the network apparatus 10 may maintain updated parking information/data.

When it is determined that the decoded route does not satisfy at least one quality measure (e.g., the decoded route length and the route length do not satisfy the similarity threshold requirement), the process continues to block 2018. At block 2018, the route is rejected and a new parking cruise route is requested. For example, the mobile apparatus 20 may reject the route and request a new parking cruise route. For example, the mobile apparatus 20 may comprise means, such as processor 22, memory 24, communications interface 26, and/or the like for (responsive to determining that the decoded route fails to satisfy at least one quality measure) rejecting the route and requesting a new parking cruise route. For example, the mobile apparatus 20 may generate an updated and/or modified parking cruise request and provide (e.g., transmit) the updated and/or modified parking cruise request such that the network apparatus 10 receives the updated and/or modified parking cruise request. In response to the updated and/or modified parking cruise request, the network apparatus 10 may generate a new parking cruise route, encode a route TME set defined by the same or the new parking cruise route with a larger/deeper EDS (e.g., a bit array having more bits than the previously provided bloom filter or a subtree data structure having more levels than the previous subtree data structure) and/or the like. The network apparatus 10 may then provide an updated and/or modified parking cruise route response comprising a route TME set defined by the new parking cruise route encoded as an EDS, a route TME set defined by the previous parking cruise route encoded with a larger/deeper EDS, and/or the like. The mobile apparatus 20 receives the updated and/or modified parking cruise route response and determines an updated and/or modified decoded route. In an example embodiment, the mobile apparatus 20 determines if the updated and/or modified decoded route satisfies one or more quality measures to determine if the updated and/or modified decoded route is to be accepted or rejected and a new parking cruise route is to be requested.

F. Incremental Updates

In various embodiments, categorical information/data may be encoded using an array of EDSs. For example, for each category, an EDS may be generated that encodes the TMEs of the corresponding category. For example, an EDS may be generated that encodes map version agnostic identifiers for TMEs that are associated with the corresponding category. As should be understood a TME that was associated with a first category at a first time may be associated with a second category at a second time. For example, the probability of finding parking along a TME may be different at 2 pm compared to 10 pm. In another example, the expected traffic delays along a TME may be different at 5 am and 8 am. Thus, incremental updates (e.g., for categorical information/data) may be encoded using EDSs and/or arrays of EDSs (e.g., bloom filters, subtree data structures, and/or the like). FIG. 18 provides a flowchart illustrating operations performed, such as by the network apparatus 10 to provide a parking information response and incremental updates thereto, in accordance with an example embodiment. FIG. 21 provides a flowchart illustrating operations performed, such as by the mobile apparatus 20 to decode and use a parking information response, in accordance with an example embodiment.

i. Exemplary Operation of a Network Apparatus

Starting at block 2102, a parking information request is received. For example, a network apparatus 10 may receive a parking information request. For example, a network apparatus 10 may comprise means, such as processor 12, memory 14, communications interface 16, and/or the like for receiving a parking information request. In various embodiments, the parking information request may be received as part of and/or in association with a route request. In various embodiments, the parking information request may comprise a mobile apparatus identifier identifying the mobile apparatus that provided the parking information request; a parking time (e.g., the time at which parking is desired); map version agnostic information/data identifying a current location, a destination near which parking is desired, and/or a zone of interest within which parking is desired; a maximum distance from a destination near which parking is desired; a maximum walking time from a destination near which parking is desired; a refresh rate at which the parking information should be updated; and/or the like. In various embodiments, the information/data identifying a current location of the mobile apparatus 20, a destination near which parking is desired, and/or a zone of interest within which parking is desired is independent of a version of the digital map. In an example embodiment, the information/data identifying the current location of the mobile apparatus 20 and/or the destination near which parking is desired is provided as the midpoint and z-level of a mobile version TME corresponding to the current location/position of the mobile apparatus 20 and/or the destination near which parking is desired. For example, the current location of the mobile apparatus 20 and/or the destination near which parking is desired may be provided as a geolocation (e.g., latitude and longitude), street address, POI name, and/or the like. In an example embodiment, a zone of interest may be provided. In an example embodiment, the zone of interest may be neighborhood, a destination near which parking is desired and a walking time and/or distance from the destination within which the parking is desired, a series of geolocations (e.g., latitude and longitude pairs) that define a polygon and/or the like within which parking is desired, a tile of a digital map, and/or other information that defines a zone of interest with a geographic area.

In an example embodiment, receipt of the parking information request causes a persistent connection between the mobile apparatus 20 and the network apparatus 10 to be initialized. As should be understood, a persistent connection is a network communication channel that remains open for further requests and responses rather than closing after a single exchange.

At block 2104, parking information/data is accessed for TMEs within the zone of interest. For example, parking information/data may be accessed (e.g., from a geographic database stored in the memory 14 that stores map information/data corresponding to a network version of a digital map) for TMEs within the zone of interest. For example, the network apparatus 10 may access parking information/data for TMEs in within the zone of interest. For example, the network apparatus 10 may comprise means, such as processor 12, memory 14, communications interface 16, and/or the like, for accessing parking information/data for TMEs within the zone of interest. For example, the parking information/data may indicate the probability of finding parking (e.g., on-street parking) on the corresponding TME during a particular epoch (e.g., time window of a day, week, month, year, and/or the like). In various embodiments, the parking information/data may be based on real time or near real time parking information/data (e.g., based on real time or near real time probe information/data) and/or historical/archived parking information/data. The parking information/data may be accessed corresponding to a particular epoch that corresponds to the parking time and/or to the current time. In an example embodiment, TMEs within the zone of interest but having a functional class indicating that parking is not available along the TME may not be considered. For example, if the zone of interest includes a TME that is a part of an interstate, parking information/data may not be provided for the TME.

At block 2106, a parking category is determined for each TME within the zone of interest. For example, based on the accessed parking information/data for the TMEs within the zone of interest for the epoch corresponding to the parking time, each TME may be assigned a parking category. In an example embodiment, the parking categories may be groups of TMEs that share a similar likelihood that (on-street) parking may be found along the TME during the epoch. For example, the network apparatus 10 may determine and/or assign a parking category to one or more (e.g., each) TME within the zone of interest based on the parking information/data corresponding to the TME. For example, the network apparatus 10 may comprise means, such as processor 12, memory 14, and/or the like for determining and/or assigning a parking category to one or more (e.g., each) TME within the zone of interest based on the parking information/data corresponding to the TME.

For example, a first parking category may be a high probability category and TMEs associated with parking information/data that indicates that there's a high likelihood that (on-street) parking may be found on the TME during the epoch may be assigned to the high probability category. For example, a second parking category may be a medium probability category and TMEs associated with parking information/data that indicates that there's a mediocre likelihood that (on-street) parking may be found on the TME during the epoch may be assigned to the medium probability category. As yet another example, a third parking category may be a low probability category and TMEs associated with parking information/data that indicates that there's a low likelihood that (on-street) parking may be found on the TME during the epoch may be assigned to the low probability category. For example, the parking information/data corresponding to a first TME during a first epoch may indicate a percentage or probability that (on-street) parking is available on the first TME during the first epoch. When the probability that (on-street) parking is available on the first TME during the first epoch satisfies a first threshold criteria (e.g., is equal to or greater than a first probability (e.g., 95%, 90%, 85%, 80%, 75%, and/or the like)) the first TME is assigned to the first parking category (e.g., high probability category). When the probability that (on-street) parking is available on the first TME during the first epoch satisfies a second threshold criteria (e.g., less than the first probability (e.g., 95%, 90%, 85%, 80%, 75%, and/or the like) and greater than a second probability (e.g., 40%, 45%, 50%, 55%, 60%, and/or the like)) the first TME is assigned to the second parking category (e.g., medium probability category). When the probability that (on-street) parking is available on the first TME during the first epoch satisfies a third threshold criteria (e.g., is less than or equal the second probability (e.g., 40%, 45%, 50%, 55%, 60%, and/or the like)) the first TME is assigned to the third parking category (e.g., low probability category). In an example embodiment, TMEs for which there isn't sufficient information/data for determining a parking category for the TME during the epoch may be assigned to a not enough information/data (NEI) category. As should be understood, various parking categories and various numbers of parking categories may be defined as appropriate for the application.

At block 2108, parking category sets are defined and/or generated. For example, a parking category set is a set comprising the map version agnostic identifiers corresponding to each of the TMEs determined to be and/or assigned to the corresponding parking category. For example, for each parking category, a parking category set is defined and/or generated. For example, a first parking category parking set may comprise and/or consist of map version agnostic identifiers corresponding to each of the TMEs determined to be in and/or assigned to the first parking category. To define and/or generate the parking category set corresponding to a first parking category, map information/data is accessed from the network version of the digital map to generate a map version agnostic identifier for each TME determined to be in and/or assigned to the first parking category. For example, the network apparatus 10 may access map information/data corresponding to TMEs within the zone of interest and generate map version agnostic identifiers for each of the TMEs within the zone of interest. The network apparatus 10 may then populate parking category sets with the map version agnostic identifiers for TMEs determined to be in and/or assigned to the corresponding parking category. For example, the network apparatus 10 may comprise means, such as processor 12, memory 14, communication interface 16, and/or the like for accessing map information/data corresponding to TMEs within the zone of interest, generating map version agnostic identifiers for each of the TMEs within the zone of interest, and populating parking category sets with the map version agnostic identifiers for TMEs determined to be in and/or assigned to the corresponding parking category.

At block 2110, an EDS may be produced and/or generated encoding each parking category set. For example, an EDS may be produced and/or generated for each parking category. For example, the network apparatus 10 may produce an EDS encoding each parking category set. For example, the network apparatus 10 may comprise means, such as processor 12, memory 14, and/or the like, for producing an EDS encoding each parking category set. For example, the map version agnostic identifiers of the TMEs in a parking category set may be coded (e.g., using the k or K coding functions) and used to build an EDS corresponding to that parking category. An EDS corresponding to a first parking category may then be tested to ensure that none of the TMEs within the zone of interest and not in the first parking category satisfy the EDS. In an example embodiment, the test set T used to test whether any TMEs within the zone of interest and not in the first parking category satisfy the EDS corresponding to the first parking category may be a randomly or non-randomly selected subset of the TMEs within the zone of interest and not in the first parking category. In various embodiments, the number of EDSs corresponding to parking categories that are produced is equal to the number of parking categories. In various embodiments, EDSs encoding the parking category sets for the zone of interest for the epoch may be produced as described above with respect to FIG. 3 or FIG. 4.

At block 2112, a parking information response is generated and provided. In various embodiments, the parking information response comprises EDSs corresponding to the parking categories. For example, the parking information response comprises one or more EDSs that each corresponding to one of the parking categories. In an example embodiment, the parking information response may comprise a map version agnostic indication of the zone of interest, destination near which parking is desired, and/or the like. For example, the network apparatus 10 generates and provides a parking information response including EDSs corresponding to the parking categories. For example, the network apparatus 10 may comprise means, such as processor 12, memory 14, communications interface 16, and/or the like, for generating and providing a parking information response including the EDSs corresponding to the parking categories. For example, the network apparatus 10 may provide (e.g., transmit) the parking information response such that the mobile apparatus 20 corresponding to the mobile apparatus identifier provided in the parking information request receives the parking information response. For example, the parking information response may be provided via the persistent connection established between the mobile apparatus 20 and the network apparatus 10. In an example embodiment, the EDSs corresponding to the parking categories are provided as an array. For example, the parking information response may comprise an array populated with the bit arrays of the EDSs corresponding to the parking categories. For example, in an embodiment wherein three parking categories are defined (e.g., high probability, medium probability, and low probability, for example), three EDSs are produced (e.g., one EDS corresponding to each parking category), and the array may comprise the bit array corresponding to the first EDS (e.g., corresponding to the first parking category) in a first position of the array, the bit array corresponding to the second EDS (e.g., corresponding to the second parking category) in a second position of the array, and the bit array corresponding to the third EDS (e.g., corresponding to the third parking category) in a third position of the array. If the parking categories are preset, the parking information response may not include an indication of which EDS corresponds to which parking category. For example, if the parking categories are preset, which EDS corresponds to which parking category may be determined (e.g., by the mobile apparatus 20) based on the position of the EDSs within the array provided in the parking information response. In an example embodiment, a parking information response may be provided as part of and/or in association with a route response.

At block 2114, incremental update responses may be iteratively generated and provided. For example, incremental update responses may be generated and provided in accordance with a refresh rate. In an example embodiment, the refresh rate is provided in the parking information request. In an example embodiment, the refresh rate is determined based on a time of day of the parking time, preferences associated with the mobile apparatus identifier, and/or the like. For example, the network apparatus 10 may generate and provide incremental update responses in accordance with the refresh rate. For example, the network apparatus 10 may comprise means, such as processor 12, memory 14, communications interface 16, and/or the like for generating and providing incremental update responses in accordance with the refresh rate. In various embodiments, an incremental update response comprises one or more EDSs that each correspond to a parking category. For example, each EDS of an incremental update response may correspond to and/or encode the TMEs assigned to the corresponding parking category. As should be understood, block 2114 may be repeated a plurality of times to generate and provide incremental update responses in accordance with the refresh rate until the persistent connection between the mobile apparatus 20 and the network apparatus 10 is closed. In an example embodiment, the zone of interest is determined at least in part based on a current location of the mobile apparatus 20. Thus, in some embodiments, the zone of interest may change between subsequent incremental update responses.

In various embodiments, the incremental update responses provide incremental updates to the parking information previously provided by the network apparatus 10 to the mobile apparatus 20. For example, rather than providing information/data for each TME within the zone of interest during each update, updates may be provided only for TMEs within the zone of interest that are assigned to a different category than they were assigned to when the previous parking information was provided. For example, a first TME may be assigned to a first parking category during both a first time period and a second time period, the first time period corresponding to an incremental update that immediately precedes the incremental update corresponding to the second time period. Thus, parking information regarding the first TME may only be provided during a parking information response corresponding to the first time period. In another example, a second TME may be assigned to the first parking category during the first time period and a second parking category during the second time period. Parking information regarding the second TME may be provided during a parking information response corresponding to the first time period and during an incremental update response corresponding to the second time period.

FIG. 19 provides a flowchart illustrating operations performed by the network apparatus 10, for example, to generate and/or produce EDSs that provide incremental updates to the parking information/data for TMEs within a zone of interest. Starting at block 2202, a current group and previous group are initialized for each parking category. For example, in the example embodiment having high parking probability, medium parking probability, low parking probability, and unknown parking probability categories, a current group of high parking probability TMEs, a previous group of high parking probability TMEs, a current group of medium parking probability TMEs, a previous group of medium parking probability TMEs, a current group of low parking probability TMEs, a previous group of low parking probability TMEs, a current group of unknown parking probability TMEs, and a previous group of unknown parking probability TMEs are initialized. For example, the network apparatus 10 may initialize a current group and a previous group for each parking category. For example, the network apparatus 10 may comprise means, such as processor 12, memory 14, communications interface 16, and/or the like, for initializing a current group and a previous group for each parking category.

In an example embodiment, initializing a previous group for a parking category includes defining and/or establishing an empty group or set corresponding to the parking category and then populating the group with the TME identifiers of the current group corresponding to the parking category from the previous iteration or update. In other words, for update B, the previous group for a parking category is equal to and/or contains the same members as the current group for the parking category from update A, when update A is the update immediately preceding update B. The current group for a parking category may be defined and/or established as an empty group or set corresponding to the parking category. For example, the current group for a parking category may be initialized as an empty group or set.

At block 2204, current parking information/data is accessed for TMEs within the zone of interest. For example, parking information/data may be accessed (e.g., from a geographic database stored in the memory 14 that stores map information/data corresponding to a network version of a digital map) for TMEs within the zone of interest. For example, the network apparatus 10 may access parking information/data for TMEs in within the zone of interest. For example, the network apparatus 10 may comprise means, such as processor 12, memory 14, communications interface 16, and/or the like, for accessing parking information/data for TMEs within the zone of interest. For example, the parking information/data may indicate the probability of finding parking (e.g., on-street parking) on the corresponding TME at the current time. In various embodiments, the parking information/data may be based on real time or near real time parking information/data (e.g., based on real time or near real time probe information/data) and/or historical/archived parking information/data. The parking information/data may be accessed based on the current time (e.g., the time at which the update is being generated). In an example embodiment, TMEs within the zone of interest but having a functional class indicating that parking is not available along the TME may not be considered. For example, if the zone of interest includes a TME that is a part of an interstate or other highway along which parking is not allowed, parking information/data may not be provided for the TME.

At block 2206, a parking category is determined for each TME within the zone of interest and each TME is assigned to the current group of the determined parking category. For example, based on the accessed parking information/data for the TMEs within the zone of interest, each TME may be assigned a parking category. In an example embodiment, the parking categories may be groups of TMEs that share a similar likelihood that (on-street) parking may be found along the TME during the current time. For example, the network apparatus 10 may determine and/or assign a parking category to one or more (e.g., each) TME within the zone of interest based on the parking information/data corresponding to the TME. For example, the network apparatus 10 may comprise means, such as processor 12, memory 14, and/or the like for determining and/or assigning a parking category to one or more (e.g., each) TME within the zone of interest based on the parking information/data corresponding to the TME. As described above, the determination of which parking category a TME is assigned to may be based at least in part on whether the parking information/data corresponding to the TME satisfies one or more threshold requirements. Once a parking category has been determined for a TME, the TME is assigned to the current group for the determined parking category.

At block 2208, an EDS is generated and/or produced corresponding to the current group for each parking category. For example, an EDS may be produced and/or generated for each parking category with the encoded members of the EDS being map version agnostic identifiers for TMEs of the current group for the parking category. For example, for each parking category, the network apparatus 10 may produce an EDS encoding map version agnostic identifiers for TMEs for the corresponding current group. For example, the network apparatus 10 may comprise means, such as processor 12, memory 14, and/or the like, for producing EDSs encoding map version agnostic identifiers configured to identify the TMEs of respective current groups for respective parking categories. For example, the map version agnostic identifiers for TMEs in the current group of a parking category may be coded (e.g., using the k or K coding functions) and used to build an EDS corresponding to the current group for that parking category.

Each of the EDSs may then be tested to ensure that none of the members of a corresponding test set T satisfy the EDS. For example, an EDS corresponding to the current group for a first parking category may be tested to ensure that none of the TMEs within the zone of interest and not in the current group for the first parking category satisfy the EDS. In an example embodiment, the test set T used to test whether any TMEs within the zone of interest and not in the current group for the first parking category satisfy the EDS corresponding to the first parking category may be a randomly or non-randomly selected subset of the TMEs within the zone of interest and not in the current group for the first parking category. In an example embodiment, the test set T used to test the EDS corresponding to the current group for a first parking category may comprise map version agnostic identifiers for TMEs that are in the previous group for the first parking category but are not in the current group for the first parking category. In various embodiments, the number of EDSs corresponding to parking categories that are produced is equal to the number of parking categories. In various embodiments, EDSs respectively encoding the current group for a parking category for the zone of interest for the current time may be produced as described above with respect to FIG. 3 or FIG. 4.

The EDSs may then be provided as part of an incremental update response. For example, the EDSs corresponding to the current groups for the parking categories may be provided as part of an incremental update response. For example, the network apparatus 10 may provide (e.g., transmit) the incremental update response such that the mobile apparatus 20 corresponding to the mobile apparatus identifier provided in the parking information request receives the incremental update response. For example, the update parking information response may be provided via the persistent connection established between the mobile apparatus 20 and the network apparatus 10. In an example embodiment, the EDSs corresponding to the current groups for the parking categories are provided as an array. For example, the incremental update response may comprise an array populated with the bit arrays of the EDSs corresponding to the current groups for the parking categories.

In an example embodiment, an EDS corresponding to a current group for a parking category only encodes the coded map version agnostic identifiers corresponding to TMEs that are in the current group for the parking category but are not in the previous group for the parking category. In other words, the EDS corresponding to the current group for a first parking category may be generated based on TMEs that were assigned to the first parking category for the current update but were not assigned to the first parking category for the immediately preceding update. FIG. 20 provides a flowchart of an incremental update operation and/or process 2300 that may be performed, for example by the network apparatus 10, during the generation and/or producing of an EDS to provide an EDS that encodes an incremental update. For example, the incremental update operation and/or process 2300 may be performed as part of block 306 when the EDSs are generated in accordance with FIG. 3 or as part of block 406 when the EDSs are generated in accordance with FIG. 4. For example, the incremental update operation and/or process 2300 may be performed for each map version agnostic identifier and/or corresponding TME prior to the map version agnostic identifier being coded and added to the EDS.

Starting at block 2302, a TME and/or corresponding map version agnostic identifier is selected from the current group for a parking category to be encoded into the corresponding EDS. For example, the network apparatus 10 may select a TME and/or corresponding map version agnostic identifier from the current group for a parking category. For example, the network apparatus 10 may comprise means, such as processor 12, memory 14, and/or the like, for selecting a TME and/or corresponding map version agnostic identifier from the current group for a parking category. For example, each TME within the current group for a parking category may be selected in turn for consideration and/or may be considered via a parallel consideration process.

At block 2304, it is determined whether the selected TME is a member of the previous group for the parking category. For example, the previous group for the parking category may be queried to determine if the selected TME is a member of the previous group for the parking category. In other words, it may be determined if the selected TME is assigned to the same parking category for the current update as for the immediately preceding update. For example, the network apparatus 10 may determine whether the selected TME is in the previous group for the same parking group for which the selected TME is in the current group. For example, the network apparatus 10 may comprise means, such as processor 12, memory 14, and/or the like, for determining whether the selected TME is in the previous group for the same parking group for which the selected TME is in the current group.

When it is determined, at block 2304, that the selected TME is not in the previous group for the same parking group for which the selected TME is in the current group, the process continues to block 2306. At block 2306, the map version agnostic identifier for the selected TME is coded (e.g., using the k or K coding functions) and added to the EDS for the current group for the parking category. For example, the network apparatus 10 may code the map version agnostic identifier for the selected TME and update the EDS for the current group for the parking category based on the coded map version agnostic identifier for the selected TME such that the selected TME will satisfy the EDS. For example, the network apparatus 10 may comprise means, such as processor 12, memory 14, and/or the like for coding the map version agnostic identifier for the selected TME and updating the EDS for the current group for the parking category based on the coded map version agnostic identifier for the selected TME such that the selected TME will satisfy the EDS. In other words, if the selected TME was assigned to a different parking category for the immediately preceding update, the map version agnostic identifier for the selected TME is coded and added to the EDS for the current group for the parking category that the selected TME is assigned to for the current update. The process may then return to block 2302 and a new TME may be selected from the current group for the parking category.

When it is determined, at block 2304, that the selected TME is in the previous group for the same parking category for which the selected TME is in the current group, the process returns to block 2302 and a different TME is selected. In other words, if the selected TME was assigned to the same parking category for the immediately preceding update, the map version agnostic identifier for the selected TME is not coded and added to the EDS for the current group for the parking category that the selected TME is assigned to for the current update. This process may continue until all of the TMEs in the current group for the parking category have been considered, at which point the EDS corresponding to the current group for the parking category will have been generated.

ii. Exemplary Operation of a Mobile Apparatus

Starting at block 2402 of FIG. 21, a parking information request is generated and provided such that the network apparatus 10 receives the parking information request. For example, the mobile apparatus 20 may generate and provide (e.g., transmit) a parking information request. For example, the mobile apparatus 20 may comprise means, such as processor 22, memory 24, communications interface 26, user interface 28, location sensor 29, and/or the like, for generating and providing a parking information request. In various embodiments, a parking information request may be generated and provided as part of and/or in association with a route request. In an example embodiment, a parking information request is generated and provided independent of a route request. In an example embodiment, the mobile apparatus 20 initiates a persistent connection between the mobile apparatus 20 and the network apparatus 10 and the parking information request is provided via the persistent connection.

In various embodiments, the parking information request may comprise a mobile apparatus identifier identifying the mobile apparatus that provided the parking information request; a parking time (e.g., the time at which parking is desired); map version agnostic information/data identifying a current location, a destination near which parking is desired, and/or a zone of interest within which parking is desired; a maximum distance from a destination near which parking is desired; a maximum walking time from a destination near which parking is desired; a refresh rate at which the parking information should be updated; and/or the like. In various embodiments, the information/data identifying a current location of the mobile apparatus 20, a destination near which parking is desired, and/or a zone of interest within which parking is desired is independent of a version of the digital map. In an example embodiment, the information/data identifying the current location of the mobile apparatus 20 and/or the destination near which parking is desired is provided as the midpoint and z-level of a mobile version TME corresponding to the current location/position of the mobile apparatus 20 and/or the destination near which parking is desired. For example, the current location of the mobile apparatus 20 and/or the destination near which parking is desired may be provided as a geolocation (e.g., latitude and longitude), street address, POI name, and/or the like. In an example embodiment, a zone of interest may be provided. In an example embodiment, the zone of interest may be neighborhood, a destination near which parking is desired and a walking time and/or distance from the destination within which the parking is desired, a series of geolocations (e.g., latitude and longitude pairs) that define a polygon and/or the like within which parking is desired, a tile of a digital map, and/or other information that defines a zone of interest with a geographic area.

For example, a user may interact with the user interface 28 and request parking information. For example, the user may, operate the user interface 28 to indicate (e.g., provide, select, and/or the like) a destination near which parking is desired, a maximum distance from the destination, a maximum walking time from the destination, a zone of interest within which parking is desired), a parking time, and/or the like. The user may then operate the user interface 28 to submit the user provided and/or selected information/data and to initiate the generation of the parking information request. In an example, embodiment, one or more of the parking time, maximum distance from the destination, or a maximum walking time from the destination may be automatically determined based on user preferences (e.g., stored in a user profile corresponding to the user or stored by the mobile apparatus 20). In an example embodiment, the mobile apparatus 20 may automatically generate and provide (e.g., transmit) a parking information request when the mobile apparatus 20 is approaching a destination (e.g., without user input or only with user input confirming that a parking information request should be generated). For example, the mobile apparatus 20 (e.g., based on location information/data determined by location sensor 29) may determine that the mobile apparatus 20 is within a threshold distance and/or a threshold travel time of the destination and, responsive thereto, generate and provide a parking information request.

At block 2404, a parking information response is received. For example, the network apparatus 10 may generate and provide a parking information response, in response to the parking information request, and provide the parking information response such that the mobile apparatus 20 receives the parking information response. For example, the mobile apparatus 20 may receive the parking information response. For example, the mobile apparatus 20 may comprise means, such as processor 22, memory 24, communications interface 26, and/or the like for receiving the parking information response. In an example embodiment, the parking information response includes an array of EDSs (e.g., as an array of bit arrays) encoding the parking categories and TMEs thereof determined by the network apparatus 10.

At block 2406, the parking category corresponding to one or more TMEs within the zone of interest may be determined and/or identified based on the array of EDSs provided in the parking information response. For example, the mobile apparatus 20 may determine and/or identify the parking category to which one or more TMEs within the zone of interest were assigned based on the array of EDSs provided in the parking information response. For example, the mobile apparatus 20 may comprise means, such as processor 22, memory 24, and/or the like, for determining and/or identifying the parking category to which one or more TMEs within the zone of interest were assigned based on the array of EDSs provided in the parking information response. For example, map information/data corresponding to a TME within the zone of interest may be accessed from a corresponding TME record of the mobile version of the digital map. For example, map information/data for use in generating a map version agnostic identifier for the TME may be accessed. The map version agnostic identifier for the TME may then be generated and coded (e.g., using the k or K coding functions) and it may be determined which of the EDSs in the array of EDSs provided in the parking information response is satisfied by the TME (e.g., using the coded map version agnostic identifier for the TME). When the TME satisfies the EDS in array position associated with a first parking category, it is determined that the TME is assigned to the first parking category. The process may be repeated for a plurality of TMEs within the zone of interest. In an example embodiment, the parking categories determined and/or identified for one or more TMEs within the zone of interest may be used (e.g., by the mobile apparatus 20) to perform one or more navigation functions.

At block 2408, information indicating the parking categories for one or more TMEs within the zone of interest are provided. For example, information indicating the parking categories for one or more TMEs within the zone of interest may be displayed via a display (e.g., of the user interface 28). For example, the mobile apparatus 20 may provide the information indicating the parking categories for one or more TMEs within the zone of interest. For example, the mobile apparatus 20 may comprise means, such as processor 22, memory 24, user interface 28, and/or the like, for providing the information indicating the parking categories for one or more TMEs within the zone of interest. In various embodiments, the information indicating the parking categories for the one or more TMEs may be a graphical indication of the likelihood of finding parking along a TME.

For example, FIG. 22 provides an example view of an JUT of the user interface 28 showing the zone of interest 2500 around destination 2505. TMEs 2510 (e.g., 2510A-D) are displayed in a manner such that parking categories corresponding to the various TMEs may be determined. For example, the TMEs shown as dotted lines (e.g., 2510A) may be associated with the high probability parking category (e.g., there is a high probability of finding (on-street) parking along the dotted line TMEs during the time period) and may be shown in green and/or another manner that visually illustrates that the probability of finding parking along the TME is relatively high. For example, the TMEs shown as dashed lines (e.g., 2510B) may be associated with the middle probability (e.g., there is a mediocre probability of finding (on-street) parking along the dashed line TMEs during the time period) and may be shown in yellow/orange and/or another manner that visually illustrates that the probability of finding parking along the TME is mediocre. For example, the TMEs shown as solid lines (e.g., 2510C) may be associated with the low probability parking category (e.g., there is a low probability of finding (on-street) parking along the solid line TMEs during the time period) and may be shown in red and/or another manner that visually illustrates that the probability of finding parking along the TME is relatively low. For example, the TMEs shown as dash-dot lines (e.g., 2510D) may be associated with the ME parking category (e.g., there is not enough information available to determine a parking category for the TME) and may be shown in purple and/or another manner that visually illustrates that the probability of finding parking along the TME is unknown. For example, a user may view the display of the information indicating the parking categories of one or more TMEs within the zone of interest and determine, based thereon and/or the relative distance of various TMEs from the destination 2505, where to search for parking near the destination 2505.

Returning to FIG. 24, at block 2410, an incremental update response is received. For example, the incremental update response may be received in accordance with a refresh rate provided in the parking information request and/or determined based on profile information/data associated with the mobile apparatus 20. For example, the network apparatus 10 may generate and provide an incremental update response such that the mobile apparatus 20 receives the incremental response update. For example, the mobile apparatus 20 may receive the incremental response update. For example, the mobile apparatus 20 may comprise means, such as processor 22, memory 24, communications interface 26, and/or the like, for receiving the incremental response update. In an example embodiment, the incremental update response includes an array of EDSs (e.g., as an array of bit arrays) that provide incremental updates to the parking information/data for TMEs within the zone of interest. For example, the incremental update response may include an array of EDSs that encode the parking categories and TMEs thereof determined by the network apparatus 10.

Responsive to receiving the incremental update response, the parking category corresponding to one or more TMEs within the zone of interest may be determined and/or identified based on the array of EDSs provided in the incremental update response. For example, the mobile apparatus 20 may determine and/or identify the parking category to which one or more TMEs within the zone of interest were assigned for the current update based on the array of EDSs provided in the incremental update response. For example, the mobile apparatus 20 may comprise means, such as processor 22, memory 24, and/or the like, for determining and/or identifying the parking category to which one or more TMEs within the zone of interest were assigned for the current update based on the array of EDSs provided in the incremental update response. For example, map information/data corresponding to a TME within the zone of interest may be accessed from a corresponding TME record of the mobile version of the digital map. For example, map information/data for use in generating a map version agnostic identifier for the TME may be accessed. The map version agnostic identifier for the TME may then be generated and coded (e.g., using the k or K coding functions) and it may be determined which of the EDSs in the array of EDSs provided in the parking information response is satisfied by the TME (e.g., using the coded map version agnostic identifier for the TME). When the TME satisfies the EDS in array position associated with a first parking category, it is determined that the TME is assigned to the first parking category for the current update. The process may be repeated for a plurality of TMEs within the zone of interest. If a TME does not satisfy any of the EDSs provided in the incremental update response, it is determined that the parking category for the TME has not changed since the immediately preceding update. For example, if a TME does not satisfy any of the EDSs provided in the incremental update response, it is determined that the parking category to which the was assigned TME for the current update is the same parking category to which the TME was assigned in the immediately preceding update. In an example embodiment, the parking categories determined and/or identified for one or more TMEs within the zone of interest for the current update may be used (e.g., by the mobile apparatus 20) to perform one or more navigation functions.

At block 2412, the provision of the information indicating the parking categories for one or more TMEs within the zone of interest is updated based on the incremental update response. For example, the information indicating the parking categories for one or more TMEs within the zone of interest displayed via the display (e.g., of the user interface 28) may be updated so that the parking categories indicated for the TMEs correspond to the parking categories indicated for the TMEs by the incremental update response (e.g., the array of EDSs provided thereby). For example, the mobile apparatus 20 may update the provision of the information indicating the parking categories for one or more TMEs within the zone of interest to reflect the parking categories to which TMEs were assigned for the current update. For example, the mobile apparatus 20 may comprise means, such as processor 22, memory 24, user interface 28, and/or the like, for updating the provision of the information indicating the parking categories for one or more TMEs within the zone of interest to reflect the parking categories to which TMEs were assigned for the current update. In various embodiments, the information indicating the parking categories for the one or more TMEs may be a graphical indication of the likelihood of finding parking along a TME for the current time period (e.g., the time period corresponding to the current update).

For example, according to the parking information response, a first TME may be associated with a first parking category and according to a first incremental update response, the first TME may be associated with a second parking category. The provision of the information indicating the parking categories for one or more TMEs within the zone of interest may be updated to reflect that the first TME is not associated with and/or assigned to the second parking category. For example, the color displayed in association with the first TME may be changed from the color associated with the first parking category to the color associated with the second parking category. A subsequent incremental update response may indicate that the first TME is now assigned to a third parking category and the provision of the information indicating the parking category to which the first TME is assigned may be updated accordingly (e.g., the color displayed in association with the first TME may be changed from the color associated with the second parking category to the color associated with the first parking category).

Blocks 2410 and 2412 may be repeated and/or iterated in accordance with the refresh rate. For example, the mobile apparatus 20 may receive a plurality of incremental update responses spaced apart in time in accordance with the refresh rate. Upon receipt of each incremental update response, the provision of the information indicating the parking categories to which one or more TMEs within the zone of interest are assigned may be updated based at least in part on the EDSs provided with the incremental update response. By providing incremental update responses, up to date information/data regarding where parking is more likely to be found may be provided (e.g., displayed to a user via user interface 28) while only using a small to moderate amount of bandwidth to provide the incremental update responses to the mobile apparatus 20. Moreover, by providing the incremental update responses via a persistent connection, the mobile apparatus 20 need not continuously and/or iteratively generate and provide parking information requests.

In various embodiments, the mobile apparatus 20 may determine that parking has been found and/or the provision of parking information is no longer needed. For example, based on sensors 29 and/or user input received via the user interface 28, the mobile apparatus 20 may determine that parking has been found and, therefore, the provision of parking information is no longer needed. In another example, a user may turn off the provision of parking information/data via interacting with the user interface 28 (e.g., closing a navigation program and/or the like). Thus, the mobile apparatus 20 may determine that incremental update responses are no longer needed. Responsive thereto, the mobile apparatus 20 may close the persistent connection between the network apparatus 10 and the mobile apparatus 20. Upon the closing of the persistent connection, the network apparatus 10 may stop generating and providing incremental update responses.

While the incremental updates are described herein as providing parking categories for TMEs within a zone of interest, incremental updates may be used to provide various types of categorical information in a bandwidth efficient manner. For example, in various embodiments, traffic information/data and/or other categorical information/data (e.g., delay times for TMEs, free flow ratios for TMEs, information/data regarding whether POIs of one or more types are located on TMEs, and/or the like) may be provided via an array of EDSs and updated through incremental updates as described herein.

G. Technical Advantages

Various embodiments provide for the encoding and decoding of a route TME set defined by a route in a map version agnostic manner. Various embodiments provide for the transmission of an encoded route TME set in a bandwidth efficient manner. For example, various embodiments provide for encoding a route TME set using map version agnostic identifiers that are encoded into an EDS (e.g., a bloom filter, subtree data structure), such that the encoded route TME set may be transmitted as a bit array. In various embodiments, the encoding may be performed such that the resulting EDS is the smallest EDS that is satisfied by route TMEs of the route TME set being encoded (e.g., the members of the EDS are coded map version agnostic identifiers configured to identify the route TMEs of the route TME set being encoded) and that is not satisfied by adjacent TMEs of the route (e.g., coded map version agnostic identifiers configured to identify adjacent TMEs are not members of the route TME set). As used herein, an adjacent TME is a TME that intersections a route, but that is not part of the route. Moreover, as the TME identifiers that are coded to generate the coded route TME identifiers are map version agnostic, the network version of the digital map stored by the network apparatus 10 and the mobile version of the digital map stored by the mobile apparatus 20 may be different versions of the digital map. Additionally, the use of a cost minimization algorithm by the mobile apparatus 20 to determine a decoded route, wherein TMEs that satisfy the EDS are assigned a minimal cost, allows the mobile apparatus to automatically "heal" any issues in decoding the route due to differences in the mobile version and the network version of the digital map. Thus, various embodiments provide an efficient self-healing decoding of routes by a mobile apparatus.

Moreover, the determination of the decoded route by the mobile apparatus using an EDS is considerably more efficient than determining a decoded route based on comparing spatial/physical link similarities between links. Indeed, the determination of the decoded route using an EDS does not involve map-matching beyond the identification of the decoded origin TME and the decoded target TME or the use of higher geometrical functions. Rather, determination of the decoded route using the EDS, as described herein, comprises the use of Boolean comparisons (e.g., equal or not equal) at a data level. For example, the mobile apparatus may determine if a particular TME satisfies an EDS via a Boolean comparison.

Additionally, categorical information/data may be encoded using one or more EDSs. For example, categorical information/data such as the likelihood of finding parking during a particular time period along a TME, expected traffic delays along a TME, and/or other categorical information/data may be encoded into an array of EDSs such that the categorical information/data may be provided to the mobile apparatus 20 in a bandwidth efficient manner. Moreover, the encoding of the categorical information/data into an array of EDSs enables the mobile apparatus 20 to efficiently determine an appropriate category for various TMEs of the mobile version of the digital map even when the mobile version of the digital map (e.g., stored by the mobile apparatus 20) is a different version of the digital map than that stored by the network apparatus 10.

Various embodiments of the present invention therefore provide technical solutions to the technical problems of the bandwidth efficient communication of routes between apparatuses that have access to different versions of a digital map.

III. Example Apparatus

The network apparatus 10 and/or mobile apparatus 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10 and/or mobile apparatus 20 may be embodied in other types of computing devices, such as a server, a personal computer, a computer workstation, a laptop computer, a plurality of networked computing devices or the like, that are configured to update one or more map tiles, analyze probe points for route planning or other purposes, store and/or provide driving condition information/data, generate and provide sensor quality index tables and/or driving condition tables, and/or the like. In an example embodiment, a mobile apparatus 20 is an in-vehicle navigation system onboard a vehicle 5 or a mobile device and a network apparatus 10 is a server. In an example embodiment, a mobile apparatus 20 is an apparatus configured to provide a user with a route (e.g., via user interface 28) and/or control a vehicle 5 to traverse a route.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10 and/or probe apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10 and/or mobile apparatus 20 may include a user interface 18, 28 that may, in turn, be in communication with the processor 12, 22 to provide output to the user, such as one or more routes through a road network, one or more notifications regarding traffic conditions along at least a portion of a route, and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network apparatus 10 and/or mobile apparatus 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10 and/or mobile apparatus 20 of an example embodiment, a navigation system may also include or have access to a geographic database. For example, in various embodiments, a network apparatus 10 and/or mobile apparatus 20 may comprise a component (e.g., memory 14, 24, and/or another component) that stores a digital map (e.g., in the form of a geographic database) comprising a first plurality of data records, each of the first plurality of data records representing a corresponding TME, wherein at least some of said first plurality of data records map information/data (e.g., the updated map information/data) indicating current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment, segment, link, lane segment, or traversable map element (TME) data records, point of interest (POI) data records, localization feature data records, and other data records. More, fewer or different data records can be provided. In one embodiment, the other data records include cartographic ("cartel") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to TMEs, links, lanes, road segments, travel lanes of road segments, nodes, intersection, and/or the like and/or the corresponding data records (e.g., to add or update updated map information/data including, for example, current traffic conditions along a corresponding TME), a localization layer (e.g., comprising localization features) and/or the corresponding data records, and/or the like.

In an example embodiment, the TME data records are links, lanes, or segments (e.g., maneuvers of a maneuver graph, representing roads, travel lanes of roads, streets, or paths, as can be used in the calculated route or recorded route information for determination of one or more personalized routes). The intersection data records are ending points corresponding to the respective links, lanes, or segments of the TME data records. The TME data records and the intersection data records represent a road network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example.

The TMEs, lane/road/link segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or mobile apparatus 20 in accordance with an example embodiment may determine the time to traverse a route that includes one or more turns at respective intersections more accurately.

IV. Apparatus, Methods, and Computer Program Products

As described above, FIGS. 3, 4, 5, 7, 8, 9, 11, 12, 13, 14, 16, 17, 18, 19, 20, and 21 illustrate flowcharts of a network apparatus 10 and/or mobile apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   accessing, by a network apparatus comprising a processor, a memory storing a geographic database, and a communication interface, information corresponding to one or more traversable map elements (TMEs) within a zone of interest from the geographic database;
   determining, by the network apparatus, a respective category of a plurality of categories for each of the one or more TMEs based at least in part on the information corresponding to the TME;

generating, by the network apparatus, a first category encoding data structure based at least in part on map version agnostic identifiers corresponding to TMEs determined to be in a first category of the plurality of categories, wherein the first category encoding data structure is a probabilistic data structure configured to not provide false negatives for TMEs within the zone of interest; and providing, by the network apparatus, the first category encoding data structure such that a mobile apparatus receives the first category encoding data structure.

2. The method of claim 1, wherein the information corresponding to the TME is a probability of finding parking along the TME or traffic information for the TME.

3. The method of claim 1, wherein the plurality of categories are categories of likelihood to find parking along TMEs.

4. The method of claim 1, wherein the first category encoding data structure is one of a bloom filter or a subtree data structure.

5. The method of claim 4, wherein the subtree data structure is a prefix hash subtree or a prefix-compressed hash subtree.

6. The method of claim 1, wherein generating the first category encoding data structure comprises:
    accessing map version agnostic information regarding each TME determined to be in the first category;
    generating a map version agnostic identifier for each TME determined to be in the first category;
    coding the map version agnostic identifier for each TME determined to be in the first category using at least one coding function; and
    generating the first category encoding data structure having as members the coded map version agnostic identifiers for each TME determined to be in the first category.

7. The method of claim 1, wherein the first category encoding data structure is provided such that the mobile apparatus receives the first category encoding data structure via a persistent connection established between the network apparatus and the mobile apparatus.

8. The method of claim 7, further comprising:
    generating, in accordance with a refresh rate, an update encoding data structure that provides an incremental update of TMEs determined to be in the first category; and
    providing the update encoding data structure via the persistent connection.

9. The method of claim 8, wherein the update encoding data structure is generated to have as members the coded map version agnostic identifiers for TMEs determined to be in the first category at a first update time and that were not in the first category at a second update time, the first update time corresponding to an update comprising the update encoding data structure and the second update time corresponding to an immediately preceding update.

10. The method of claim 9, wherein the update encoding data structure is tested to ensure that no TMEs within the zone of interest that were determined to be in the first category at the second update time and determined to not be in the first category at the first update time satisfy the update encoding data structure.

11. An apparatus comprising at least one processor, a communications interface configured for communicating via at least one network, and at least one memory storing computer program code and a geographic database, the at least one memory and the computer program code configured to, with the processor, cause the apparatus to at least:
    access information corresponding to one or more traversable map elements (TMEs) within a zone of interest from the geographic database;
    determine a respective category of a plurality of categories for each of the one or more TMEs based at least in part on the information corresponding to the TME;
    generate a first category encoding data structure based at least in part on map version agnostic identifiers corresponding to TMEs determined to be in a first category of the plurality of categories, wherein the first category encoding data structure is a probabilistic data structure configured to not provide false negatives for TMEs within the zone of interest; and
    provide the first category encoding data structure such that a mobile apparatus receives the first category encoding data structure.

12. The apparatus of claim 11, wherein the information corresponding to the TME is a probability of finding parking along the TME or traffic information for the TME.

13. The apparatus of claim 11, wherein the plurality of categories are categories of likelihood to find parking along TMEs.

14. The apparatus of claim 11, wherein the first category encoding data structure is one of a bloom filter or a subtree data structure.

15. The apparatus of claim 14, wherein the subtree data structure is a prefix hash subtree or a prefix-compressed hash subtree.

16. The apparatus of claim 11, wherein to generate the first category encoding data structure, the at least one memory and the computer program code are further configured to, with the processor, cause the apparatus to at least:
    access map version agnostic information regarding each TME determined to be in the first category;
    generate a map version agnostic identifier for each TME determined to be in the first category;
    code the map version agnostic identifier for each TME determined to be in the first category using at least one coding function; and
    generate the first category encoding data structure having as members the coded map version agnostic identifiers for each TME determined to be in the first category.

17. The apparatus of claim 11, wherein the first category encoding data structure is provided such that the mobile apparatus receives the first category encoding data structure via a persistent connection established between the network apparatus and the mobile apparatus.

18. The apparatus of claim 17, wherein the at least one memory and the computer program code are further configured to, with the processor, cause the apparatus to at least:
    generate, in accordance with a refresh rate, an update encoding data structure that provides an incremental update of TMEs determined to be in the first category; and
    provide the update encoding data structure via the persistent connection.

19. The apparatus of claim 18, wherein the update encoding data structure is generated to have as members the coded map version agnostic identifiers for TMEs determined to be in the first category at a first update time and that were not in the first category at a second update time, the first update time corresponding to an update comprising the update encoding data structure and the second update time corresponding to an immediately preceding update.

20. The apparatus of claim 19, wherein the update encoding data structure is tested to ensure that no TMEs within the zone of interest that were determined to be in the first category at the second update time and determined to not be in the first category at the first update time satisfy the update encoding data structure.

* * * * *